(12) United States Patent
Sogabe et al.

(10) Patent No.: US 10,518,179 B2
(45) Date of Patent: Dec. 31, 2019

(54) GAME DEVICE, GAME SYSTEM, AND COMPUTER-READABLE STORAGE MEDIUM HAVING PROGRAM RECORDED THEREON

(71) Applicant: KONAMI DIGITAL ENTERTAINMENT CO., LTD., Tokyo (JP)

(72) Inventors: Daisuke Sogabe, Tokyo (JP); Tsuyoshi Yamaguchi, Tokyo (JP); Manabu Tashiro, Tokyo (JP); Koji Toyohara, Tokyo (JP); Keiji Matsukita, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 752 days.

(21) Appl. No.: 15/149,624

(22) Filed: May 9, 2016

(65) Prior Publication Data

US 2016/0250559 A1 Sep. 1, 2016

Related U.S. Application Data

(63) Continuation of application No. PCT/JP2014/079261, filed on Nov. 4, 2014.

(30) Foreign Application Priority Data

Dec. 12, 2013 (JP) ................................. 2013-257506

(51) Int. Cl.
*A63F 13/812* (2014.01)
*A63F 13/53* (2014.01)
(Continued)

(52) U.S. Cl.
CPC ........ *A63F 13/812* (2014.09); *A63F 13/2145* (2014.09); *A63F 13/53* (2014.09); *A63F 13/573* (2014.09); *A63F 13/577* (2014.09)

(58) Field of Classification Search
CPC .... A63F 13/2145; A63F 13/53; A63F 13/573; A63F 13/577; A63F 13/812
See application file for complete search history.

(56) References Cited

U.S. PATENT DOCUMENTS

| | | | | |
|---|---|---|---|---|
| 5,435,554 A | * | 7/1995 | Lipson | A63F 13/10 463/3 |
| 5,885,156 A | * | 3/1999 | Toyohara | A63F 13/10 463/1 |

(Continued)

FOREIGN PATENT DOCUMENTS

| | | |
|---|---|---|
| JP | 2002-301267 A | 10/2002 |
| JP | 2011-72481 A | 4/2011 |

(Continued)

OTHER PUBLICATIONS

Office Action dated Nov. 2, 2018, issued in counterpart Chinese Application No. 201480061757.X, with English machine translation. (13 pages).

(Continued)

*Primary Examiner* — William H McCulloch, Jr.
(74) *Attorney, Agent, or Firm* — Westerman, Hattori, Daniels & Adrian, LLP

(57) ABSTRACT

A game device controls a game in which an action is applied to a movable object. A prediction accepting unit accepts a prediction made by a user on a movement parameter of the movable object when a predetermined operation of making a prediction is performed by the user. A moving unit decides the movement parameter of the movable object. A determination unit determines a result of the prediction made by the user based on movement parameters respectively predicted by the user and decided by the moving unit. A display control unit displays an arrival point area indicating an expected arrival position of the movable object in an active area in which the action can be applied to the movable object, and changes a size of the arrival point area based on a result of determination by the determination unit.

15 Claims, 20 Drawing Sheets

(51) Int. Cl.
*A63F 13/573* (2014.01)
*A63F 13/2145* (2014.01)
*A63F 13/577* (2014.01)

(56) References Cited

U.S. PATENT DOCUMENTS

| | | | | |
|---|---|---|---|---|
| 6,120,374 | A * | 9/2000 | Akada | A63F 13/005 463/3 |
| 6,342,008 | B1 * | 1/2002 | Toyohara | A63F 13/10 463/23 |
| 6,368,210 | B1 * | 4/2002 | Toyohara | A63F 13/812 463/3 |
| 6,491,582 | B1 * | 12/2002 | Toyohara | A63F 13/55 463/1 |
| 6,503,144 | B1 * | 1/2003 | Rimoto | A63F 13/10 463/4 |
| 6,746,331 | B1 * | 6/2004 | Saikawa | A63F 13/10 463/31 |
| 6,869,363 | B2 * | 3/2005 | Okitsu | A63F 13/005 463/29 |
| 8,070,607 | B2 * | 12/2011 | Takahashi | A63F 13/10 463/42 |
| 8,202,155 | B2 * | 6/2012 | Uchiyama | A63F 13/12 463/23 |
| 8,235,778 | B2 * | 8/2012 | Takahashi | A63F 13/12 463/3 |
| 8,684,805 | B2 * | 4/2014 | Takahashi | A63F 13/10 463/3 |
| 10,092,846 | B2 * | 10/2018 | Sogabe | A63F 13/812 |
| 2002/0045485 | A1 * | 4/2002 | Tanibuchi | A63F 13/10 463/43 |
| 2006/0276241 | A1 * | 12/2006 | Toyohara | A63F 13/10 463/4 |
| 2008/0171595 | A1 * | 7/2008 | Nakasaka | A63F 13/10 463/31 |
| 2009/0181771 | A1 * | 7/2009 | Sogabe | A63F 13/10 463/38 |
| 2009/0227373 | A1 * | 9/2009 | Yamamoto | A63F 13/10 463/38 |
| 2009/0275371 | A1 * | 11/2009 | Takahashi | A63F 13/10 463/3 |
| 2009/0325697 | A1 * | 12/2009 | Yamaguchi | A63F 13/10 463/31 |
| 2010/0056281 | A1 * | 3/2010 | Uchiyama | A63F 13/12 463/42 |
| 2012/0046105 | A1 * | 2/2012 | Yamaguchi | A63F 13/828 463/37 |
| 2012/0108303 | A1 * | 5/2012 | Sogabe | A63F 13/812 463/3 |
| 2012/0115556 | A1 * | 5/2012 | Sogabe | A63F 13/812 463/3 |
| 2012/0258780 | A1 * | 10/2012 | Yamaguchi | A63F 13/533 463/4 |
| 2013/0143653 | A1 | 6/2013 | Yamaoka | |
| 2015/0072745 | A1 * | 3/2015 | Sogabe | A63F 13/812 463/3 |
| 2016/0250559 | A1 * | 9/2016 | Sogabe | A63F 13/812 463/3 |
| 2016/0339336 | A1 * | 11/2016 | Matsui | A63F 13/35 |

FOREIGN PATENT DOCUMENTS

| | | |
|---|---|---|
| JP | 2011-200313 A | 10/2011 |
| JP | 2012-176053 A | 9/2012 |
| JP | 2012-217604 A | 11/2012 |

OTHER PUBLICATIONS

Notification to Grant Patent Right dated Mar. 11, 2019, issued in counterpart CN Application No. 201480061757.X, with English machine translation. (3 pages).

* cited by examiner

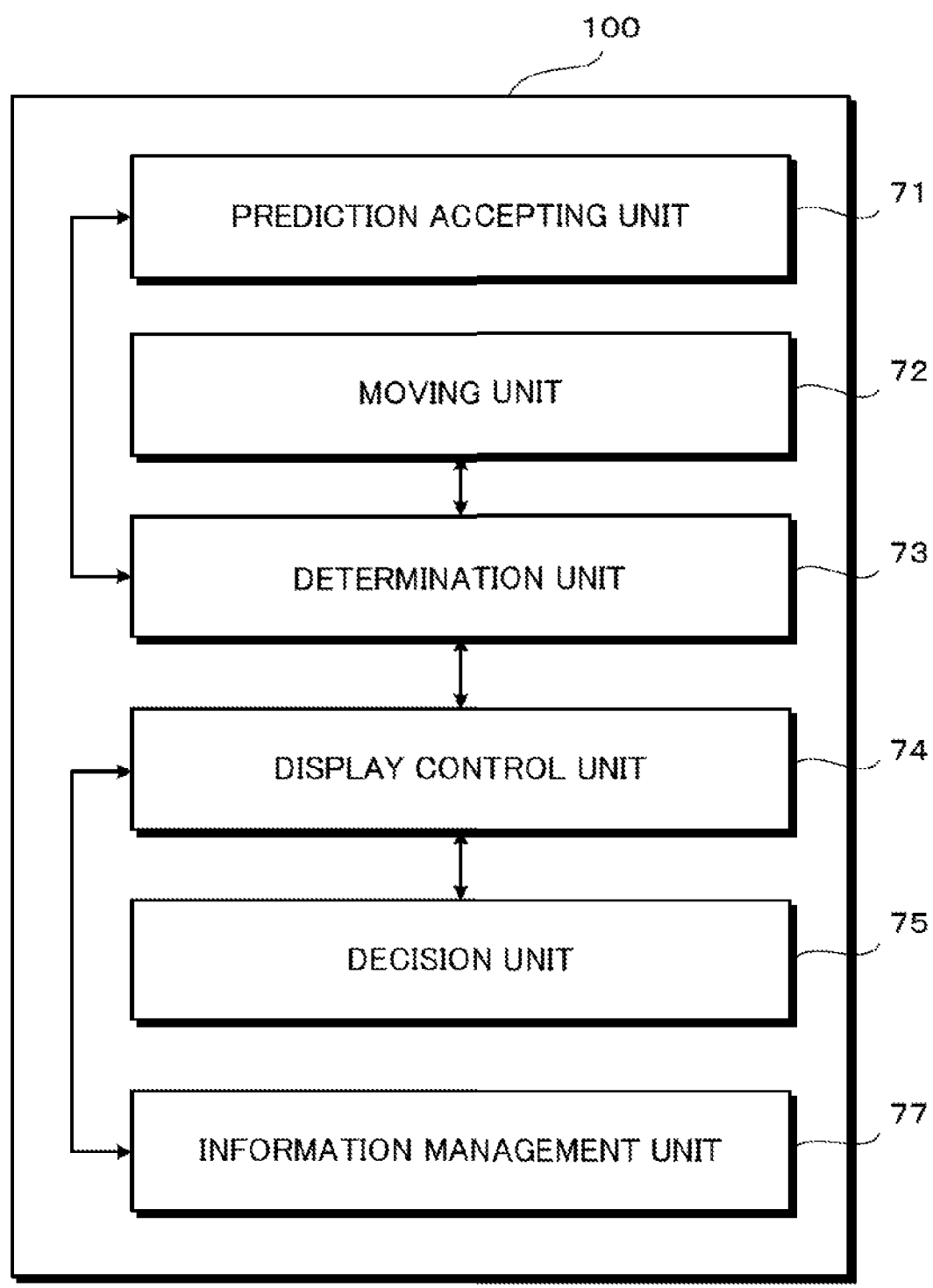

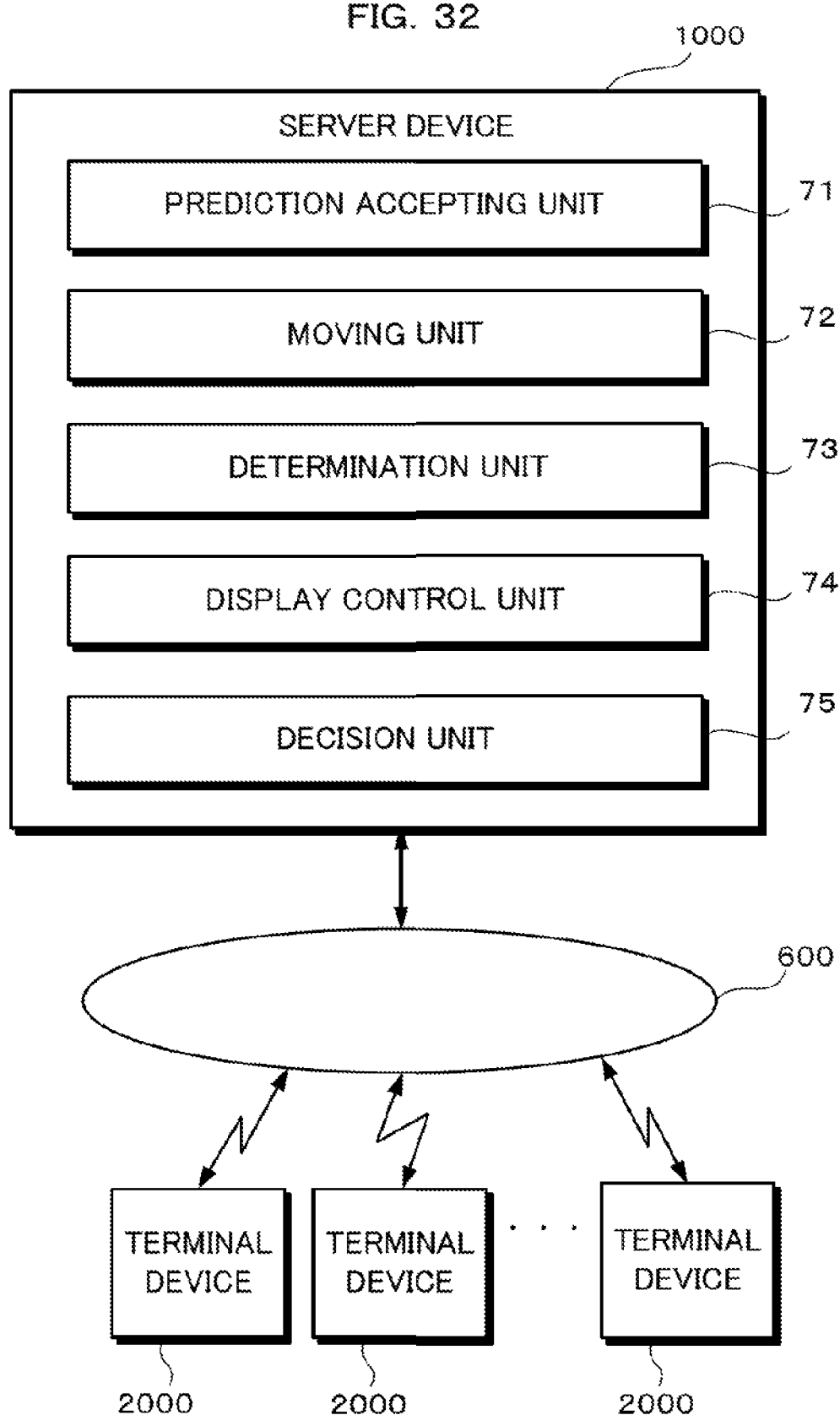

GAME DEVICE, GAME SYSTEM, AND COMPUTER-READABLE STORAGE MEDIUM HAVING PROGRAM RECORDED THEREON

CROSS-REFERENCE TO RELATED APPLICATION

This application is based on Japanese Patent Application Serial No. 2013-257506, filed in the Japan Patent Office on Dec. 12, 2013, the contents of which are hereby incorporated by reference.

BACKGROUND OF THE INVENTION

1. Field of the Invention

The present invention relates to a game device, a game system, and a computer-readable recording medium having recorded thereon program, which control a game based on user's operations.

2. Background Art

In these days, sports games in which a movable object which moves on a game screen is hit back by an operation of a user have widespread. For example, in a baseball game, the user, who operates a batter character, performs a batting operation by superimposing a meet cursor indicating a region where a bat hits a ball onto an arrival point on a strike zone of the ball thrown by a pitcher character.

Patent Document 1: Japanese Unexamined Patent Publication No. 2011-200313

Patent Document 2: Japanese Unexamined Patent Publication No. 2011-072481

In conventional baseball games, when the user performs the batting operation, since the ball is displayed on the screen in a small size, it is difficult for the user to perform a selective batting between a fly ball by hitting the ball aiming at the lower part of the ball and a grounder by hitting the ball aiming at the upper part of the ball, and the like.

SUMMARY OF THE INVENTION

An object of the present invention is to provide a game device, a game system, and a computer-readable storage medium having a program recorded thereon that can realize a game with high amusement properties by offering the user an opportunity to facilitate a desired operation with respect to the movable object such as the ball or the like.

In one aspect of the present invention, a game device for controlling a game in which an action is applied to a movable object is provided. The game device includes a prediction accepting unit configured to accept a prediction made by a user on a movement parameter of the movable object; a moving unit configured to decide the movement parameter of the movable object; a determination unit configured to determine a result of the prediction made by the user based on information on the prediction made by the user, which is accepted by the prediction accepting unit, and the movement parameter, which is decided by the moving unit; a display control unit configured to display an arrival point area indicating an arrival position of the movable object in an active area in which the action can be applied to the movable object; and a decision unit configured to decide the action to be applied to the movable object when a specific area for applying the action to the movable object within the active area is specified based on a predetermined user's operation, the decision unit deciding the action based on a positional relationship between the specific area and the arrival point area. The display control unit is configured to change a size of the arrival point area based on a result of determination by the determination unit.

In another aspect of the present invention, provided is a game system which includes a terminal device used by a first user uses and a terminal device used by a second user, and which controls a game in which a character operated by the first user applies an action to a movable object operated by the second user. The game system includes a prediction accepting unit configured to accept a prediction made by the first user on a movement parameter of the movable object; a moving unit configured to decide the movement parameter of the movable object; a determination unit configured to determine a result of the prediction made by the first user based on information on the prediction made by the first user, which is accepted by the prediction accepting unit, and the movement parameter, which is decided by the moving unit; a display control unit configured to display an arrival point area indicating an arrival position of the movable object in an active area in which the action can be applied to the movable object; and a decision unit configured to decide the action to be applied to the movable object when a specific area for applying the action to the movable object within the active area is specified based on a predetermined first user's operation, the decision unit deciding the action based on a positional relationship between the specific area and the arrival point area. The display control unit is configured to change a size of the arrival point area based on a result of determination by the determination unit.

The game device and the game system according to the present invention can also be realized by a computer, in that case, by causing the computer to function as the foregoing respective units, a program and a computer-readable storage medium having recorded thereon the program, that enable the foregoing game device and the game system by means of a computer would fall under the scope of the present invention.

The object, characteristics and advantages of the present invention become more apparent by the detailed explanation and the accompanying drawings below.

BRIEF DESCRIPTION OF THE DRAWINGS

FIG. 31 is a functional block diagram illustrating another example of the major configuration of the game management device.

FIG. 32 is a block diagram illustrating an example of the configuration of the game system.

BEST MODE FOR CARRYING OUT THE INVENTION

In the following, a game device, a game system, and a computer-readable recording medium having recorded thereon program, according to one embodiment of the present invention are described with reference to the accompanying drawings.

[Configuration of the Game Device]

A game device according to an embodiment of the present invention can be applied to a variety of information processing apparatuses capable of executing a game program. For example, a stationary or portable game dedicated machine, a personal computer (hereinafter referred to as "PC"), a tablet computer, a smart phone, a mobile phone terminal, a PHS (Personal Handy-phone System) terminal, a mobile information terminal (PDA: Personal Digital assistant), a multi-functional television receiver (so-called smart TV) having an information processing function or the like can be applied to the game device.

Figure 1:
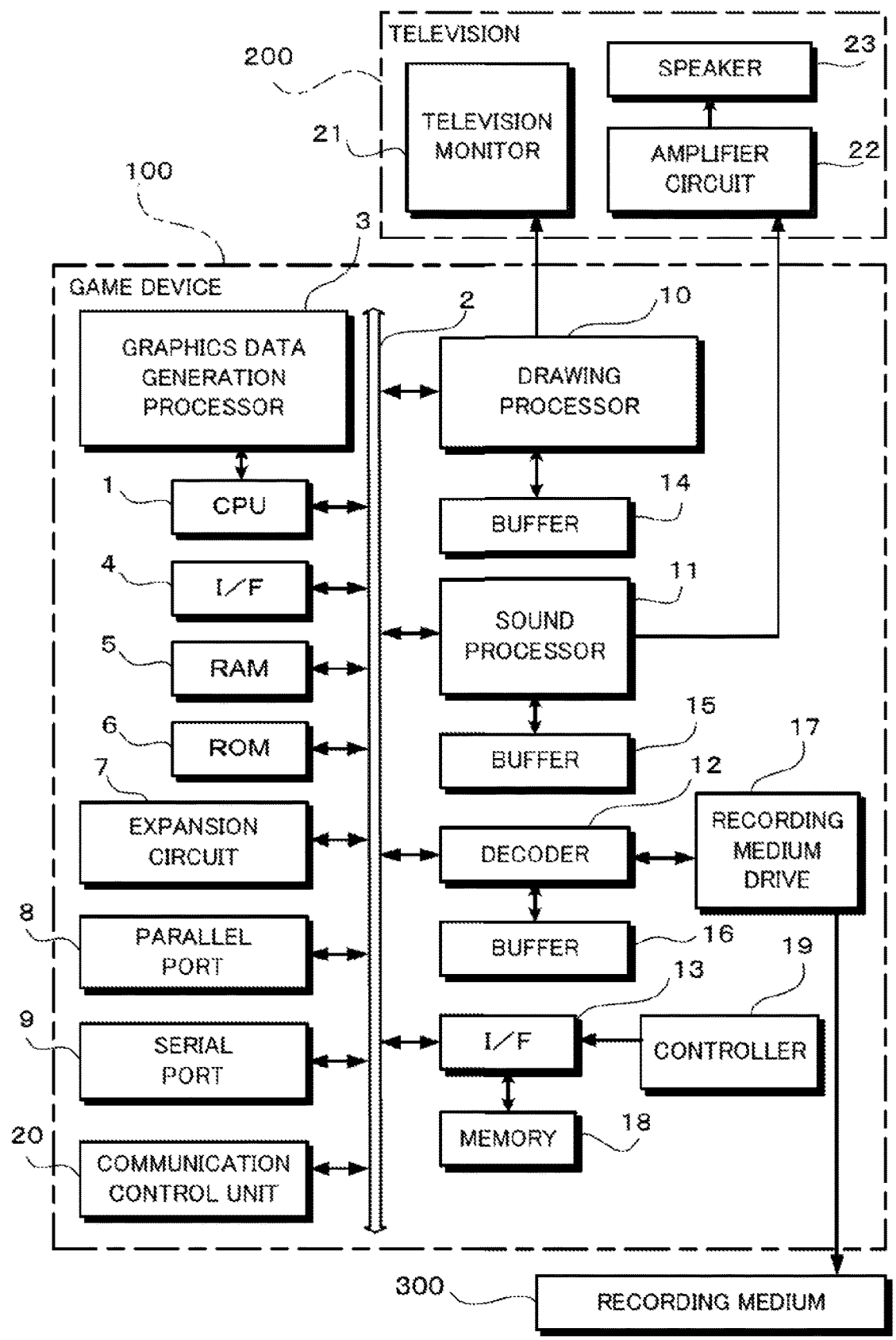
FIG. 1 is a block diagram illustrating an example of a hardware configuration of a game device according to an embodiment of the present invention.

FIG. 1 is a block diagram illustrating a configuration example of a game device 100. In the present embodiment, as an example of the game device 100, a home video game machine to be used by connecting to a television 200 for home use will be explained. In the game device 100, a computer readable recording medium 300 is loaded, whereon a game program is recorded, and the game is execute by reading out the game program from the recording medium 300 as necessary. Alternatively, the game is executed by reading out the game program stored in a memory 18.

The game device 100 includes a CPU (Central Processing Unit) 1, a bus line 2, a graphics data generation processor 3, an interface circuit (I/F) 4, a RAM (Random-Access Memory) 5, a ROM (Read Only Memory) 6, an expansion circuit 7, a parallel port 8, a serial port 9, a drawing processor 10, a sound processor 11, a decoder 12, an interface circuit (I/F) 13, buffers 14 to 16, a recording medium drive 17, the memory 18, and a controller 19. The television 200 to which this game device 100 is connected includes a television monitor 21, an amplifier circuit 22 and a speaker 23.

A CPU 1 is connected to the bus line 2 and the graphics data generation processor 3. The bus line 2 includes an address bus, a data bus, a control bus, and the like. Via this bus line 2, the CPU 1, the interface circuit 4, a RAM 5, the ROM 6, the expansion circuit 7, the parallel port 8, the serial port 9, the drawing processor 10, the sound processor 11, the decoder 12, the interface circuit 13 and a communication control unit 20 are mutually connected.

A drawing processor 10 is connected to the buffer 14 and the television monitor 21. The sound processor 11 is connected to the buffer 15 and the amplifier circuit 22 of the television 200. The decoder 12 is connected to the buffer 16 and the recording medium drive 17. The interface circuit 13 is connected to the memory 18 and the controller 19.

Incidentally, in the case where the game device 100 is constituted as a personal computer or a work station, the television monitor 21, and the like correspond to a display for a computer. The expansion circuit 7, the drawing processor 10, the sound processor 11, and the like respectively correspond to parts of data of a game control program recorded on the recording medium 300, or hardware on the expansion board mounted to an expansion slot of a computer. The interface circuit 4, the parallel port 8, the serial port 9 and the interface circuit 13 respectively correspond to hardware on the expansion board mounted to the expansion slot of the computer. The buffers 14 to 16 respectively correspond to respective memory areas of the RAM 5 or the expansion memory.

The graphics data generation processor 3 plays the role of coprocessor of the CPU 1. In other words, this graphics data generation processor 3 performs coordinate transformation and light source calculation, such as fixed point matrix and vector operations, by parallel processing. The major processing of this graphics data generation processor 3 involves processing to determine the address of the processing target image in a predetermined display area based on the coordinate data, the moving amount data and the rotation amount data of each vertex in a 2-D or 3-D space of the image data supplied from the CPU 1, and to return this address data to the CPU 1, and the processing to calculate the luminance of the image based on the distance from the light source, which is set virtually.

The interface circuit 4 is used for interfacing peripheral devices including a pointing device, such as a mouse, a trackball or the like. The RAM 5 is used as a main memory. In the ROM 6, the program data required for an operating system of the game device 100 is stored.

The expansion circuit 7 performs expansion processing for compressed images which were compressed by intra-encoding conforming to the MPEG (Moving Picture Experts Group) standard for moving pictures and to the JPEG (Joint Photographic Experts Group) standard for still pictures. The expansion processing includes decoding processing (decoding data encoded by VLC: Variable Length Code), inverse quantization processing, IDCT (Inverse Discrete Cosine Transform) processing, restoration processing of intra-images, and the like.

The drawing processor 10 performs drawing processing for the buffer 14 at each predetermined time (for example, 1 frame, e.g. 1/60 sec.) based on the drawing instructions issued by the CPU 1. The buffer 14 is comprised of RAM, for example, and consists of a display area (frame buffer) and a non-display area. The display area is a development area for the image data to be displayed on the display screen of the television monitor 21. The non-display area is a storage area for data to define skeletons, model data to define polygons, animation data to assign motion to models, pattern data to indicate the content of each animation, texture data, color palette data or the like. Here the texture data is 2-D image data. The color palette data is data for specifying the color of texture data or the like. The CPU 1 reads out these data from the recording medium 300 all at once, or at a plurality of times along with the progress of the game to be recorded in the non-display area of the buffer 14 beforehand.

The sound processor 11 writes ADPCM (Adaptive Differential Pulse Code Modulation) data read from the recording medium 300 to the buffer 15, and the ADPCM data stored in this buffer 15 is used as the sound source. This sound processor 11 reads the ADPCM data from the buffer 15 based on a clock signal with a 44.1 kHz frequency, for example. The sound processor 11 performs such processing as pitch transformation, adding noise, setting an envelope, setting level, and adding reverb or the like for the ADPCM data read from the buffer 15. The sound data processed by the sound processor 11 is then output from the speaker 23 via the amplifier circuit 22.

For example, the recording medium drive 17 is made up of a DVD-ROM drive, a CD-ROM drive, a hard disk drive, an optical disk drive, a flexible disk drive, a silicon disk drive, a cassette medium reading device or the like. The recording medium 300 is made up of a DVD-ROM, a CD-ROM, a hard disk, an optical disc, a flexible disk or a semiconductor memory or the like. The recording medium drive 17 reads the image data, the audio data, and the program data from the recording medium 300, and supplies the data as read to the decoder 12. The decoder 12 performs an error correction processing based on the ECC (Error Correction Code) for the image data, the audio data, and the program data supplied from the recording medium drive 17, and supplies the data as processed to the RAM 5 or the sound processor 11.

The memory 18 is an auxiliary memory device, which has a nonvolatile storage region for storing therein various game parameters at a point of interruption, such as the case of holding the status at a point of interruption when the game is interrupted midway. The memory 18 can store game program or various kinds of data. For this memory 18, for example, a card type memory, a hard disk, a semiconductor memory or the like can be used.

The controller 19 is an operation device which permits the user as an operator to input various types of operation commands. The controller 19 outputs an operation signal according to an operation by the user to the CPU 1 via the interface circuit 13. The controller 19 is provided with, for example, an analog stick, direction keys, a confirm button and the like. The controller 19 is used for providing the CPU 1 with commands for moving an aiming cursor 503, or executing batting and the like by a batter character 501.

The general operation of the above game device 100 will now be explained. When the power is supplied to the game device 100, the CPU 1 instructs the recording medium drive 17 to read the game program from the recording medium 300 based on the operating system stored in the ROM 6. The image data, voice data, and program data as read by the recording medium drive 17 from the recording medium 300 are supplied to the decoder 12, and the decoder 12 executes error correction processing for each data.

The image data to which the error correction processing has been performed, is supplied to the expansion circuit 7 via the bus line 2, and the above mentioned expansion processing is performed. The image data is then supplied to the drawing processor 10, and is written to the non-display area of the buffer 14 by the drawing processor 10. The voice data, to which the decoder 12 performed the error correction processing, is written to the buffer 15 via the RAM 5 or the sound processor 11. The program data, to which the decoder 12 performed the error correction processing, is written to the RAM 5.

Thereafter, the CPU 1 performs a player card exchange processing, a game progress processing, and the like based on the game control program stored in the RAM 5 and on the content which the user instructs using the controller 19. In other words, the CPU 1 controls image processing, controls voice processing, and controls internal processing based on the content which the user instructs using the controller 19.

The game device 100 comprises the communication control unit 20 including a communication interface. With this game device 100, it is possible to execute an online match type game by connecting to other game device 100 by a wireless LAN communication, an internet communication, a near field communication, a cable communication or the like, and carrying out sending and receiving of data while making the game devices in sync with one another.

Figure 2:
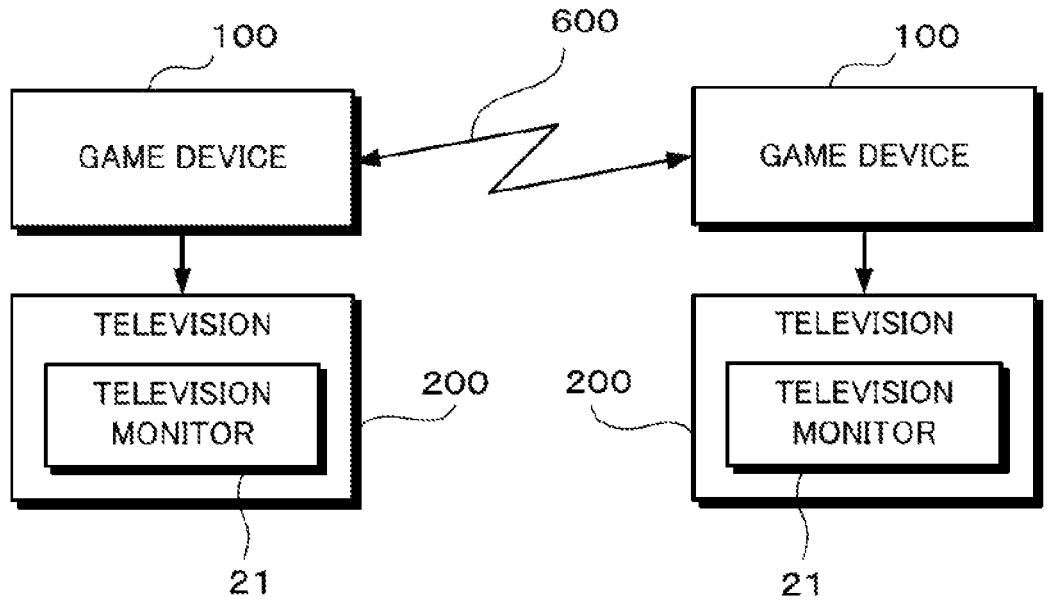
FIG. 2 is a block diagram illustrating an example of a configuration of a game system.
Figure 3:
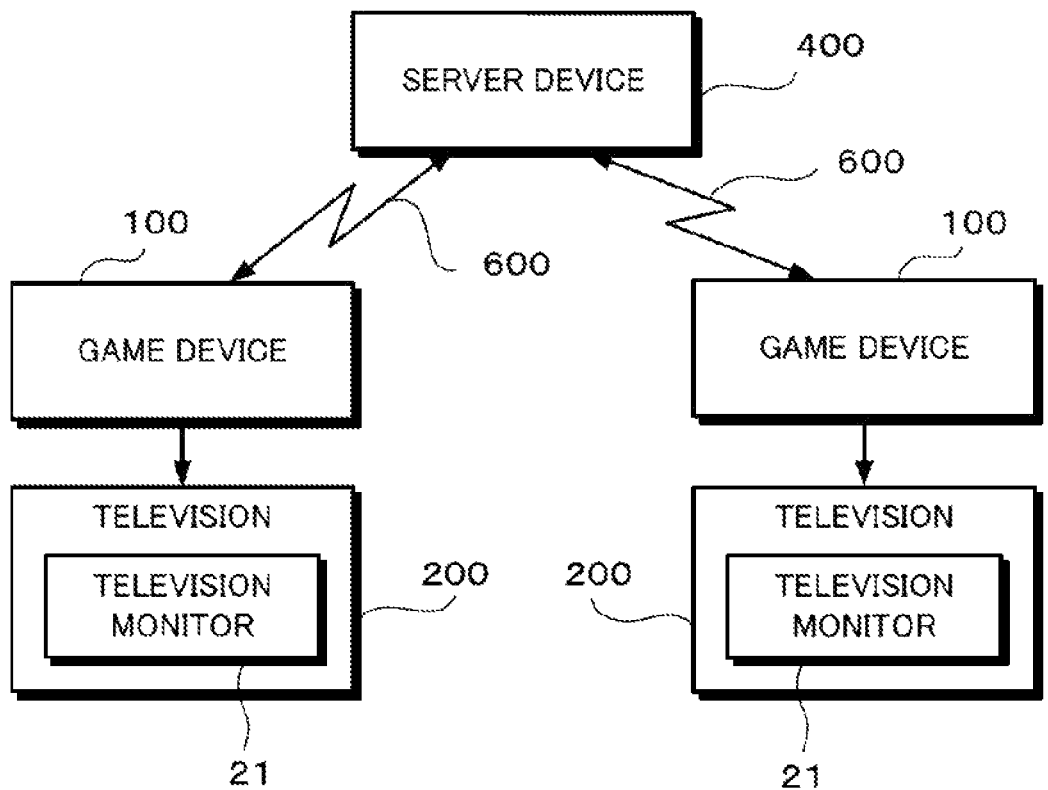
FIG. 3 is a block diagram illustrating another example of the configuration of the game system

In the case where two users perform the online match via a network as illustrated in FIG. 2 and FIG. 3, two game devices 100 respectively operated by the two users are connected so as to allow communications via a network 600. For the network 600, an internet, a public line (telephone line, mobile communication line and the like), a cable LAN (Local Area Network), a wireless LAN, Bluetooth (registered trademark), a UWB (Ultra Wide Band) and the like, or combinations thereof may be used.

For the online match via the network 600, as illustrated in FIG. 2, the game system in which a competition is made among a plurality of game devices 100 by making direct data exchanges among them, a so-called P2P (peer to peer) connection system may be adopted. Moreover, a radio-communication match in ad hoc mode which permits a plurality of game devices 100 to directly perform radio-communications, or a telecommunication match via communication cable may be adopted, which fall under the P2P connection system. In the online match, for example, two game devices 100 develop a common virtual game space, while making synchronization with one another by the P2P communications, and the game proceeds in the common virtual game space.

For the online match system via the network 600, as illustrated in FIG. 3, a so-called client/server connection system may be adopted in which a plurality of game devices 100 as clients perform a match against each other via a server device 400. For example, in the case of the baseball game, when carrying out the online match between the two game devices 100 while making communications between them, in which a ball released from a pitcher character is hit back by a batter character, the communications may be performed via the server device 400.

The game according to the present embodiment also has a game mode in which a user carries out the online match with a computer (so-called a Versus CPU mode) other than the game mode in which the user carries out the online match with other user. In the following, an example of the game is explained through an example of the online match game mode.

[Game Example]

The game to be controlled by the game device of the present embodiment is a game that applies an action to a movable object. Examples of the movable object include a ball object (hereinafter, simply referred to as "a ball") in a sport simulation game, and the like. Other examples of the movable object include, other than fighters and missiles or the like in action games, abstract objects or the like, irrelevant to sports or actions. Examples of the action include hitting back the movable object, adding the rotation force to the movable object, catching the movable object, breaking the movable object and the like. Examples of the game include a game in which a first character operated by a first user applies the action to the movable object released from a second character operated by a second user (or automatically controlled by the CPU). Specific examples include the baseball game or the softball game in which the batter character as an example of the first character performs hitting as an example of the action, the ball as an example of the movable object released from the pitcher character as an example of the second character by adjusting an aiming cursor, a finger, a pen or the like to the arrival point of the ball.

In the game device 100 according to the present embodiment, various games can be applied in which the action is applied to the movable object such as a soccer game, a tennis game, a combat simulation game or the like, without being limited to the baseball game, a softball game. In the following, explanations are given through an application example to the baseball game.

Figure 4:
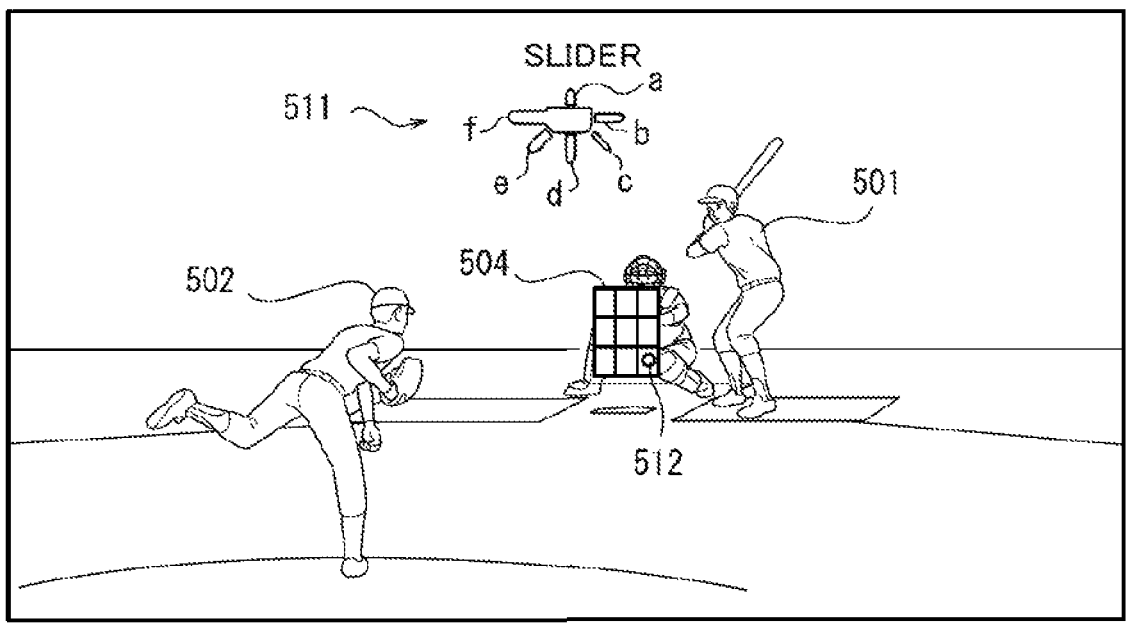
FIG. 4 is an explanatory diagram illustrating an example of a game screen of a user on a pitcher side.
Figure 5:
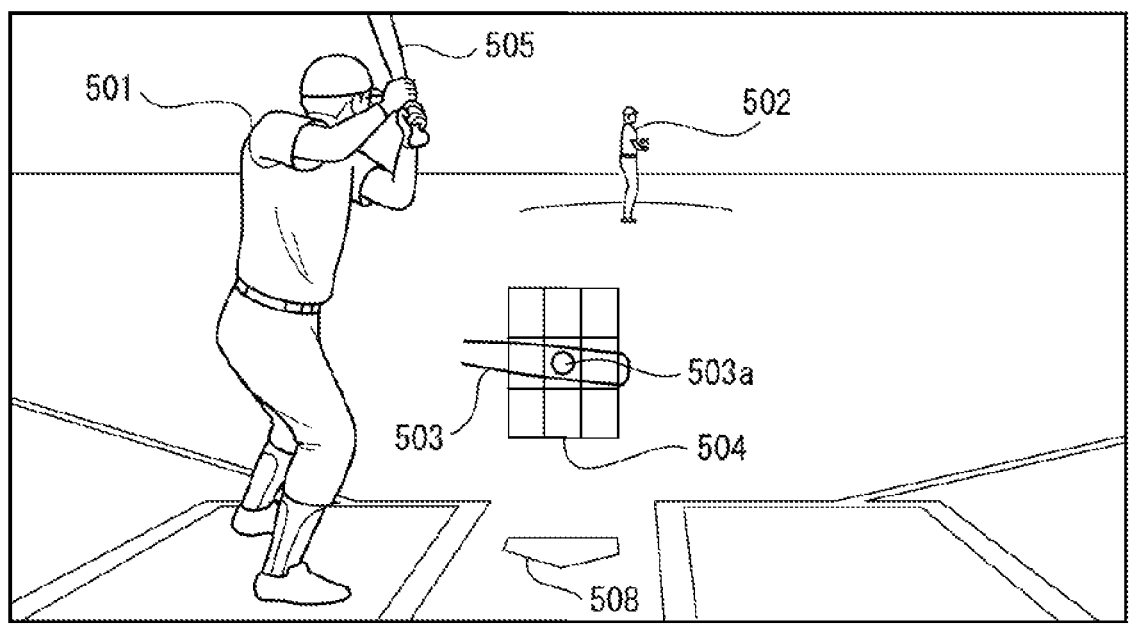
FIG. 5 is an explanatory diagram illustrating an example of a game screen of a user on a batter side before throwing a ball.

As illustrated in FIG. 2 and FIG. 3, in the case where two users perform the online match via the network 600, the screen of FIG. 4 and the screen of FIG. 5 are displayed in the television monitors 21 of the televisions 200 connected to two game devices 100 respectively. Namely, the screen of FIG. 5 is displayed in the television monitor 21 of the game device 100 on the side of a user operating the batter character 501, while the screen of FIG. 4 is shown in the television monitor 21 of the game device 100 on the side of a user operating a pitcher character 502.

FIG. 4 shows the state directly after a pitcher character 502 throws the ball toward the batter character 501. FIG. 4 illustrates an image viewed from the pitcher character side. The second user operating the pitcher character 502 performs the game while viewing this screen when making a match between a batter and a pitcher. The second user on the pitcher character side is allowed to select a pitch type and a pitch location of a ball before pitching. For instance, the pitch type selection icon 511 is displayed on the screen. The second user selects the pitch type by operating the controller 19 (the analog stick, the direction keys or the like), and confirms the selection of the pitch type by pressing a determination button.

In the example of the pitch type selection icon 511 illustrated in FIG. 4, six lines a, b, c, d, e and f extend radially from the center to the circumference, one pitch type can be selected from among the six pitch types. For instance, the line "a" indicates a "fast ball", the line "b" indicates a "shoot ball", the line "c" indicates a "sinker ball", the line "d" indicates a "fork ball", and the line "e" indicates a "curve ball", and the line "f" indicates a "slider ball". In the example of FIG. 4, there are six selectable pitch types. However, the number of selectable pitch types is different for each pitcher character 502, and there may be the cases where only two to five pitch types are selectable. The pitch type selected by the user's operation is displayed in an area above the pitch type selection icon 511.

When the pitch type is determined in the foregoing manner, the pitcher character 502 starts a pitching motion. Then, for example, until the pitcher character 502 releases the ball, the second user is allowed to specify the pitch location. On the screen, a strike zone 504 and a location specifying cursor 512 for specifying the pitch location are displayed. For example, the second user can specify the pitch location by moving the location specifying cursor 512 by operating the controller 19 (the analog stick, the direction keys or the like).

Incidentally, in the game device 100 of a screen integrated type, when adopting a touch panel for the screen, it may be configured that a contact position of the screen can be specified as the pitch location by contacting the screen by the second user with his/her finger or a stylus pen or the like.

After specifying the pitch location by the second user in the foregoing manner by pressing a pitching start button of the controller 19 or automatically, the pitcher character 502 starts pitching and releases the ball. In FIG. 5, for the sake of convenience, the strike zone 504, the pitch type selection icon 511, and the location specifying cursor 512 are displayed. However, it may be configured to delete them, for example, after the ball is released.

When the first user performs batting in the Versus CPU mode, the CPU 1 of the game device 100 automatically determines movement parameters of the ball, such as the pitch type, the pitch location or the like.

Based on the pitch type and the pitch location selected by the second user, the game device 100 calculates the trajectory of the ball released from the pitcher character 502, and moves the ball towards a home plate. Incidentally, the game device 100 may be configured to calculate the trajectory of the ball released from the pitcher character 502 not only based on the pitch type and the pitch location, but also based on the ability parameters of the pitcher character 502 (a speed of a pitched ball, a ball control, a change level or the like). The trajectory of the ball may be computed by applying a known algorithm.

Incidentally, although the example in which the second user on the pitcher side selects the pitch type and the pitch location has been shown in the above, a simpler baseball game may be adopted such that when the second user selects only the pitch location, the pitcher character 502 starts pitching.

By the way, for the first user who operates the batter character 501, since the screen of the game device 100 on the pitcher side (the screen of FIG. 4) cannot be seen, the first user cannot see which pitch type and which pitch location are selected. Also in the case of the Versus CPU mode, since the first user cannot see which pitch type and which pitch location are automatically selected by the CPU 1 of the game device 100.

On the other hand, the first user who operates the batter character 501 plays the game while viewing the screen illustrated in FIG. 5. FIG. 5 illustrates an image viewed from the batter character side in the state before the pitcher character 502 throws the ball. The first user who operates the batter character 501 plays the game while viewing this screen in a match of a pitcher versus a batter. On this game screen, displayed are the batter character 501 operated by the first user, the pitcher character 502 as an opponent character, the aiming cursor 503, the strike zone 504, a bat object 505, a home plate 508 and the like.

In the baseball game, the aiming cursor 503, also referred to as a bat cursor, is a hittable area in which the batter character 501 can hit the ball (i.e., an area in which the ball can be hit with a bat). By performing an operation of moving the aiming cursor 503, the first user can adjust a position of swinging the bat object 505. For example, in the case using the controller 19 having the analog stick, by performing an operation of tilting the analog stick in an arbitrary direction, it is possible to move the aiming cursor 503 displayed at above the home plate 508 to an arbitrary position.

When the first user performs an operation of swinging the bat (for example, an operation of pressing a predetermined button of the controller 19), the bat object 505 is swung to pass through the position of the aiming cursor 503 in the active area including the strike zone 504. In the aiming cursor 503, also displayed is a meet cursor 503a which is the hittable area in which the ball can be hit effectively. This meet cursor 503a indicates a predetermined range including a so-called sweat spot near a center of gravity of the bat. Regarding the cursor display on the screen, it may be configured to display only the meet cursor 503a without displaying the aiming cursor 503.

In the baseball game of the present embodiment, the first user is allowed to make a prediction on the pitch location, i.e., a movement parameter of the ball before the pitcher character 502 throws the ball. However, whether or not to make the prediction by the first user is an arbitrary matter, and the first user can perform the operation of making the prediction on the pitch location only when the first user desires to do so. Firstly, explained is a case where the prediction on the pitch location is not made by the first user.

Figure 6:
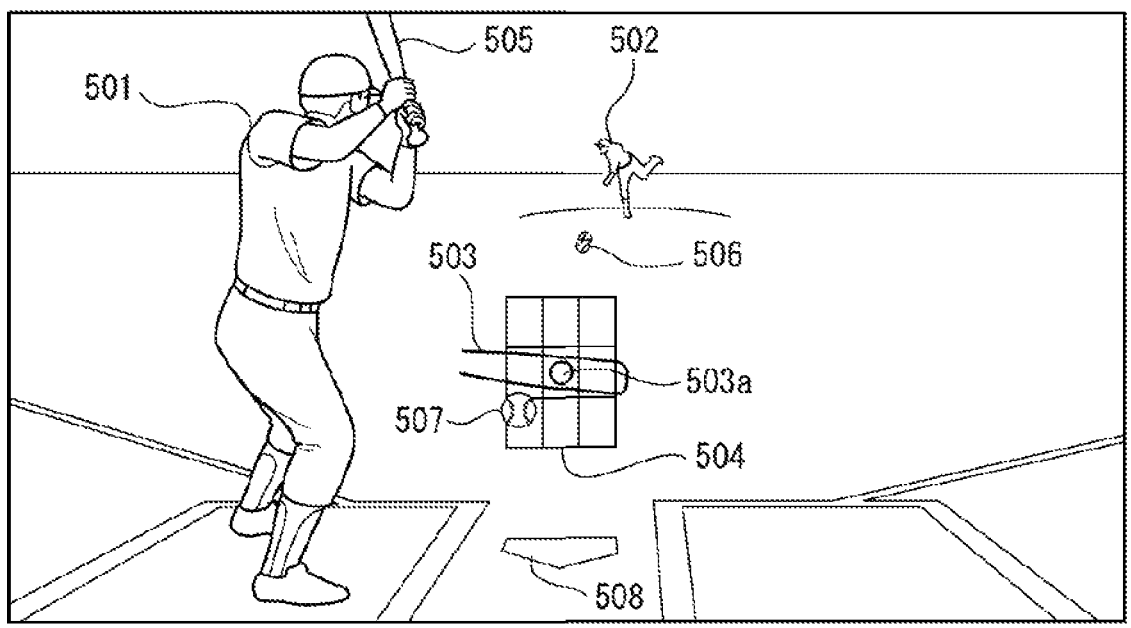
FIG. 6 is an explanatory diagram illustrating an example of the game screen of the user on the batter side after throwing the ball.

FIG. 6 illustrates an example of the game screen of the first user on the batter side after pitching. Immediately after the pitcher character 502 pitches the ball 506, or after a predetermined time has elapsed from throwing the ball 506, as illustrated in FIG. 6, in the active area above the home plate 508, an arrival point area 507 indicating an expected arrival position of the ball 506 is displayed. Here, the active area is an area in which the action can be applied to the ball 506 as the movable object, and in the case of the baseball game, this active area indicates the hittable area including the strike zone 504 and a ball zone around the strike zone 504.

The aiming cursor 503, the meet cursor 503a, the strike zone 504 and the arrival point area 507 are all displayed in the active area, and these are translucently displayed so that a display of the ball 506 being moved is not interrupted.

Incidentally, it may be configured to delete the strike zone 504 after the pitcher character 502 starts the pitching motion or after the pitcher character 502 releases the ball 506. In this way, while the ball 506 is being pitched, other object to be superimposed on the strike zone 504 can be seen clearly.

As described above, immediately after pitching, or after a predetermined time has elapsed from pitching, the arrival point area 507 is displayed in the active area above the home plate 508. At this timing, however, the arrival point area 507 does not necessarily indicate the final arrival point in the active area. That is, the arrival point area 507 is gradually moved with the movement of the ball 506, and the ball 506 arrives at the final arrival point at the timing the ball 506 passes above the home plate 508. Here, as explained above, since the arrival point area 507 is translucently displayed, when the ball 506 pitched is superimposed on the arrival point area 507, the ball 506 itself would not disappear from view.

Figure 7:
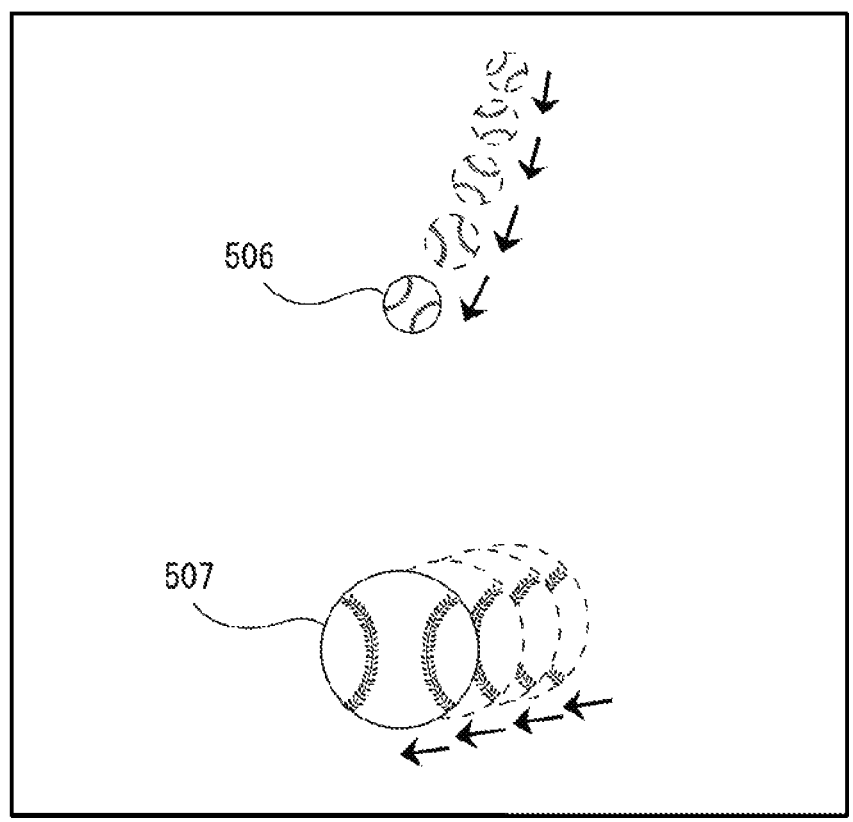
FIG. 7 is an explanatory diagram illustrating a state where an arrival point area is moved with a movement of the ball.

As an example, FIG. 7 illustrates a state the arrival point area 507 is moved with the movement of the ball 506 in a case where a left handed pitcher character 502 throws the slider ball (or a right handed pitcher character 502 throws the shoot ball). In FIG. 7, for the sake of explanation of the display and the movement of the ball 506 and the arrival point area 507, images other than the images of the ball 506 and the arrival point area 507 are omitted.

The position of the ball 506 moving in the game space is projected onto the active area (active plane) above the home plate 508, and is displayed as the arrival point area 507. In particular, in the case of a breaking ball, in the plane (xy plane) perpendicular to the moving direction (z-axis direction) of the ball 506, the coordinate position of the ball 506 is changed in a horizontal direction and/or a vertical direction. Thus, this change in position of the ball 506 is reflected (projected) as a change in position of the arrival point area 507 in the active area. Incidentally, in the case of the fast ball, the position of the arrival point area 507 is not changed with the movement of the ball 506, or is changed only for a slight drop in a vertical direction by gravity.

By paying an attention to the moving direction and the speed of the arrival point area 507, it is possible for the first user to expect the final arrival position above the home plate 508. Therefore, the first user performs the operation of making the aiming cursor 503 (in particular, the meet cursor 503a) be superimposed on the arrival point area 507 with the movement of the arrival point area 507 or by moving the aiming cursor 503 near the expected final position of the final arrival point area 507. Then, while estimating the timing at which the ball 506 finally arrives at the arrival point area 507, the operation of swinging the bat is performed (for example, by pressing a predetermined operation button of the controller 19 for swinging the bat). Therefore, in this example, in order to make the bat object 505 meet (hit) the ball 506, it is necessary to satisfy the following conditions (a) and (b).

(a) The aiming cursor 503 is superimposed on the arrival point area 507 at timing the ball 506 arrives at the active area above the home plate 508.

(b) A predetermined bat swing operation is performed by the first user at a predetermined timing at which the ball 506 arrives at the active area or in a vicinity of the active area.

In other words, the above condition (b) can be defined that the operation of swinging the bat is performed at the timing at which the ball 506 arrives the arrival point area 507 or in the vicinity of the arrival point area 507 on the active area (the arrival point area 507 and the ball 506 are substantially overlapped). Here, the predetermined timing can be defined as a timing in the predetermined hittable time period (for example, four frame time period) in which the ball 506 passes in a vicinity of the active area above the home plate 508. Incidentally, one frame time period can be set to, for example, 1/60 second.

Regarding the above condition (a), in a case where the arrival point area 507 and the aiming cursor 503 are spaced apart, when swinging the bat object 505, since the bat object 505 would be swung in other location than the arrival point of the ball 506, the result of batting would be swinging and missing the ball. Regarding the above condition (b), as in the case of batting in a real baseball, the timing of swinging the bat would be too early or too late deviated from the above predetermined timing, the result of batting would be swinging and missing the ball.

Other than the game specification in which batting cannot be performed unless both of the above conditions (a) and (b) are satisfied, such game specification in which batting can be performed if only the above condition (a) is satisfied.

Figure 8:
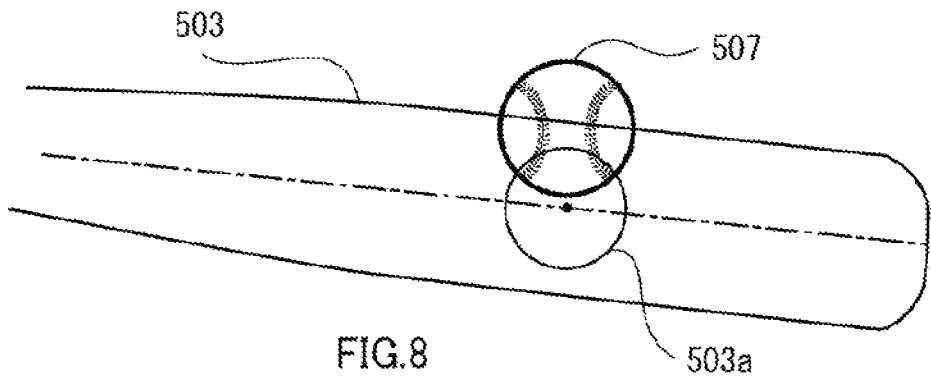
FIG. 8 is an explanatory diagram illustrating a positional relationship between an aiming cursor and the arrival point area.
Figure 9:
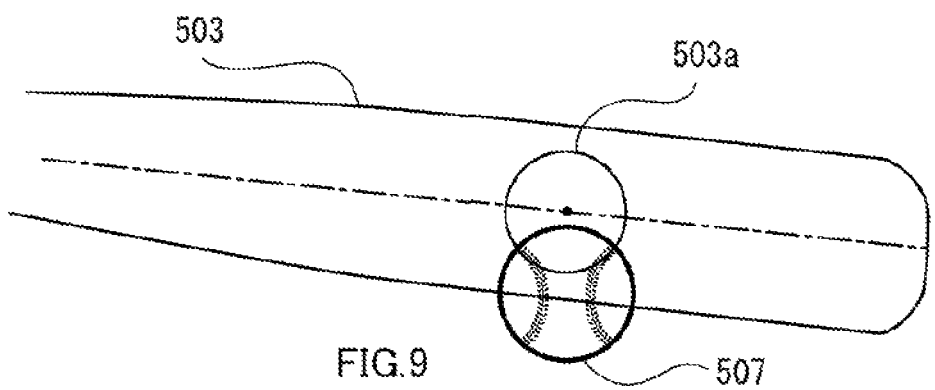
FIG. 9 is an explanatory diagram illustrating a positional relationship between the aiming cursor and the arrival point area.

The aiming cursor 503 indicates a specific area for applying the action to the ball in the active area, and when the above batting conditions are satisfied, based on the positional relationship between the arrival point area 507 and the aiming cursor 503, the action to be applied to the ball 506 (the result of batting) is determined. For example, as illustrated in FIG. 8, when a lower part of the arrival point area 507 is hit in an upper part of the meet cursor 503*a* in the aiming cursor 503, the result of batting would be a fly ball (a fly or a line drive). On the other hand, for example, as illustrated in FIG. 9, when the upper part of the arrival point area 507 is hit in a lower part of the meet cursor 503*a* in the aiming cursor 503, the result of batting would be a grounder. It should be noted that the shorter is the distance between the center of the meet cursor 503*a* and the center of the arrival point area 507, the stronger is a batted ball, and the higher is the probability of making a hit or a home run.

Figure 10:
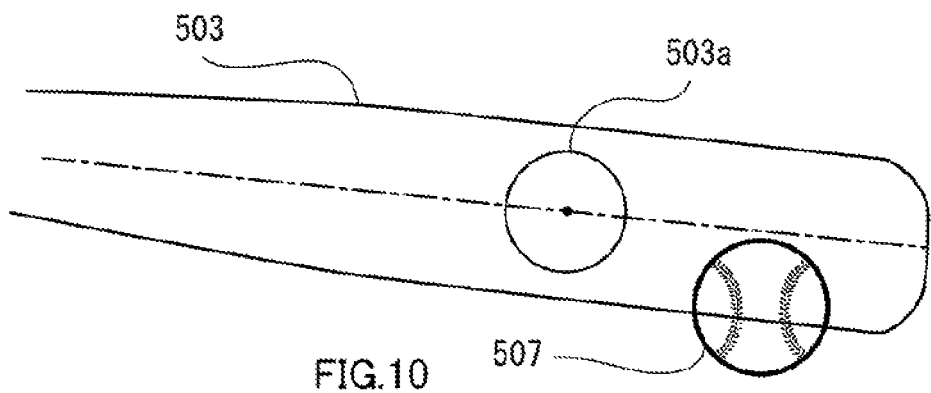
FIG. 10 is an explanatory diagram illustrating a positional relationship between the aiming cursor and the arrival point area.

For example, as illustrated in FIG. 10, even when the meet cursor 503*a* is not superimposed on the arrival point area 507, as long as a part other than the meet cursor 503*a* of the aiming cursor 503 is superimposed on the arrival point area 507, it is still possible to hit the ball 506. However, since the part other than the meet cursor 503*a* of the aiming cursor 503 is a mishit area, the ball batted in this area would have less power than the ball batted in the meet cursor 503*a*. As illustrated in FIG. 10, when the upper part of the arrival point area 507 is batted in the lower part outside the meet cursor 503*a* of the aiming cursor 503, the result of batting would be a mishit of grounder. Although not illustrated, when the lower part of the arrival point area 507 is hit in the upper part outside the meet cursor 503*a* of the aiming cursor 503, the result of batting would be a mishit of a fly ball.

For instance, if the timing a bat swing operation is performed is around a middle of the hittable time period, the ball is hit toward a center field. If the bat swing operation is performed at earlier timing than the middle of the hittable time period, the batted ball would be pulled. On the other hand, if the bat swing operation is performed at later timing than the middle of the hittable time period, the batted ball would be a hitting to an opposite field. As described, the hitting direction of the ball is determined by the timing the bat swing operation is performed.

Furthermore, the game device 100 may be configured to compute the trajectory of the ball 506 batted back by taking also the ability parameters (power, trajectory or the like) of the batter character 501 into consideration. The trajectory of the batted ball 506 may be computed by applying a known algorithm.

Next, explained is a case where the first user makes the prediction on the pitch location. The first user is allowed to arbitrarily perform the predetermined operation of making the prediction on the pitch location beforehand at predetermined timing before the ball 506 is released from the pitcher character 502. For example, it may be configured to allow the operation of making the prediction before the pitcher character 502 starts the pitching motion, or allow the operation of making the prediction even after the pitching motion is started before the ball 506 is released from the pitcher character 502. The start of the pitching motion specifically indicates the start of such motion that the pitcher character 502 moves his arm up or his leg up before the ball 506 is released from the pitcher character 502.

Figure 11:
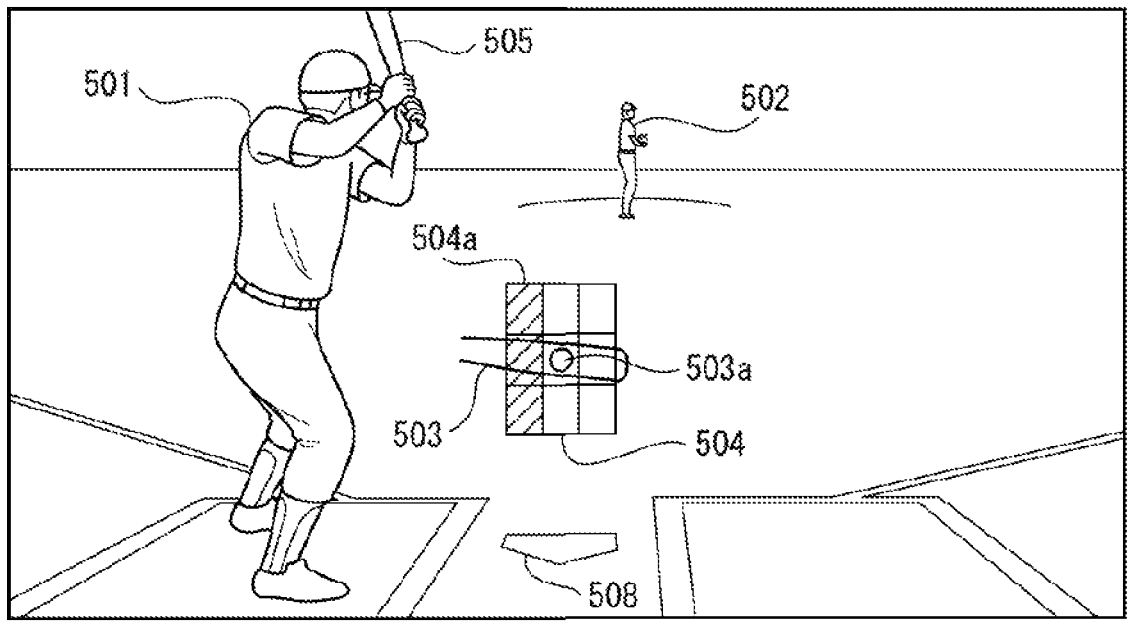
FIG. 11 is an explanatory diagram illustrating an example of the game screen of a case where an inside location is predicted by a first user.

As an example of the prediction on the pitch location, the first user makes the prediction whether the pitch location is an inside location or an outside location. For example, for the controller 19 with two sticks of left and right analog sticks, the operation of moving the meet cursor 503*a* is performed using the left analog stick, while making the prediction on the pitch location using the right analog stick. For example, when the first user tilts the analog stick for making the prediction to the left side, as illustrated in FIG. 11, a color of a left part 504*a* of the three equal divided parts (left part, center part and right part) of the strike zone 504 is changed, to be the state where the inside location for the right handed batter (the outside location for the left handed batter) is predicted. For example, in the case where the prediction on the pitch location is not made, the strike zone 504 is in generally translucent gray color, and an input for predicting the pitch location is made for the inside location for the right handed batter, the color of the left part 504*a* of the strike zone 504 is changed to a predetermined color such as translucent orange color. This is merely an example, and other than changing colors, the display state of the part corresponding to the prediction on the pitch location may be changed by changing shades, lighting, flashing or the like to notify the input state of a predicted pitch location to the first user. Thus, in the present embodiment, such an intuitive and easily understandable user interface which informs the user of the input state of the predicted pitch location can be realized using the strike zone 504.

Figure 12:
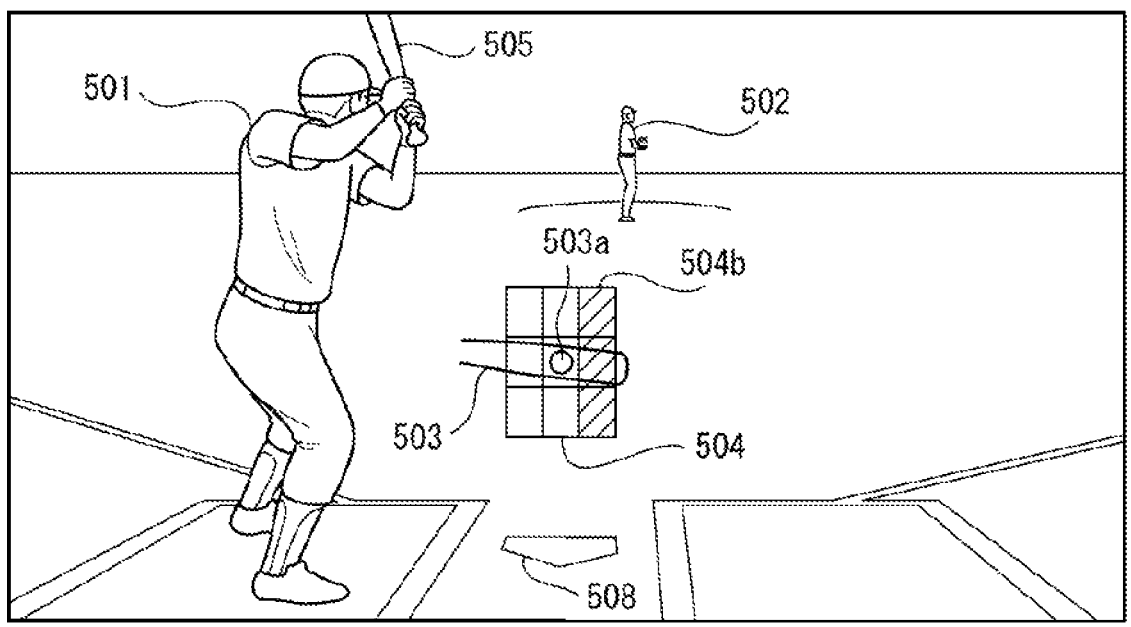
FIG. 12 is an explanatory diagram illustrating an example of the game screen of a case where an outside location is predicted by the first user.

Similarly, for example, when the first user tilts the analog stick for making the prediction to the right, as illustrated in FIG. 12, a color or the like of a right part 504*b* of the strike zone 504 is changed to the state the outside location is predicted for the right handed batter (the inside location is predicted for the left handed batter).

For the sake of convenience, in the following explanations, simple definitions of the "inside location" and the "outside location" indicate "inside location" and the "outside location" for the right handed batter respectively.

Within the time period in which the operation of making the prediction is allowed, the first user can cancel or change the input of the prediction any number of times. For example, when the first user desires to cancel the input of the prediction, by tilting the analog stick up or down, the input of the prediction currently made can be cancelled to the state where the input of the prediction is not made. Further, when the first user desires to change the input of the prediction currently made, for example, from the inside location to the outside location, the first user is able to do so by performing the operation of making a new perdition for the outside location by tilting the analog stick for making the prediction to the right. In other words, among the inputs of the prediction made within the period in which the operation of making the prediction is allowed, the last input of the prediction (the latest one) is made effective, and the input of the prediction made last by the operation of making the prediction is confirmed at the end of the period. When any operation of making the prediction is not made or the last operation is for cancelling the input of the prediction made within the time period in which the operation of making the prediction is allowed, it is confirmed that the prediction is not made by the first user.

The operation of making the prediction by the first user is not limited to the one using the analog stick of the controller 19, and this operation can be performed, for example, using the direction keys or the buttons. Further, in the case of the game device 100 with a touch panel for the screen, the operation of making the prediction can be performed by directly touching the left part 504a or the right part 504b of the strike zone 504 with the finger or the like. In this case, by touching the middle area of the strike zone 504 with the finger or the like, the input of the prediction made can be cancelled. It may be also configured that by swiping with the finger or the like, on the touch panel to the left direction, the input of the prediction can be made for the "inside location", while swiping to the right direction, the input of the prediction can be made for the "outside location", and by swiping up and down, the cancellation of the input of the prediction can be made. The above operations are given as merely examples, and other operations may be adopted.

Incidentally, in a match of the first user versus the second user, since the screens illustrated in FIG. 11 or FIG. 12 are not visible for the second user operating the pitcher character 502, it cannot be seen for the second user which pitch location is predicted by the first user on the batter side.

When the prediction on the pitch location is made by the first user, the game device 100 determines a result of the prediction. For example, in a case where the first user predicted the pitch location to be the outside location, if an actual pitch location of the ball 506 is the outside location, it is determined that the prediction made by the first user is correct. On the other hand, in the case where the first user predicted the pitch location to be the outside location, if the actual pitch location of the ball 506 is the inside location or the middle location, it is determined that the prediction made by the first user is wrong.

Figure 13:
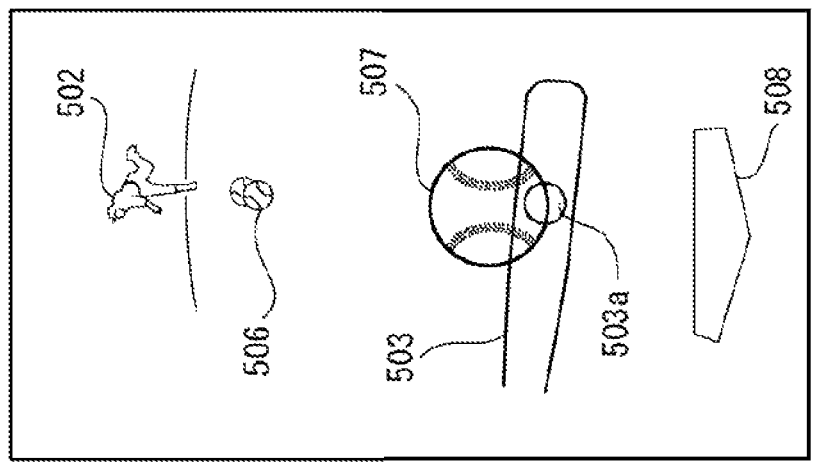
FIG. 13 is an explanatory diagram illustrating an example of the game screen of a case where a prediction on a pitch location made by the first user is correct.
Figure 14:
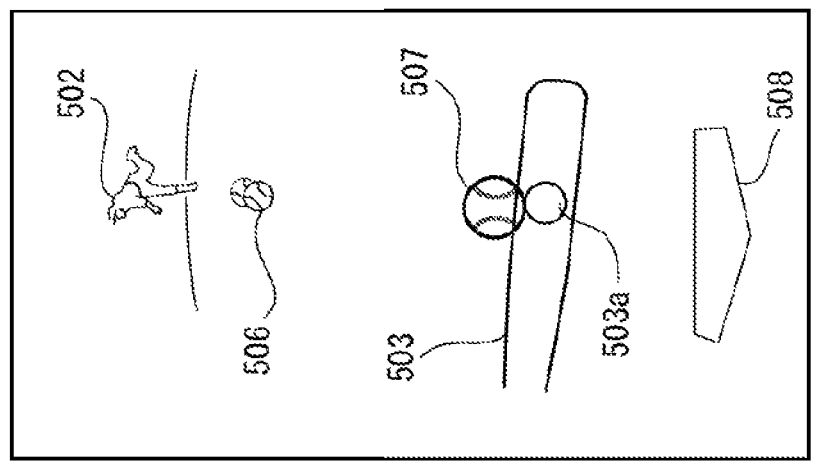
FIG. 14 is an explanatory diagram illustrating one example of the game screen of a case where the prediction on the pitch location is not made by the first user.
Figure 15:
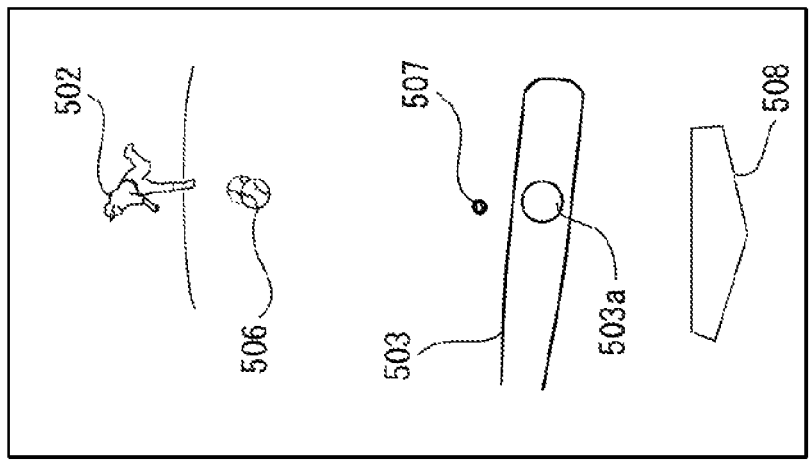
FIG. 15 is an explanatory diagram illustrating one example of the game screen of a case where the prediction on the pitch location made by the first user is wrong.

Then, in the game of the present embodiment, when the prediction on the pitch location is made by the first user, based on the result of the prediction, the size of the arrival point area 507 displayed in the active area above the home plate 508 is changed. FIG. 13 is an example of the game screen of a case where the prediction on the pitch location made by the first user is correct, FIG. 14 is an example of the game screen of a case where the prediction on the pitch location is not made, FIG. 15 is an example of the game screen of a case where the prediction on the pitch location made by the first user is wrong, and FIG. 13 to FIG. 15 show how the size of the arrival point area 507 is changed for the respective cases. Incidentally, for the sake of mainly explaining changes in size of the arrival point area 507, images of the batter character 501 and the like are omitted in FIG. 13 to FIG. 15.

As illustrated in FIG. 13, when the prediction made by the first user is correct, the size of the arrival point area 507 is increased to be larger than the size of a case where the prediction is not made (see FIG. 14). Namely, when the prediction on the pitch location made by the first user was correct, since the ball 506 pitched would be in the direction of the batter's line of sight (the first user's line of sight), the visibility of the ball 506 would be improved. The foregoing configuration artificially reproduces this situation in the game using the size of the arrival point area 507.

Therefore, when the prediction made by the first user is correct, it becomes easier for the first user to perform the selective batting between the fly ball and the grounder by respectively aiming the lower part or the upper part of the arrival point area 507, which is displayed in a larger size than a normal size (when the prediction is not made).

In a state with no out or one out and a runner on the third base, the user can enjoy the game, for example, by performing a batting operation aiming for the fly ball in the outfield which is deep enough for the runner to tag up and score. In a state with no out and the runner on the second base, the user can enjoy the game, for example, by performing the hitting operation aiming for the grounder to the right direction to advance the runner. Therefore, by making the prediction on the pitch location in the above important scene, when the prediction is correct, the arrival point area 507 would be displayed in the larger size than the normal size (when the prediction is not made), and a chance would be given to the first user to perform the batting operation as desired with ease.

It is needless to mention that the first user can make the prediction on the pitch location also in other scenes than the above described scenes as desired irrespectively of the number of outs or with or without a runner (runners) on base.

Further, as illustrated in FIG. 15, if the prediction made by the first user is wrong, the size of the arrival point area 507 is reduced to be smaller than the case where the prediction is not made (see FIG. 14). Namely, when the prediction on the pitch location made by the first user was wrong, since the ball 506 pitched would be shifted from the batter's line of sight (the first user's line of sight), the visibility of the ball 506 would be lowered. The foregoing configuration artificially reproduces this situation in the game by reducing the size of the arrival point area 507. For this reason, when the prediction is wrong, the batting operation becomes more difficult than the case where the prediction is not made, thereby making the user feel a tense atmosphere in playing the game. Namely, the first user is given a chance of making it easier to perform the batting operation by making the prediction on the pitch location in the above important scene. On the other hand, the first user has such a risk that the batting operation becomes more difficult when the prediction turns wrong, thereby realizing the game with improved amusement properties.

What is changed in size according to the result of the prediction made by the first user is just the arrival point area 507, not the ball 506 as the movable object. The size of the ball 506 released from the pitcher character 502 would not be changed irrespectively of whether or not the prediction is made nor according to the result of the prediction.

In the following, the functional configuration and the operation of the game device 100 which realizes the above described game are explained in details.

[Functional Configuration and Operations of Game Device]

Figure 16:
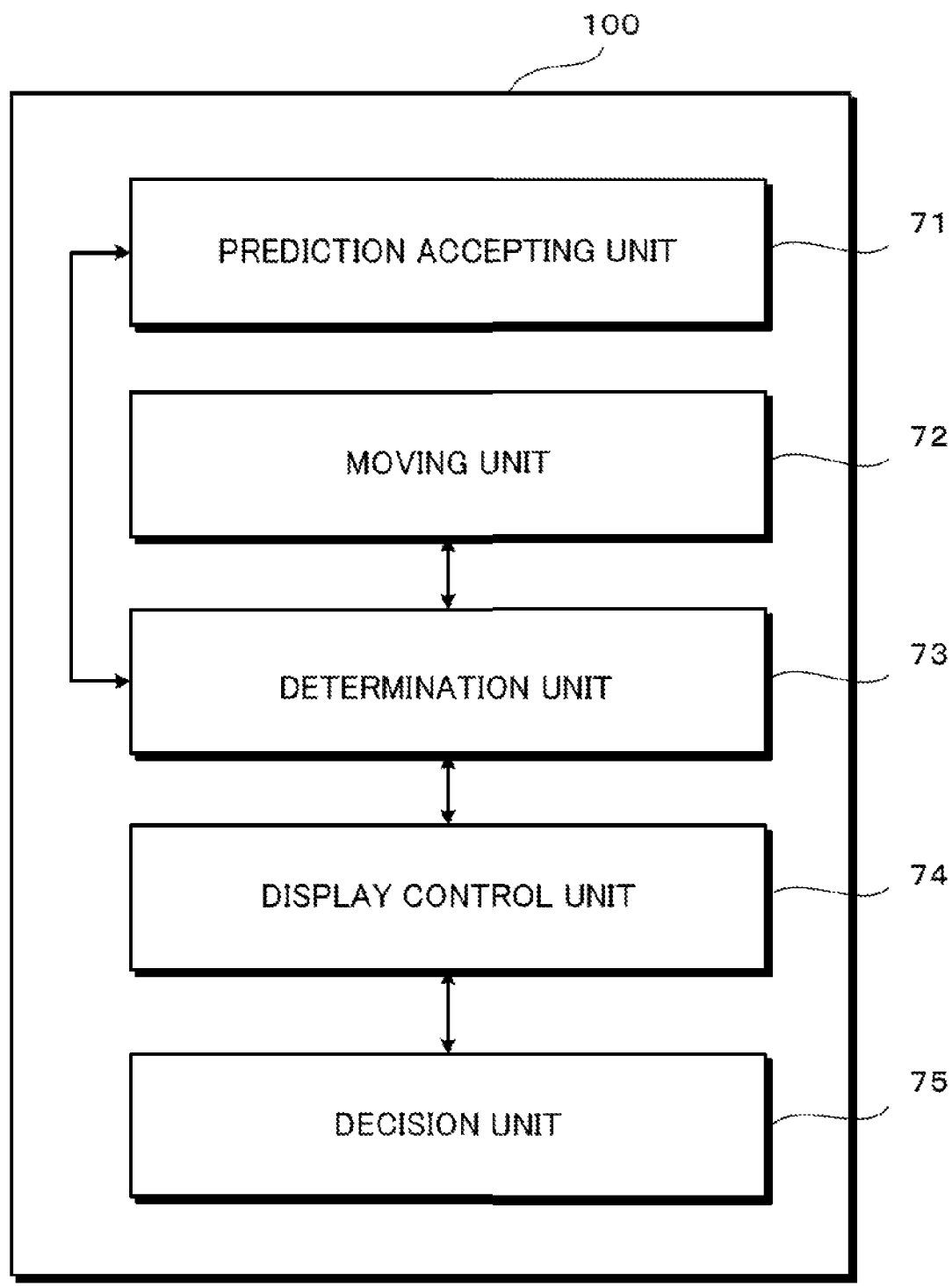
FIG. 16 is a functional block diagram illustrating an example of a major configuration of a game management device.

Next, explained is a major functional configuration of the game device 100, which controls the game in which the action is applied to the movable object referring to the functional block diagram of the FIG. 16, etc. The game device 100 of the present embodiment controls the baseball game or the softball game, in which the batter character 501 operated by the first user hits the ball thrown by the pitcher character 502 operated by the second user (or automatically controlled by the CPU).

As illustrated in FIG. 16, the game device 100 mainly comprises a prediction accepting unit 71, a moving unit 72, a determination unit 73, a display control unit 74 and a decision unit 75. These respective units are realized by the CPU 1 of the game device 100 executing the program according to the preset embodiment.

The prediction accepting unit 71 has a function of accepting the prediction made by the first user on the movement parameters of the movable object. For example, when the predetermined operation of making the prediction is performed by the first user, the prediction accepting unit 71 accepts the prediction made by the first user. In the baseball game of the present embodiment, the movable object is the ball 506 thrown by the pitcher character 502.

Other examples of the movable object include a soccer ball of the soccer game, a tennis ball of the tennis game, and the like, or other balls of a sports simulation game. Still other examples of the movable object include an aircraft or a missile or the like of the action game.

The prediction on the movement parameters of the movable object includes the prediction on the moved location of the movable object. In the baseball game of the present embodiment, the prediction on the pitch location (the prediction on the inside location or the outside location) corresponds to the prediction on the movement parameters of the movable object. This prediction on the pitch location is not limited to the prediction on the inside location or the outside location, but can be the prediction on the inside location, the middle location, or the outside location, or the prediction on a high location or a low location. Further, it may be configured to make the prediction on more specific pitch location, such as a high-and-inside location, a low-and-inside location, a high-and-outside location, a low-and-outside location, a high-and-middle location, a low-and-middle location or the like.

Furthermore, for the prediction on the pitch location, other than the above example of making the prediction on the pitch location such as the inside location, the outside location and the like, it may be configured to predict the pitch location (coordinates) of the ball in a pin-point manner.

Furthermore, the prediction regarding the movement parameters of the movable object may include the prediction on the deviations in the trajectory of the movable object being moved. In the case of the baseball game, the prediction on the pitch type (the fast ball, various types of the breaking ball) corresponds to the prediction on the deviations in the trajectory of the ball being moved.

Furthermore, predictions regarding the movement parameters of the movable object may include the prediction on the "speed" of the movable object. In the case of the baseball game, the speed of the pitched ball (for example, the ball pitched at high speed such as the fast ball, the ball pitched at low speed such as a change-up) corresponds to this type of prediction.

For example, the prediction accepting unit 71 may be configured to accept the prediction made by the first user before a predetermined deadline before the movement of the movable object starts and not to accept the prediction made by the first user after the deadline.

As described earlier, in the case of the baseball game of the present embodiment, the prediction accepting unit 71 accepts the operation of making the prediction made by the first user until the pitcher character 502 starts pitching (or the ball 506 is released from the pitcher character 502). As described earlier, whether or not to make the prediction by the first user is an arbitrary matter, and the prediction accepting unit 71 accepts the prediction made by the first user only when the first user performs the operation of making the prediction within a prediction accepting period.

The prediction accepting unit 71 stores the accepted information on the prediction (hereinafter simply referred to as "prediction information") in a storage device (for example, the RAM 5 or the like). The prediction information accepted by the prediction accepting unit 71 (i.e., the prediction information obtained based on the operation of making the prediction by the first user) may include the prediction information on at least one movement parameter of "the moved location", "the speed", "the deviations in the trajectory of the movable object being moved". Namely, the first user can make the prediction on the movement parameter regarding the movement of the movable object for one or two or more in combination of the above movement parameters.

In the case of the prediction on the pitch location, the information indicating the area for the prediction of the pitch location such as the inside location, the outside location or the like, or the coordinate information on the predicted pitch location can be set to the "prediction information" to be accepted by the prediction accepting unit 71. In the following, a concrete example of the prediction information is explained.

For example, as illustrated in FIG. 11, when the color of the left part 504a of the strike zone 504 is changed by the first user's operation of making the prediction by tilting the analog stick for the prediction operation to the left or the like, the prediction accepting unit 71 obtains the "inside location" for the prediction information. In this case, for the prediction information, the code information, for example, "1" indicating the inside location may be obtained. Similarly, as illustrated in FIG. 12, when the color of the right part 504b of the strike zone 504 is changed by the first user's operation of making the prediction by tilting the analog stick for the prediction operation to the right or the like, the prediction accepting unit 71 obtains the "outside location" for the prediction information. In this case, for the prediction information, the code information, for example, "0" indicating the outside location may be obtained.

As another example of the operation of making the prediction by the first user, it may be configured that a plurality of pitch locations such as the "inside location", the "outside location" or the like, are displayed for options on the screen, and the user can select an arbitrary pitch location for the prediction by operating the controller 19 or the like.

The first user may input the position (coordinate) of the predicted pitch location on the screen using a pointing device. Alternatively, in the case where the screen comprises the touch panel, the first user may input the position (coordinate) of the predicted pitch location on the screen by making a finger, a touch pen or the like contact onto the screen. In this case, the prediction accepting unit 71 obtains the coordinate of the pitch location as the prediction information.

Furthermore, for example, in the case of predicting the pitch type, the information on predicted pitch type, such as the fast ball, the curve ball, the slider ball or the like may be set for the "prediction information". As an example of the first user's operation of inputting a predicted pitch type, with the first user's game screen in which the pitch type selection icon 511 illustrated in FIG. 4 is displayed, the input operation of predicting the pitch type is performed using the pitch type selection icon 511 as displayed.

Furthermore, for example, in the case of predicting the speed of the pitched ball, the information on the "high speed ball", such as the fast ball or the like, the "low speed ball", such as the change-up or the like may be set for the "prediction information". As an example of the first user's operation of inputting the predicted ball speed, the "high speed ball", the "low speed ball", and the like are displayed for options on the screen, and the user can select the predicted speed of the ball by operating the controller 19 or the like. Alternatively, for example, for the ball speed, "less than 130 Km/h", "130 Km/h or faster and slower than 145 Km/h", "145 Km/h or faster" may be displayed for options on the screen, and the user can select the predicted ball speed by operating the controller 19 or the like.

In the following, explained is a preferable example in which the first user performs the operation of making the prediction on the pitch location, and the prediction accepting unit 71 which accepts this prediction obtains the information on the predicted pitch location as the prediction information. In the following, the explanation continues in a case of the prediction accepting unit 71 configured to obtain information on the predicted pitch location of the ball.

Next, the moving unit 72 is explained. The moving unit 72 has a function of deciding the movement parameters of the movable object. Further, the moving unit 72 moves the movable object on the screen based on the movement parameter as decided. In this baseball game, in a match mode of the first user versus the second user, with the second user's operation for determining the pitch location and the pitch type as the movement parameters of the ball thrown by the pitcher character 502, the moving unit 72 decides the pitch location and the pitch type as the movement parameters based on the operation, and moves the ball toward the batter character 501 based on the movement parameters. The operation for deciding the pitch location and the pitch type by the second user can be performed, for example, by using the pitch type selection icon 511 and the location specifying cursor 512 illustrated in FIG. 4.

Furthermore, in a case the first user plays the game alone in the Versus CPU mode, the moving unit 72 automatically decides the movement parameters of the ball, such as the pitch type, the pitch location or the like, and moves the ball toward the batter character 501.

Next, the determination unit 73 is explained. The determination unit 73 has the function of determining the result of the prediction made by the first user based on information on the prediction made by the first user (i.e., the movement parameter predicted by the first user) which is accepted by the prediction accepting unit 71 and the movement parameter decided by the moving unit 72.

It may be configured that the determination on the result of the prediction made by the determination unit 73 is the determination on propriety (correct or wrong) of the prediction made by the first user. For example, in a case where the outside location was predicted by the first user, and the actual pitch location of the ball decided by the moving unit 72 is the outside location, it is determined that the prediction made by the first user is correct. On the other hand, when the actual pitch location of the ball decided by the moving unit 72 is other than the outside location, it is determined that the prediction made by the first user is wrong.

Furthermore, the determination on the result of the prediction by the determination unit 73 can be the determination on a degree of coincidence of the prediction. Here, the degree of coincidence can be the degree of coincidence between the information on the prediction made by the first user (i.e., the movement parameters predicted by the user) accepted by the prediction accepting unit 71 and the actual movement parameter decided by the moving unit 72, which can be expressed, for example, as a value or a level.

For example, the degree of coincidence may be expressed by two levels using two values or two levels, i.e., the value "1" or the level "A" is set for the degree of coincidence when the movement parameter predicted by the user and the actual movement parameter coincide, and the value "0" or the level "B" is set for the degree of coincidence when the movement parameter predicted by the user and the actual movement parameter do not coincide. For example, in a case where the pitch location predicted by the first user is the inside location, the degree of coincidence can be evaluated by two levels depending on whether the actual pitch location is the inside location or not, which is substantially the same as the determination on propriety (correct or wrong) of the prediction made by the first user.

The degree of coincidence between the prediction information for the movement parameter and the actual movement parameter may be expressed by three or more levels using three or more values or levels. For example, it may be configured to divide the active area above the home plate 508 into three areas, i.e., the inside location, the middle location and the outside location. For example, the strike zone 504 is equally divided into three areas of left, middle and right areas, and the middle area is set to a middle location area, the area inside of the middle area is set to an inside location area, and the area outside of the middle area is set to an outside location area respectively. Then, in a case where the predicted pitch location is the inside location, when the actual pitch location is the inside location, the degree of coincidence is a value "2" or a "level A (maximum)", when the actual pitch location is the middle location, the degree of coincidence is a value "1" or a "level B", and when the actual pitch location is the outside location, the degree of coincidence is a value "0" or a "level C (minimum)". On the other hand, in a case where the predicted pitch location is the outside location, when the actual pitch location is the outside location, the degree of coincidence is the value "2" or the "level A", when the actual pitch location is the middle location, the degree of coincidence is the value "1" or the "level B", and when the actual pitch location is the inside location, the degree of coincidence is the value "0" or the "level C". In a case where the predicted pitch location is the middle location, when the actual pitch location is the middle location, the degree of coincidence is the value "2" or the "level A", when the actual pitch location is the inside location or the outside location, the degree of coincidence is the value "1" or the "level B".

Figure 17:
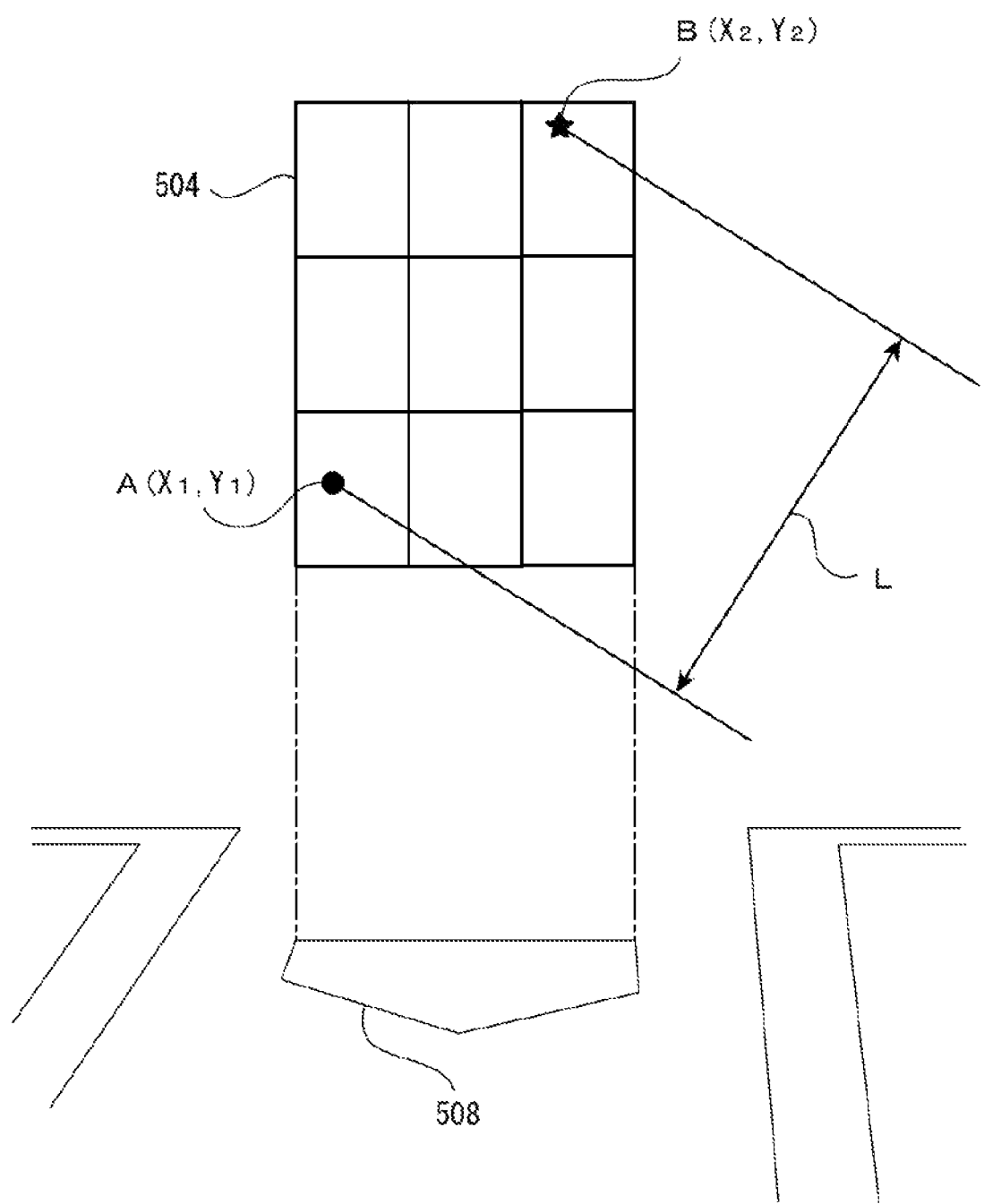
FIG. 17 is an explanatory diagram explaining a degree of coincidence of the prediction.

In a case where the prediction information is coordinate information of the predicted pitch location, the degree of coincidence may be computed based on a shift amount (distance L) between a coordinate of the predicted pitch location and a coordinate of the actual pitch location. For example, as illustrated in FIG. 17, in an XY plane (active area) including the strike zone 504 on the screen, assumed that a coordinate of the pitch location predicted by the first user is A(X1, Y1), a coordinate of the actual pitch location decided by the moving unit 72 is B(X2, Y2). Then, the degree of coincidence M is computed, for example, using the following formula (1) based on the distance L between the coordinate A and the coordinate B.

$$M = a - \sqrt{\{(X2-X1)^2 + (Y2-Y1)^2\}} \quad (1)$$

In the above formula (1), "a" is a constant, and an arbitrary value can be set for "a". For example, a distance of a diagonal of the strike zone 504 can be set for "a".

Next, the display control unit 74 is explained. The display control unit 74 has a function of displaying the arrival point area 507 indicating a position where the movable object arrives in the active area in which the action can be applied to the movable object. According to the baseball game of the present embodiment, the active area indicates the hittable area including the strike zone 504 and the ball zone around the strike zone 504, i.e., the area above the home plate 508. The display control unit 74 displays the arrival point area 507 at the expected arrival position of the ball 506 at which the ball 506 pitched will arrive or arrive and pass therethrough).

The display control unit 74 may be configured to display the arrival point area 507 immediately after pitching, or may display the arrival point area 507 after a predetermined time (for example, 0.1 seconds) has elapsed from pitching.

In a case where the pitcher character 502 throws the breaking ball, the trajectory of the ball 506 being moved deviates. In this case, as described earlier, the location of the arrival point area 507 is changed with the movement of the ball 506 (see FIG. 7). Incidentally, even in the case of the breaking ball, it may be configured to stationary display the arrival point area 507 at the expected final arrival position from the beginning of the display of the arrival point area 507 without changing the position of the arrival point area 507.

Then, the display control unit 74 has a function of changing the size of the arrival point area 507 based on the result of a determination by the determination unit 73. As described earlier, the arrival point area 507 indicates the expected arrival position of the ball 506 in the active area above the home plate 508, and it is possible to make a hit by superimposing the aiming cursor 503 onto the arrival point area 507. In other words, the change in size of the arrival point area 507 would affect the difficulty level of the batting operation.

It is preferable that when the determination unit 73 determines that the prediction made by the first user is correct, the display control unit 74 displays the arrival point area 507 in the larger size than the size of the case where the prediction is not made. For example, assumed that a radius of the arrival point area 507 of the case where the prediction is not made is R0, and a radius of the arrival point area 507, as changed based on the determination on the result of the prediction is R1. Then, when it is determined that the prediction made by the first user is correct, the size of the arrival point area 507 can be decided, for example, by applying the following formula (2) or (3).

$$R1 = R0 + b \quad (2)$$

$$R1 = c \times R0 \quad (3)$$

In the above formulae, "b" and "c" are constants, and b>0, and c>1. As an example, given b=0.3, the above formula (2) is applied. However, this merely shows an example, and other operational expression may be applied.

Furthermore, it may be configured to store the information on respective sizes of the arrival point area 507 in the storage device (the RAM 5 or the like) beforehand for the respective cases where the prediction is not made, and where the prediction is made and correct, and further configured to decide the size of the arrival point area 507 based on the information stored in the storage device.

With this configuration, as illustrated in FIG. 13, when the prediction made by the first user is correct, the arrival point area 507 is displayed in the larger size than the size of the case where the prediction is not made (see FIG. 14). Namely, when the prediction on the pitch location made by the first user is correct, since the ball 506 pitched would be in the direction of the batter's line of sight (the first user's line of sight), the visibility of the ball 506 would be improved. The foregoing configuration artificially reproduces this situation in the game using the size of the arrival point area 507.

Similarly, also in a case where the prediction made by the first user is the prediction on the pitch type or the speed of the pitched ball, when the prediction is correct, the size of the arrival point area 507 becomes larger than the size of the case where the prediction is not made. Namely, when the first user made the prediction on the pitch type, and the prediction was correct, since the batter's eyes would be likely to follow the deviations in the trajectory of the ball 506 being moved, the visibility to the ball 506 would be improved. The foregoing configuration artificially reproduces this situation in the game using the size of the arrival point area 507. Furthermore, when the first user made the prediction on the ball speed (for example, a high speed ball or a change-up), and the prediction was correct, since the batter's eyes would be likely to follow the speed of the ball 506, the visibility to the ball 506 would be improved. The foregoing configuration artificially reproduces this situation in the game using the size of the arrival point area 507.

Therefore, when the prediction made by the first user is correct, it becomes easier for the first user to aim a desired part in the arrival point area 507 which is displayed in the larger size, and the difficulty level of the batting operation is reduced. Therefore, it becomes easier for the first user to perform the selective batting between the fly ball and the grounder by respectively aiming the lower part or the upper part of the arrival point area 507, which is displayed in the larger size. In addition, since the arrival point area 507 itself is large in size, it becomes easier to make the aiming cursor 503 be superimposed onto the arrival point area 507, whereby it is less likely to swing and miss the ball.

It is preferable that when the determination unit 73 determines that the prediction made by the first user is wrong, the display control unit 74 displays the arrival point area 507 in a smaller size than the size of the case where the prediction is not made. The size of the arrival point area 507 of the case where the prediction made by the first user is wrong can be decided, for example, by applying the following formula (4) or (5).

$$R1 = R0 - d \quad (4)$$

$$R1 = e \times R0 \quad (5)$$

In the above formulae, "d" and "e" are constants, and d>0, and d<R0. Further, e>0, and e<1. As an example, given d=0.3, the above formula (4) is applied. However, this merely shows an example, and other operational expression may be applied.

Furthermore, it may be configured to store the information on respective sizes of the arrival point area 507 in the storage device (the RAM 5 or the like) beforehand for the respective cases where the prediction is not made, the prediction is made and correct, and the prediction is made and wrong, and further configured to decide the size of the arrival point area 507 based on the information stored in the storage device.

According to the foregoing configuration, as illustrated in FIG. 15, when the prediction made by the first user is wrong, the size of the arrival point area 507 becomes smaller than the size of the case where the prediction is not made (see FIG. 14). Namely, when the prediction on the pitch location made by the first user was wrong, since the ball 506 pitched would be shifted from the batter's line of sight, the visibility of the ball 506 would be lowered. The foregoing configuration artificially reproduces this situation in the game by reducing the size of the arrival point area 507.

Similarly, also in a case where the prediction made by the first user is the prediction on the pitch type or the ball speed, when the prediction is wrong, the size of the arrival point area 507 becomes smaller than the size of the case where the prediction is not made. Namely, when the first user made the prediction on the pitch type, and the prediction was wrong, since the batter's eyes would not be able to follow the deviations in the trajectory of the ball 506 being moved, the visibility to the ball 506 would be lowered. This situation is artificially produced in the game by reducing the size of the arrival point area 507. Furthermore, when the first user made the prediction on the speed of the pitched ball (for example, a high speed ball or a change-up), and the prediction was wrong, since the batter's eyes would not be able to follow changes in the speed of the ball 506 pitched, the visibility to the ball 506 would be lowered. The foregoing configuration artificially reproduces this situation in the game by reducing the size of the arrival point area 507.

Therefore, when the prediction made by the first user is wrong, it becomes more difficult for the first user to superimpose the aiming cursor 503 onto the arrival point area 507 displayed in the smaller size, and it is more likely to swing and miss the ball. Furthermore, since the size of the arrival point area 507 is small, it becomes more difficult for the first user to perform the selective batting between the fly ball and the grounder by respectively aiming the lower part or the upper part of the arrival point area 507. For this reason, when the prediction made by the first user is wrong, the batting operation becomes more difficult than the case where the prediction is not made, thereby making the user feel a tense atmosphere in playing the game.

Namely, the first user is given a chance of making it easier to perform the batting operation by making the prediction on the pitch location or the like in the above important scene. On the other hand, the first user has such a risk that the batting operation becomes more difficult when the prediction turns wrong, thereby realizing the game with improved amusement properties.

The display control unit 74 may be configured to increase the size (display area) of the display area of the arrival point area 507 in such a manner that the higher is the degree of coincidence of the prediction determined by the determination unit 73, the larger is the size of the arrival point area 507. As explained earlier, the degree of coincidence of the prediction may be computed, for example, based on the shift amount (distance) between the coordinate of the pitch location predicted by the user and the coordinate of the actual pitch location in such a manner that the smaller is the shift amount, the higher is the degree of coincidence.

For example, when the degree of coincidence of the prediction is at or above a predetermined threshold value or level, it is determined that the prediction is correct, and the arrival point area 507 is displayed in the larger size than the size of the case where the prediction is not made. Further, in this case, the size of the arrival point area 507 may be continuously or stepwise increased in such a manner that the higher is the degree of coincidence of the prediction, the larger is the size of the arrival point area 507.

For example, when the degree of coincidence of the prediction is below the predetermined threshold value or level, it is determined that the prediction made by the user is wrong, and the arrival point area is displayed in the smaller size than the size of the case where the prediction is not made. Further, in this case, the size of the arrival point area is continuously or stepwise reduced in such a manner that the lower is the degree of coincidence of the prediction, the smaller is the size of the arrival point area. In this way, the difficulty level of the batting operation is increased.

Next, concrete examples of changing the size of the arrival point area 507 based on the degree of coincidence of the prediction are shown. For example, the size of the arrival point area 507 can be determined by applying the following formula (6), wherein "R0" is a radius of the arrival point area 507 when the prediction is not made, "R1" is a radius of the arrival point area 507 as changed based on the determination on the result of the prediction, and "M" is the degree of coincidence of the prediction computed by the previous formula (1).

$$R1=(2M/a)\times R0 \quad (6)$$

In the above formula (6), "a" is a constant as in the case of the above formula (1). In the case of the above formula (6), when the degree of coincidence of the prediction M satisfies the condition of M>(a/2), the size of the arrival point area 507 becomes larger than the size of the case where the prediction is not made. On the other hand, when the degree of coincidence of the prediction M satisfies the condition of M<(a/2), the size of the arrival point area 507 is reduced to be smaller than the size of the case where the prediction is not made. However, this merely shows an example, and other operational expression may be applied.

It may be also configured to decide the size of the arrival point area 507 based on information indicating a relationship between the degree of coincidence of the prediction and the size of the arrival point area 507. For example, it may be configured such that the information of a table showing the relationship between the degree of coincidence of the prediction and the size of the arrival point area 507 is stored in the recording medium 300 in which the game program is recorded, and the information of the table is loaded into the RAM 5 when executing the game. In this case, the display control unit 74 sets the size of the arrival point area 507 corresponding to the degree of coincidence of the prediction based on the above table.

As described, by changing the size of the arrival point area 507 according to the degree of coincidence of the prediction, it is possible to accurately reflect this degree of coincidence of the prediction to the difficulty level of the batting operation, thereby realizing the game with high amusement properties.

By the way, it may be configured that when the prediction made by the first user on the pitch location or the like is correct, the batting power of the batter character 501 is increased to be higher than the batting power of the case where the prediction is not made, and when the prediction made by the first user is wrong, the batting power of the batter character 501 is reduced to be lower than the batting power of the case where the prediction is not made. However, with this configuration, it is difficult for the first user who performs the batting operation to feel the reality of the change in the batting power based on propriety (correct or wrong) of the prediction. Namely, even when the first user could make a hit consequently, it would be difficult for the first user to clearly recognize whether the hit could be made with the improved batting power resulting from the correct prediction, or the hit could be made with his/her good skill of the batting operation. Similarly, even when the result of batting was a mishit, it would be difficult for the first user to clearly recognize whether the mishit was made with a reduced batting power resulting from the wrong prediction, or the mishit was made with his/her poor skill of the batting operation. This is because, even with an improved batting power, if the batting operation cannot be performed well (i.e., the center of the meet cursor 503*a* and the center of the arrival point area 507 are apart from one another), the result of batting would be a mishit or swinging and missing the ball. On the other hand, even with a reduced batting power, if the batting operation can be performed well (for example, the arrival point area 507 can be hit at around the center of the meet cursor 503*a*), it is still possible to make a well-tagged hit.

On the contrary, according to the configuration of the game device 100 of the present embodiment, the result of the prediction made by the first user is reflected not in the form of changes in batting power (not only in the form of changes in batting power), but (also) in the form of changes in size of the arrival point area 507, i.e., the visibility of the ball 506. With this configuration, since the result of the prediction is clarified as the size of the arrival point area 507 displayed on the screen, it is possible to make the first user clearly recognize the advantage resulting from the correct prediction (or disadvantage resulting from the wrong prediction). As a result, when the prediction is made, it is possible to enhance the elation atmosphere and the tense atmosphere in playing the game, thereby realizing improved amusement properties of the game.

Next, the decision unit 75 is explained. The decision unit 75 has a function of deciding the action to be applied to the movable object based on the positional relationship between the specific area and the arrival point area 507 when the specific area for applying the action to the movable object is specified within the active area based on a predetermined operation by the first user.

In the example of the baseball game, the above predetermined operation includes the operation of moving the aiming cursor 503 to an arbitrary position, an operation of specifying a hitting area with the bat by directly touching the arbitrary position on the screen with the finger, the pen or the like. With the foregoing predetermined operation, it is possible to specify the specific area (in the case of a baseball, the hitting area with the bat) in the active area. For example, the aiming cursor 503 (the area the aiming cursor 503 exists) at timing the ball 506 arrives at the active area can be the specific area specified based on the predetermined operation (cursor moving operation) of the first user. Then, the decision unit 75 decides the action (the result of batting) to be applied to the ball 506 based on the positional relationship between the aiming cursor 503 as the specific area and the arrival point area 507. For example, as described above, when the arrival point area 507 and the meet cursor 503*a* are apart from one another, the result of batting would be swinging and missing the ball, when the aiming cursor 503 is overlapped with the lower part of the arrival point area 507, the ball batted would be the fly ball, and when the aiming cursor 503 is overlapped with the upper part of the arrival point area 507, the ball batted would be the grounder.

Namely, there is a correlation between the arrival point area 507 and the ball 506, and when an operation of aiming a desired part of the arrival point area 507 with the aiming cursor 503, this operation is reflected in batting the ball 506 pitched. In the present embodiment, the arrival point area 507 and the ball 506, which correspond to one another, are mutually similar in shape. Therefore, the operation of making the aiming cursor 503 be superimposed onto the lower part of the arrival point area 507 corresponds to the operation of batting the lower part of the ball 506 corresponding to the lower part of the arrival point area 507. Namely, the shape of the arrival point area is in similarity relation with and corresponds to or substantially corresponds to the shape of the movable object when the movable object arrives at the arrival point area. As illustrated in FIG. 13 to FIG. 15, even when the size (area) of the arrival point area 507 is changed according to the result of the prediction made by the first user, the shape of the arrival point area 507 is still in similarity relation with the shape of the movable object.

Figure 18:
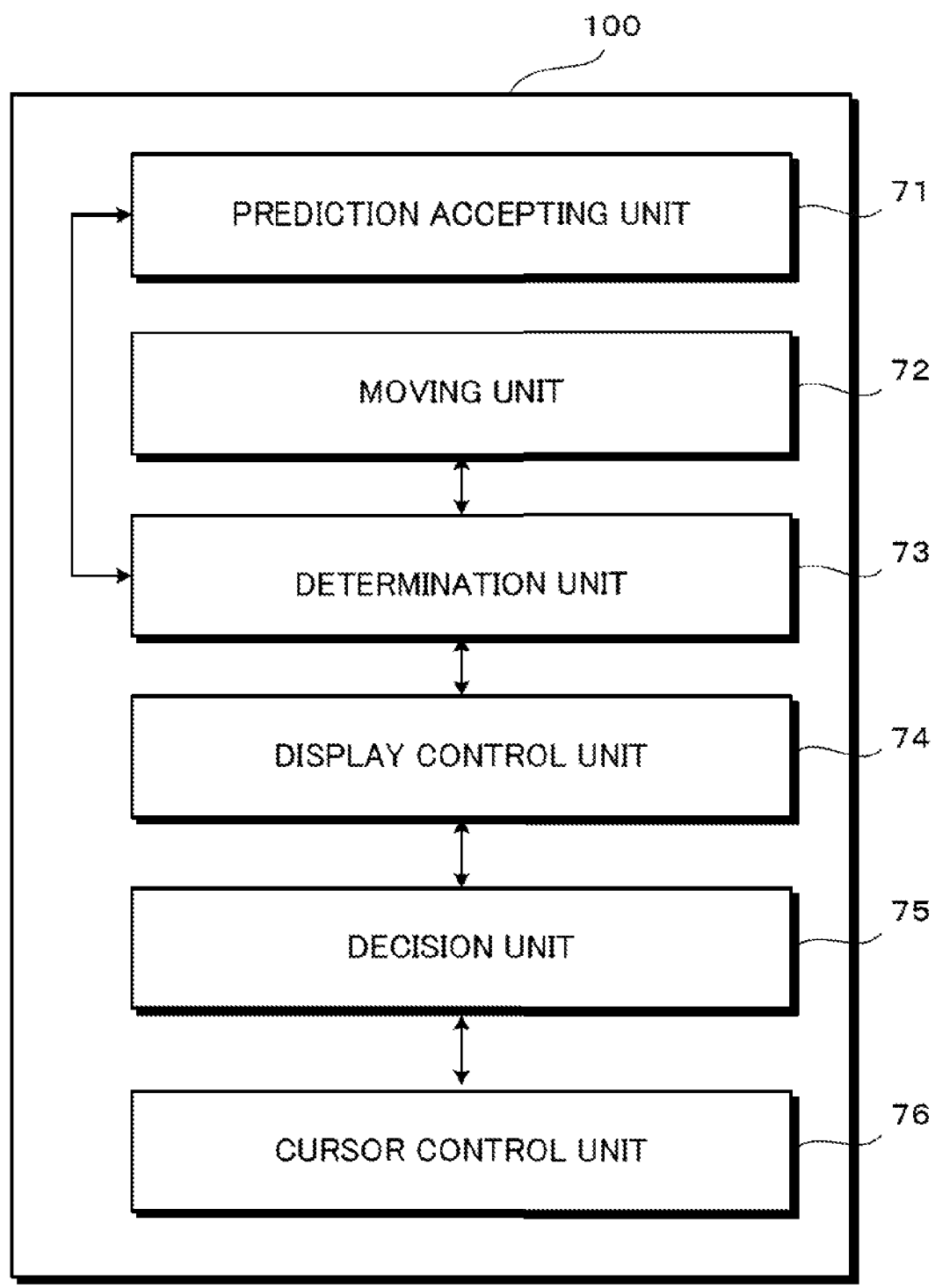
FIG. 18 is a functional block diagram illustrating another example of the major configuration of the game management device.

In the game of the present embodiment, the aiming cursor 503 is used to specify the specific area, i.e., an area in which the ball is hit with the bat. In this case, as illustrated in FIG. 18, the game device 100 comprises a cursor control unit 76. This cursor control unit 76 has a function of moving the aiming cursor 503 according to the operation of the first user. For example, with the first user's operation using the analog stick, the direction keys or the like of the controller 19, the cursor control unit 76 changes the position of the aiming cursor 503 on the screen according to this operation. The first user's operation of moving the aiming cursor 503 can be performed at timing after the ball is released from the pitcher character 502 as a matter of course, and also at timing before the ball is released.

In the case of the game device 100 adopting the touch panel for the screen, it may be configured such that the first user performs the operation of moving the aiming cursor 503 displayed on the screen by touching the screen with his/her finger, the pen or the like. Here, the first user can also perform the operation of moving the aiming cursor 503 by directly touching the aiming cursor 503 with his/her finger. In this case, however, the aiming cursor 503, the ball 506, or the arrival point area 507 would be partially hidden by the first user's finger, which would impair operability.

Figure 19:
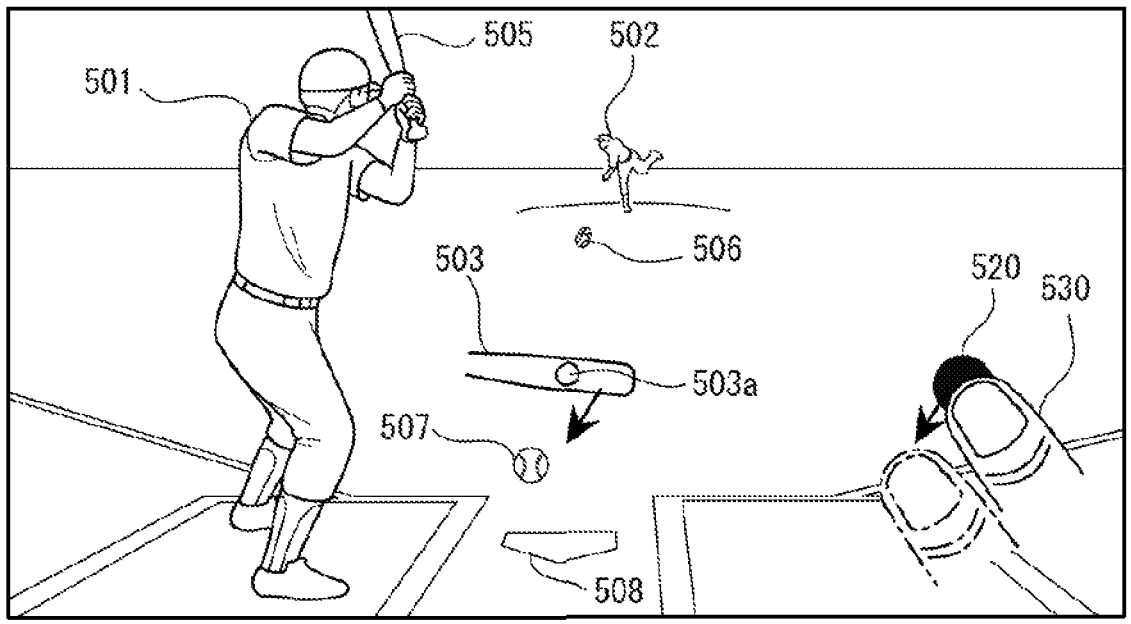
FIG. 19 is an explanatory diagram illustrating another example of the game screen of the user on the batter side.

In view of the foregoing, as illustrated in FIG. 19, it is preferable that an operation icon 520 for moving the aiming cursor 503 is displayed at a different position from the aiming cursor 503 on the screen. With this configuration, the aiming cursor 503 is moved as the operation icon 520 moves, while maintaining the relative positional relationship with the operation icon 520. The operation of moving the operation icon 520 can be performed by dragging the operation icon 520 on the screen while maintaining a finger 530 in contact with the operation icon 520 without lifting up the finger 530 from the screen. Since the aiming cursor 503 is moved as the operation icon 520 is moved, the first user can move the aiming cursor 503 indirectly by dragging the finger 530 on the operation icon 520 which is displayed in a different area from the aiming cursor 503 without directly contacting the aiming cursor with the finger 530.

Figure 20:
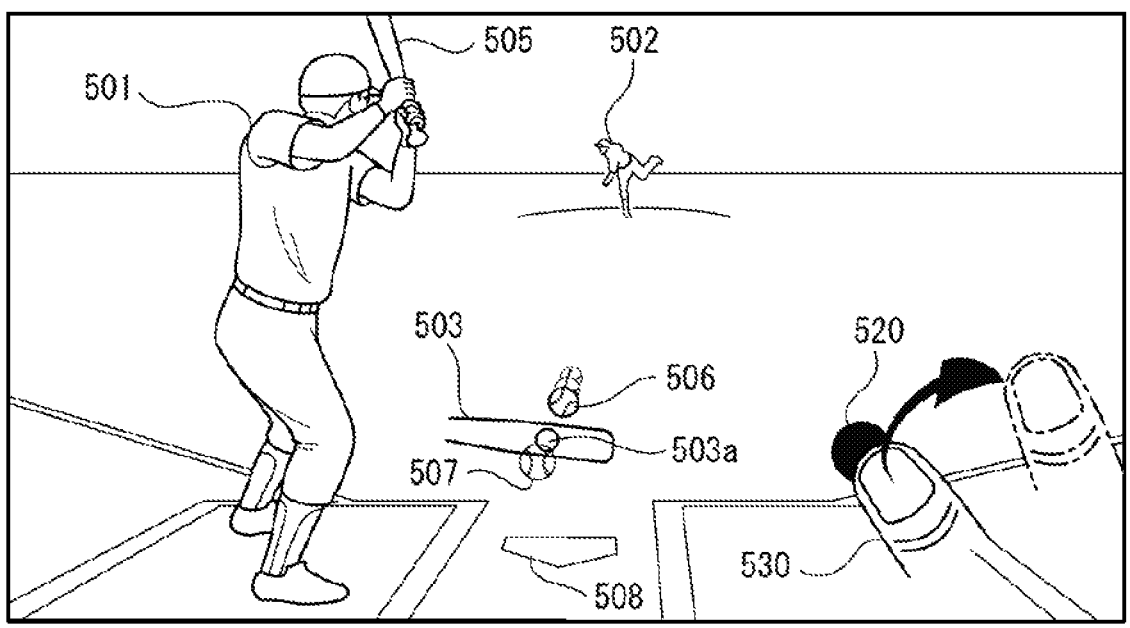
FIG. 20 is an explanatory diagram illustrating another example of the game screen of the user on the batter side.

Since the ball 506 thrown by the pitcher character 502 approaches to the side of the home plate 508, while selecting the timing at which the ball 506 arrives at above the home plate 508, the first user removes the finger 530 in contact with the operation icon 520 from the screen. As illustrated in FIG. 20, at timing the first user removes the finger 530 from the screen, the batter character 501 swings the bat. Namely, in this configuration, the operation of swinging the bat is an operation of removing the finger 530 from the screen. As described, according to this configuration, it is possible to smoothly perform both the operation of moving the aiming cursor 503 and the operation of swinging the bat by dragging and dropping one finger 530. Moreover, since the aiming cursor 503, the ball 506 and the arrival point area 507 are displayed without being hidden with the finger 530, it is possible to realize a good operability with excellent visibility of the screen.

In the above examples illustrated in FIG. 19 and FIG. 20, it is configured as an example that the strike zone 504 is made transparent to be invisible after pitching.

Incidentally, although FIG. 19 shows an example in which the operation icon 520 for performing the operation of moving the aiming cursor 503 is shown on the right hand side of the screen. However, it is not intended to be limited to this example. Namely, the operation icon 520 can be displayed at an arbitrary position on the screen different from the display position of the aiming cursor 503. Namely, for example, the operation icon 520 may be displayed on the left hand side of the aiming cursor 503, or above the pitcher character 502.

Further, in the following manner, it is possible to perform the operation of moving the aiming cursor 503 in the same manner as the above example, without using the operation icon 520. Namely, the first user contacts an arbitrary position (different position from the aiming cursor 503) with the finger 530 on the screen. In this case, the game device 100 obtains the coordinate position at which the finger 530 contacts the screen. Thereafter, even when the finger 530 moves on the screen, the relative positional relationship between the contact position of the finger 530 and the position of the aiming cursor 503 is maintained. Therefore, when the first user moves the finger 530 while maintaining the finger 530 in contact with the screen (i.e., dragging), the aiming cursor 503 is moved as the operation icon 520 is moved while maintaining the relative positional relationship with the contact position of the finger 530. In this case also, the operation of swinging the bat is performed at timing the first user removes the finger 530 from the screen.

In the above described baseball game, the example have been given in which the aiming cursor 503 is displayed on the screen, and the batting operation is performed by superimposing the aiming cursor 503 onto the arrival point area 507. Other than this example, when adopting the touch panel for the screen, it may be configured to perform the batting operation by directly touching an arbitrary position on the screen with the user's finger or the pen.

Figure 21:
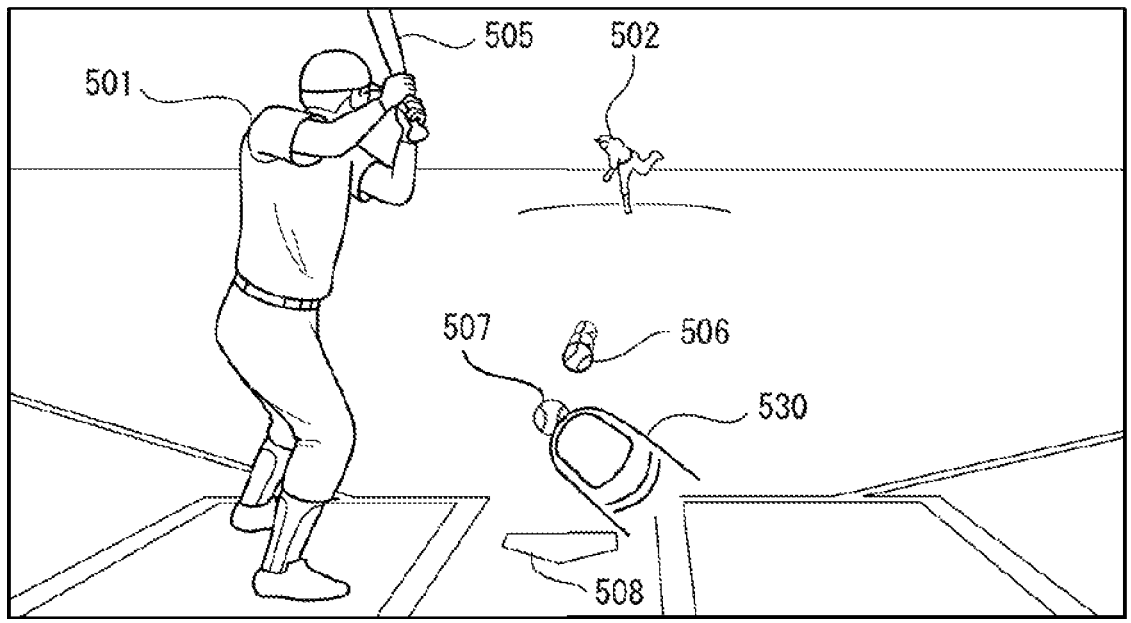
FIG. 21 is an explanatory diagram illustrating another example of the game screen of the user on the batter side.
Figure 22:
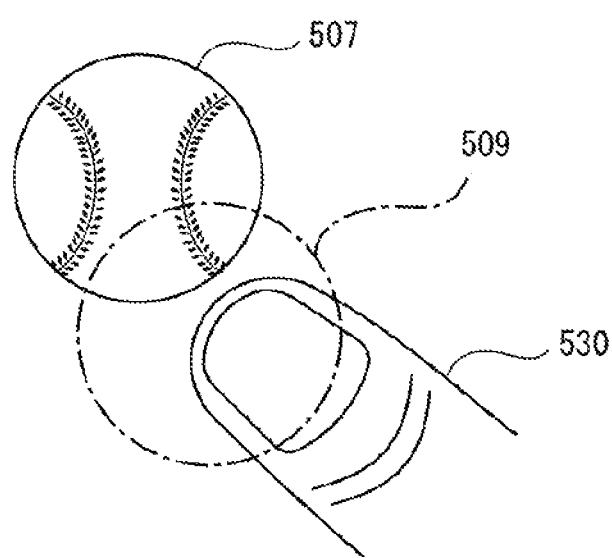
FIG. 22 is an explanatory diagram explaining an example where a specific area is set by touching the screen with a finger.

In the foregoing configuration, as illustrated in FIG. 21, the first user touches the screen with his/her finger 530 to be overlapped with the arrival point area 507 while selecting a timing at which the ball 506 arrives at above the home plate 508. In this case, as illustrated in FIG. 22, the game device 100 recognizes the coordinate position at which the finger 530 contacts, and sets the range of a predetermined area around this coordinate position as a center to the specific area 509 in which the ball can be hit with the bat. Then, at a predetermined hittable timing at which the ball 506 arrives at the active area or in the vicinity of the active area above the home plate 508, if the specific area 509 specified by touching with the finger 530 is overlapped with the arrival point area 507, the ball 506 would be hit by the bat object 505.

In the example of FIG. 22, the specific area 509 has a circular shape as an example. However, the shape of the specific area 509 can be set arbitrarily. For example, the specific area 509 may have a bat shape similar to the shape of the aiming cursor 503 illustrated in FIG. 8.

Alternatively, the following variations may be adopted. That is, the first user contacts the screen with the finger 530 before the ball 506 arrives at above the home plate 508, and moves (drags) the finger 530 on the arrival point area 507 without lifting up the finger 530 from the screen. Then, while watching timing the ball 506 arrives at above the home plate 508, the user removes the finger 530 from the screen or swipes the finger 530 across the screen in a predetermined direction (for example, in a desired batting direction) and then removes the finger 530 from the screen. Then, the operation of swinging the bat is performed at timing the finger 530 is removed from the screen. In this case also, the game device 100 recognizes the coordinate position on the screen at which the finger 530 contacts, and the range of a predetermined area around this coordinate position as a center is set to the specific area 509 in which the ball can be hit with the bat. Then, at the predetermined hittable timing at which the ball 506 arrives at the active area or in the vicinity of the active area above the home plate 508, if the specific area 509 specified by touching with the finger 530 is overlapped with the arrival point area 507, and the finger 530 is removed from the screen, the ball 506 would be hit by the bat object 505.

Also in the foregoing configuration wherein the first user specifies the specific area 509 by contacting with the finger 530 or the like, when the arrival point area 507 and the specific area 509 are apart from one another, the result of batting would be swinging and missing the ball, when the specific area 509 is overlapped with the lower part of the arrival point area 507, the ball batted would be the fly ball, and when the specific area 509 is overlapped with the upper part of the arrival point area 507, the ball batted would be the grounder.

As described above, the game device 100 of the present embodiment controls the baseball (or softball) game in which the batter character 501 operated by the user hits the ball 506 thrown by the pitcher character 502. As a preferable configuration, this game device 100 comprises the prediction accepting unit 71 configured to accept the prediction made by the user regarding the pitch location when the predetermined operation of making the prediction is performed by the user; the moving unit 72 as the pitch location determination unit which determines the pitch location; the determination unit 73 configured to determine a result of the prediction made by the user based on the information regarding the prediction made by the user as accepted by the prediction accepting unit 71 and the pitch location decided by the moving unit 72; the display control unit 74 configured to display the arrival point area 507 indicating the position (expected position) at which the ball 506 is expected to arrive; the decision unit 75 configured to decide the result of batting based on the positional relationship between the specific area and the arrival point area 507 when the specific area for batting the ball 506 is specified in the active area based on the predetermined batting operation of the user. Further, when the determination unit 73 determines that the prediction made by the user is correct, the display control unit 74 increases the size of the arrival point area 507 to be larger than the size of the case where the prediction is not made. On the other hand, when the determination unit 73 determines that the prediction made by the user is wrong, the display control unit 74 reduces the size of the arrival point area 507 to be smaller than the size of the case where the prediction is not made.

By the way, in the baseball game, since the game progresses while switching the offense side and the defense side inning by inning, the user can perform operations of playing the game both on the batter character side and the pitcher character side. When the user performs operations of playing a game operation on the batter side, the user plays as "the first user", and when the user performs operations of playing the game operation on the pitcher side, the user plays as "the second user".

In the case where two users perform the online match by respectively operating their own game devices 100, the game device 100 of either one of the users may also function as a server, and the game device 100 of the other user may also function as a client. It may be also configured that the both game devices 100 which perform the online match cooperate each other while distributing functions.

For example, the movement parameter of the ball 506 decided by the moving unit 72 of the game device 100 of the second user on the pitcher side is transmitted to the game device 100 of the first user on the batter side. Then, the moving unit 72 of the game device 100 of the first user moves the ball 506 released from the pitcher character 502 on the basis of the movement parameter received from the game device 100 of the second user. Furthermore, the information on the result of batting decided by the decision unit 75 of the game device 100 of the first user is also transmitted to the game device 100 of the second user.

When the user plays the game alone in the Versus CPU mode, and the user plays the game as the "first user" who operates the batter character 501, the CPU 1 of the game device 100 controls pitching of the pitcher character 502 by the automatic control based on an AI program (Artificial Intelligence Program) or the like. For example, the moving unit 72 in the Versus CPU mode decides the movement parameter of the ball 506 pitched at the timing the batter character 501 comes to bat (i.e., before the first user performs the operation of making the prediction). Therefore, also in the case of the Versus CPU mode, it is possible for the first user to make the prediction on the movement parameter.

Further, in the Versus CPU mode, in the case where the user plays the game as the "second user" who operates the pitcher character 502, the CPU 1 of the game device 100 controls batting of the batter character 501 by the automatic control based on the AI program or the like.

Figure 23:
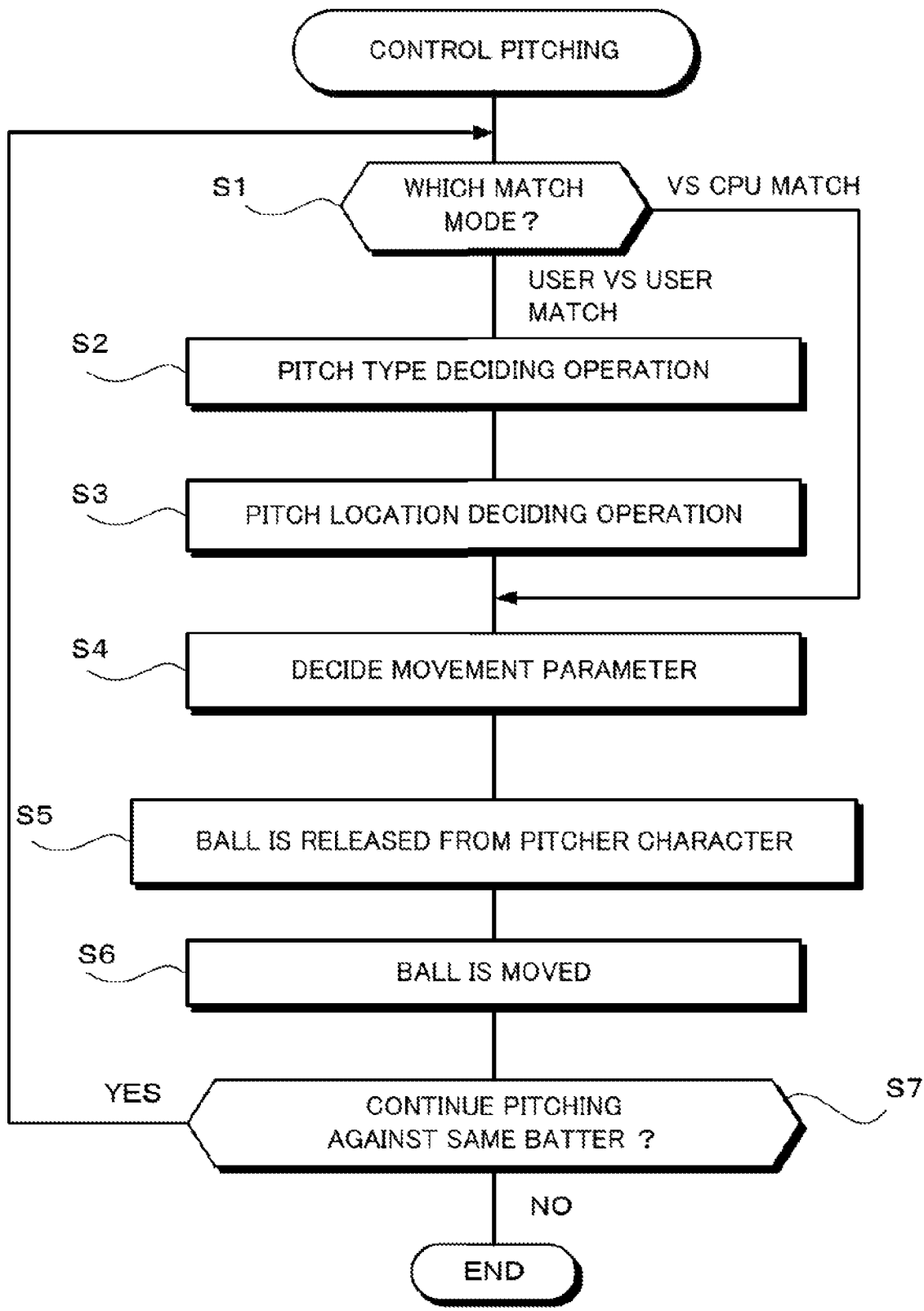
FIG. 23 is a flowchart illustrating a processing example of controlling pitching
Figure 24:
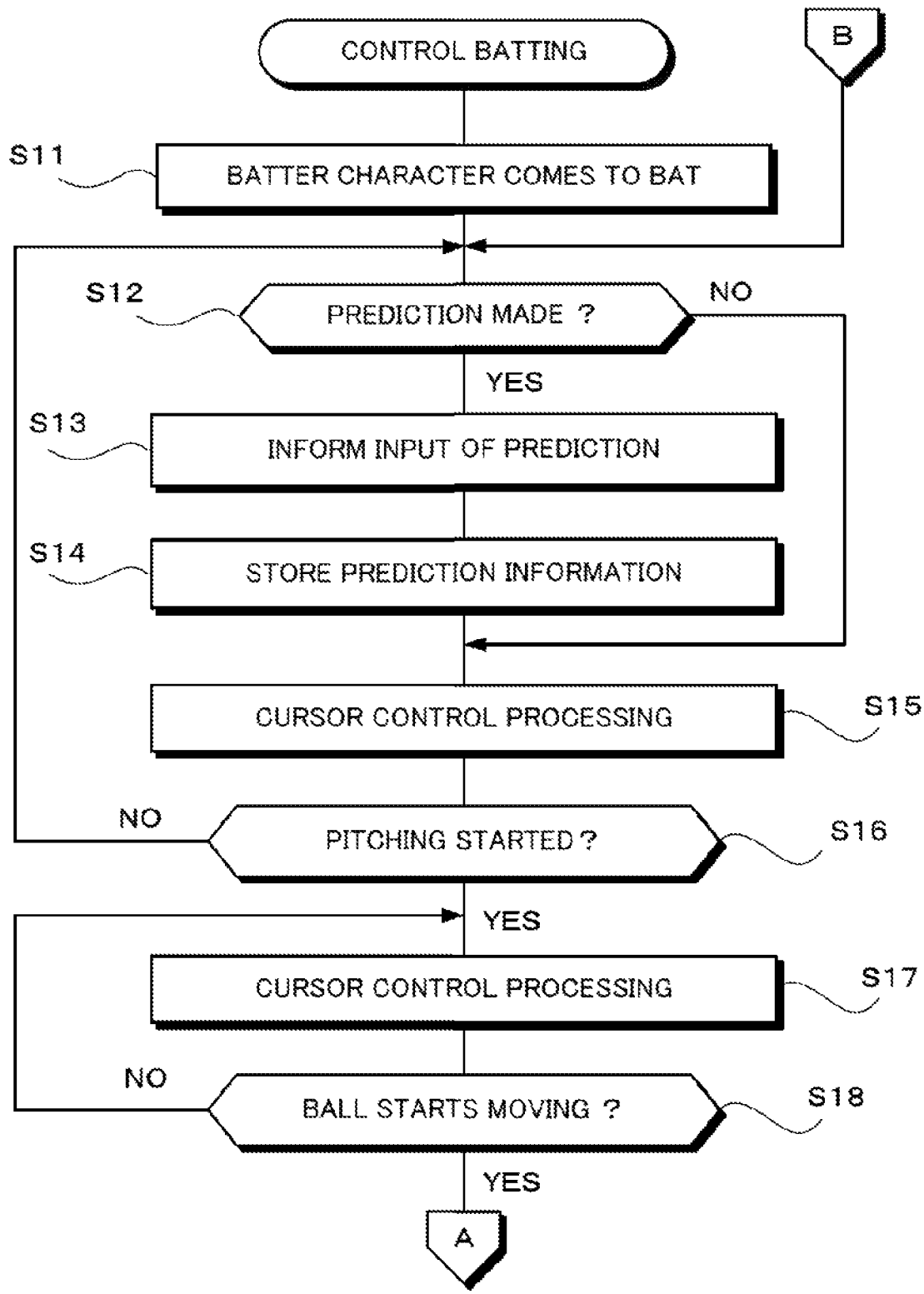
FIG. 24 is a flowchart illustrating a processing example of controlling batting.
Figure 25:
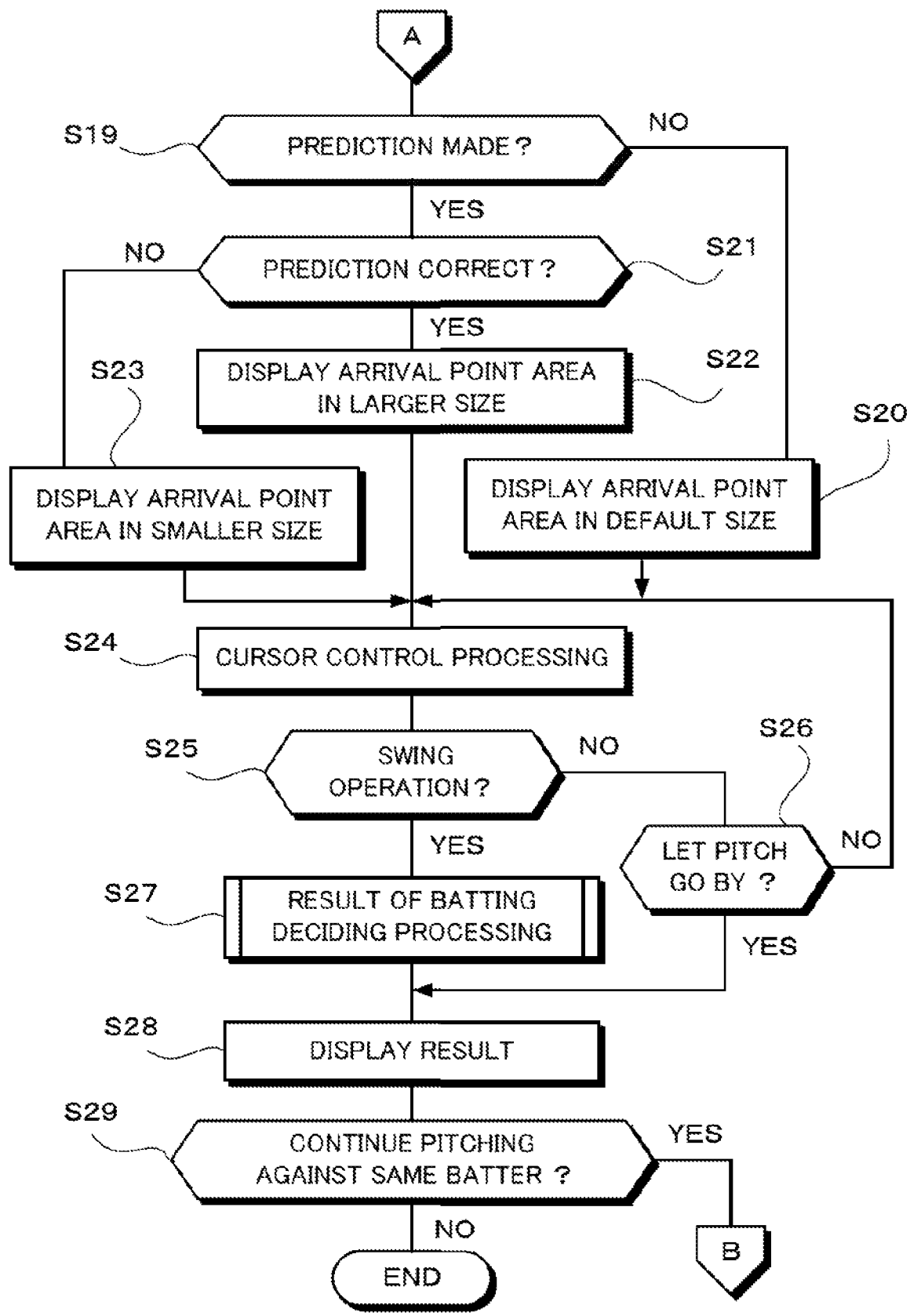
FIG. 25 is a flowchart illustrating a processing example of controlling batting.
Figure 26:
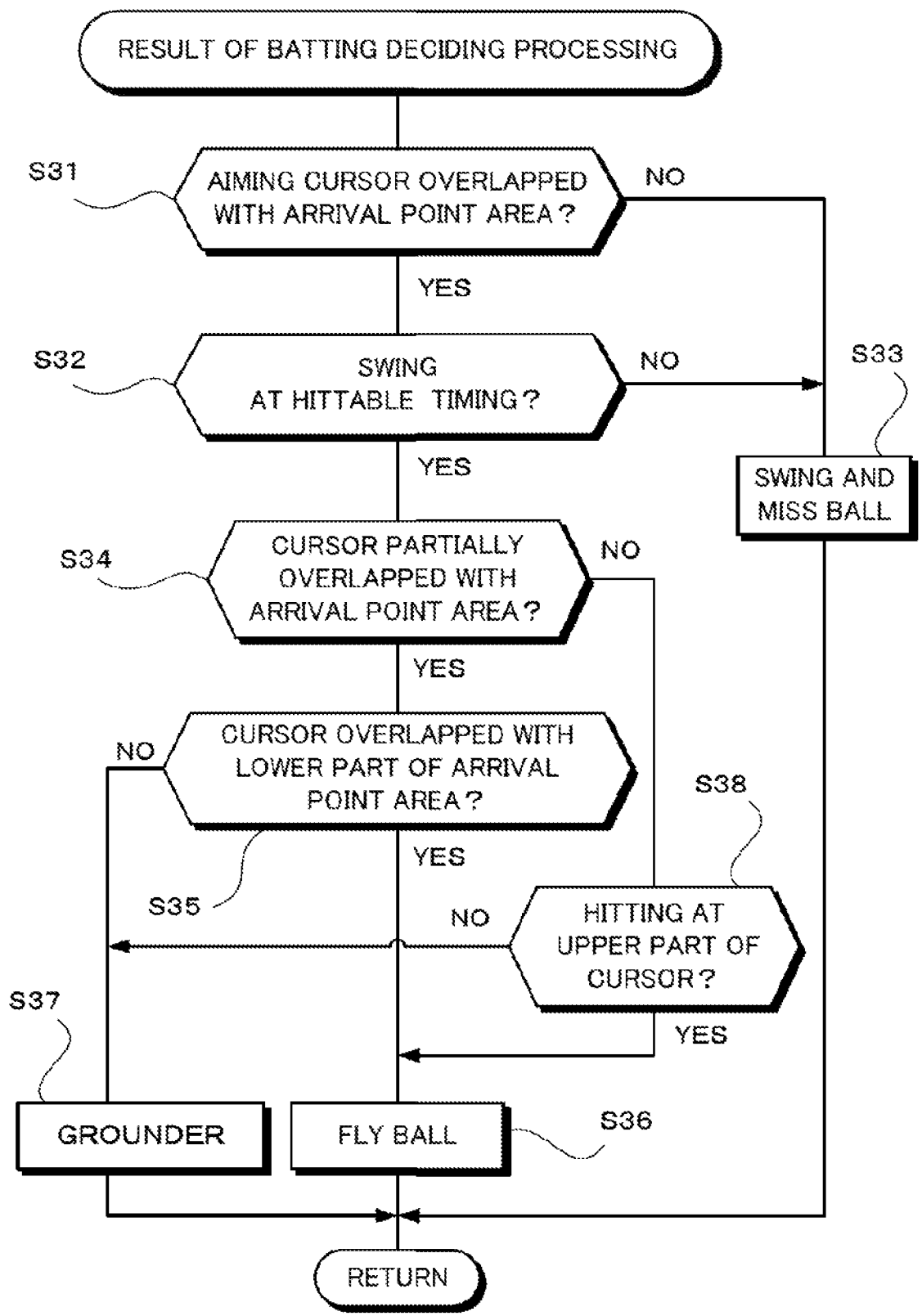
FIG. 26 is a flowchart illustrating an example processing of determining a result of batting.

In the following, an operation example of the game device 100 according to the present embodiment is now explained with reference to the flowcharts of FIG. 23 to FIG. 26. FIG. 23 is a flowchart illustrating an operation example of controlling the pitching operation of the pitcher character 502. FIG. 24 to FIG. 26 are flowcharts illustrating operation examples of controlling batting of the batter character 501.

First, a processing example of a case where the pitcher character 502 throws against a single batter character 501 is described with reference to FIG. 23. In S1, in a case where the match mode is a user versus user match mode, the second user performs an operating of deciding the pitch type (S2) and an operation of deciding the pitch location (S3) before pitching is started. For example, by operating the controller 19, the second user selects the pitch type using the pitch type selection icon 511 illustrated in FIG. 4 and specifies the pitch location by moving the location specifying cursor 512 to an arbitrary position.

The game device 100 decides the movement parameters (the pitch type, the pitch location) of the ball 506 based on the above operations of deciding the pitch type and the pitch location (S4). Thereafter, by the second user's operation of pressing a pitching start button of the controller 19 or automatically, the game device 100 controls the pitcher character 502 to release the ball 506 (S5). Here, on the screen of the game device 100 of the first user, the image viewed from the batter character side is displayed as illustrated in FIG. 5. On the other hand, on the screen of the game device 100 of the second user, the image viewed from the pitcher character side is displayed as illustrated in FIG. 4 which has a different viewpoint from the image illustrated in FIG. 5. Then, it is configured that on both of the screens, the pitcher character 502 throws the ball 506 at substantially at the same timing while performing data communication between the two game devices 100 of the first user and the second user.

Thereafter, in each of the game devices 100 of the first user and second user, the ball released from the pitcher character 502 is moved toward the home plate 508 (toward the batter character 501) based on the movement parameters decided in the above S3 (S6). As a result, an operation of pitching one ball by the pitcher character 502 is completed.

In the case where the pitcher character 502 continues to perform pitching against the batter character 501 currently at bat (S7: YES), the sequence goes back to S1, and S1 to S6 are repeated.

On the other hand, in S1, in a case where the match mode is the Versus CPU mode, without performing the operation of deciding the pitch type (S2) nor the operation of deciding the pitch location (S3) by the second user, the CPU 1 of the game device 100 automatically decides the movement parameters (the pitch type, the pitch location) of the ball 506 (S4).

Next, a processing example of controlling batting of the single batter character 501 is explained. Here, an example of performing the batting operation using the aiming cursor 503 is shown.

As illustrated in FIG. 24, when the batter character 501 comes to bat (S11), the game device 100 accepts the operation of making the prediction by the first user until the pitching motion of the pitcher character 502 is started (until S16: YES). Here, when the operation of making the prediction is performed by the first user (S12: YES), for example, when the operation of making the prediction on the pitch location is performed to select either the inside location or the outside location by tilting the analog stick of the controller 19 either to the right or to the left, the user is informed of an input state of the predicted pitch location (S13). For example, as illustrated in FIG. 11, the user is informed of that the input for making the prediction on the inside location is performed, for example, by changing the color of the left part 504a of the strike zone 504. Similarly, as illustrated in FIG. 12, the user is informed of that the input for making the prediction on the outside location is performed by changing the color of the right part 504b of the strike zone 504.

Further, the game device 100 obtains the information (prediction information) on the prediction as accepted, and stores the information as obtained in the storage device such as the RAM 5 or the like (S14). For example, when the first user performs the operation of making the prediction on the inside location by tilting the analog stick to the right, the game device 100 stores the prediction information of the "inside location" (or the code information "1" indicating the inside location) in the RAM 5.

As described earlier, for the prediction on the pitch location, other than making the prediction by selecting the area of the predicted location such as the inside location, the outside location or the like, it may be configured to specify the position (coordinate) of the predicted location. In the latter case, the game device 100 stores the coordinate information as the predicted location in the RAM 5.

After executing the above S14, or when the operation of making the prediction is not performed in the above S12, the sequence proceeds to S15.

Furthermore, the first user can perform the operation of moving the aiming cursor 503 also before pitching, and when the first user performs the operation of moving the aiming cursor 503, the cursor control processing is executed to move the aiming cursor 503 to a position according to the operation performed by the first user (S15).

Before the pitching motion of the pitcher character 502 is started (S16: NO), it is possible to change or cancel the prediction. In the case where the operation of making predictions is performed in a plural number of times, the prediction information corresponding to the latest operation of making the prediction is made effective, and this prediction information is stored in the RAM 5.

Whether or not to make the prediction is an arbitrary matter, and it is also possible not to make the prediction. If any operation of making the prediction is not performed before the pitching motion of the pitcher character 502 is started, or if the operation performed last is an operation of cancelling the prediction, it is determined that the prediction is not made. In this case, the prediction information is not stored in the RAM 5.

After the pitching motion of the pitcher character 502 is started (S16: YES), the acceptance of the operation of making the prediction is closed, and it is confirmed whether or not the prediction is made by the first user. Further, when the prediction is made by the first user, the prediction information is confirmed.

In the example of FIG. 24, the period of acceptance for prediction is set to a period after the batter character 501 enters the batter's box until the pitching motion of the pitcher character 502 is started (or a period after the previous pitching is performed until the next pitching motion is started). However, the period of acceptance for prediction is not limited to these periods, and for example, it may be configured to accept the prediction made by the first user until the ball 506 is released from the pitcher character 502.

The operation of moving the aiming cursor 503 is allowed even after the pitching motion of the pitcher character 502 is started, and when the first user performs the operation of moving the aiming cursor 503, the cursor control processing for moving the aiming cursor 503 to the position according to the first user's operation is executed (S17).

When the ball 506 is released from the pitcher character 502, and the ball 506 starts moving (S18: YES), the sequence proceeds to 819 of FIG. 25.

After the ball 506 starts moving, the arrival point area 507 is displayed in the active area above the home plate 508. Here, the size of this arrival point area 507 is changed depending on whether or not the prediction is made by the first user, and when the prediction is made, also depending on the result of the prediction. The game device 100 determines whether or not the prediction is made (S19). When the prediction is not made (S19: NO), the game device 100 displays the arrival point area 507 in a normal default size (S20) as illustrated in FIG. 14.

On the other hand, when the prediction is made (S19: YES), the game device 100 determines the result of the prediction (S21). Specifically, the game device 100 compares the prediction information stored in the RAM 5 with the pitch location of the movement parameter determined in S4 of FIG. 23 to determine if the prediction is correct or not. For example, when the prediction information on the pitch location stored in the RAM 5 is "inside location", and the pitch location as the movement parameter decided in S4 is also included in the inside location area, it is determined that the prediction is correct. On the other hand, when the prediction information is "inside location", and the pitch location as the movement parameter decided in S4 is not included in the inside location area, it is determined that the prediction is wrong.

Furthermore, it may be configured to determine the result of the prediction using the degree of coincidence between the prediction information of the pitch location obtained in S14 and the pitch location of the movement parameter decided in S4 of FIG. 23. As described earlier, the degree of coincidence may be expressed by three or more levels using three or more values or levels, or may be computed based on the shift amount between the coordinate of the predicted pitch location and the coordinate of the actual pitch location as illustrated in FIG. 17 and shown in the above formula (1). Further, it may be configured that when the degree of coincidence of the prediction is at or above the predetermined threshold value or level, it is determined that the prediction is correct, and when the degree of coincidence of the prediction is below the predetermined threshold value or level, it is determined that the prediction is wrong.

Here, when the prediction is determined to be correct (S21: YES), as illustrated in FIG. 13, the game device 100 displays the arrival point area 507 in the larger size than the size of the case where the prediction is not made (see FIG. 14) (S22). Therefore, when the prediction made by the first user is correct, an advantage is given such that the difficulty level of the batting operation is lowered, and it becomes easier for the first user to perform the selective batting between the fly ball and the grounder by respectively aiming the lower part or the upper part of the arrival point area 507, which is displayed in the larger size.

On the other hand, when the prediction is determined to be wrong (S21: NO), as illustrated in FIG. 15, the game device 100 displays the arrival point area 507 in the smaller size than the size of the case where the prediction is not made (see FIG. 14) (S23). For this reason, when the prediction is wrong, a disadvantage is given such that the difficulty level of the batting operation is raised to be higher than the difficulty level of the case where the prediction is not made, thereby making the user feel a tense atmosphere in playing the game.

Incidentally, as described earlier, it may be configured to change the size of the arrival point area 507 based on the determination on the result of the prediction in such a manner that the higher is the degree of coincidence of the prediction, the larger is the size of the arrival point area 507 by continuously or stepwise increasing the size of the arrival point area 507.

After the ball 506 is released from the pitcher character 502, the first user performs the operation of moving the aiming cursor 503 to be overlapped with the arrival point area 507. When the operation of moving the aiming cursor 503 is performed by the user, the cursor control processing to move the aiming cursor 503 to a position according to the user's operation is executed (S24).

Then, when the first user attempts to hit the ball 506, the operation of swinging the bat is performed while adjusting to the timing at which the ball 506 arrives at the arrival point area 507. In this case, the first user, for example, presses a predetermined button of the controller 19 for swinging the bat. It is needless to mention that the first user can let a pitch go by without hitting the ball 506.

When the operation of swinging the bat is performed by the first user (S25: YES), the sequence proceeds to S27, and the game device 100 executes the processing of deciding the result of batting (S27). In the following, an example processing of deciding the result of batting is explained with reference to the flowchart illustrated in FIG. 26.

The game device 100 determines if the aiming cursor 503 is overlapped with the arrival point area 507 at timing the ball 506 arrives at the active area above the home plate 506 (S31). Here, if the arrival point area 507 is not overlapped with the aiming cursor 503 (S31: NO), the result of batting would be "swinging and missing" the ball (S33).

On the other hand, when the arrival point area 507 is overlapped with the aiming cursor 503 (S31: YES), it is further determined if the operation of swinging the bat is performed at the predetermined hittable timing at which the ball 506 arrives at or in a vicinity of the active area (S32). Here, if the operation of swinging the bat is not performed at the hittable timing (S32: NO), the result of batting would be swinging and missing the ball (S33).

On the other hand, if the operation of swinging the bat is performed at the hittable timing (S32: YES), the game device 100 determines that the ball 506 is hit with the bat object 505, and the parameter of the batted ball is decided by the processing in and after S34.

Figure 27:
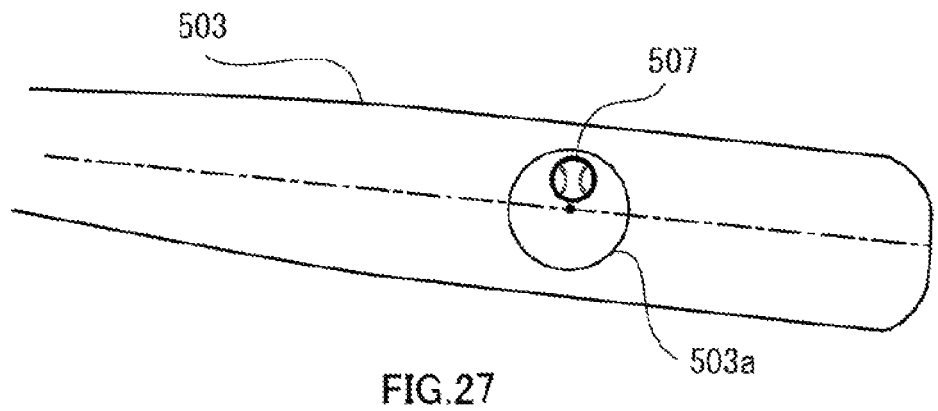
FIG. 27 is an explanatory diagram illustrating a positional relationship between the aiming cursor and the arrival point area.
Figure 28:
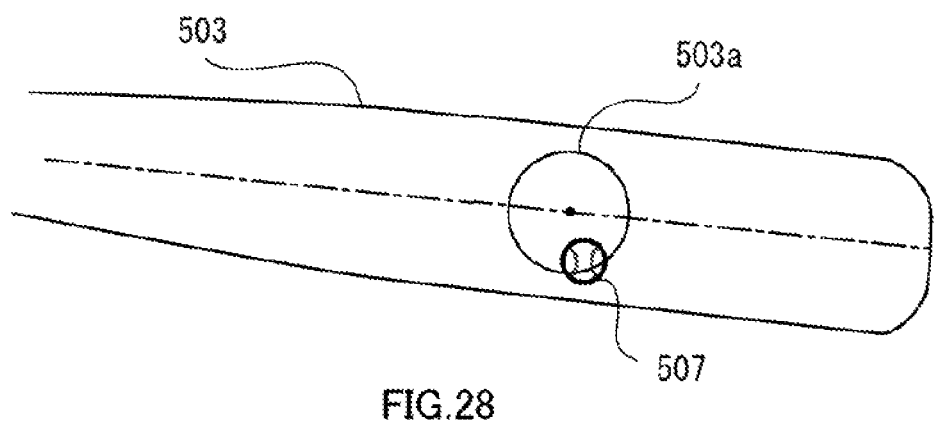
FIG. 28 is an explanatory diagram illustrating the positional relationship between the aiming cursor and the arrival point area.
Figure 29:
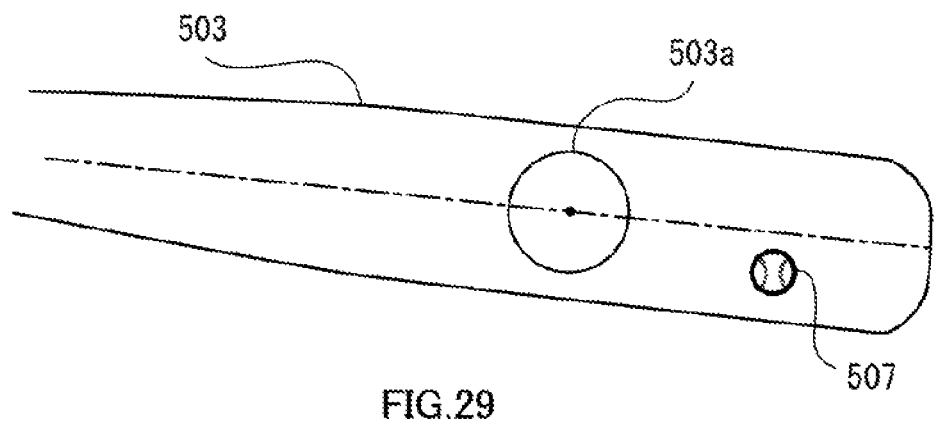
FIG. 29 is an explanatory diagram illustrating the positional relationship between the aiming cursor and the arrival point area.

In the present embodiment, there are two cases, i.e., the case in which a part of the arrival point area 507 is overlapped with the aiming cursor 503 as illustrated in FIG. 13 and FIG. 14, etc., and the case in which the entire area of the arrival point area 507 is overlapped with the aiming cursor 503 as illustrated in FIG. 27 to FIG. 29. Specifically, in a case where the size of the arrival point area 507 is reduced resulting from that the wrong prediction, the entire area of the arrival point area 507 may be overlapped with the aiming cursor 503.

First, when a part of the arrival point area 507 is overlapped with the aiming cursor 503 (S34: YES), the game device 100 determines the parameter of the batted ball based on the positional relationship between the arrival point area 507 and the aiming cursor 503 in the following manner.

Namely, as illustrated in FIG. 8 and FIG. 13, when the lower part of the arrival point area 507 is overlapped with the aiming cursor 503 (S35: YES), the result of batting is the fly ball (the fly or the line drive) (S36). This is because when the lower part of the ball 506 of a spherical shape is hit, the batted ball flies up away from the ground. On the other hand, as illustrated in FIG. 9 and FIG. 10, when the upper part of the arrival point area 507 is overlapped with the aiming cursor 503 (S35: NO), the batting result is the grounder (S37). This is because when the upper part of the spherical ball 506 is hit, the batted ball travels close to the ground.

Further, when the entire area of the arrival point area 507 is overlapped with the aiming cursor 503 (S34: NO), the game device 100 decides the parameter of the batted ball based on the positional relationship between the arrival point area 507 and the aiming cursor 503 in the following manner.

Namely, as illustrated in FIG. 27, when the arrival point area 507 is hit in the upper part of the aiming cursor 503 (S38: YES), the result of batting is the fly ball (the fly or the line drive) (S36). This is, since the surface of the bat object 505 is curved, when the ball 506 is hit in an upper of the curved surface, the batted ball flies up away from the ground. On the other hand, as illustrated in FIG. 28 and FIG. 29, when the arrival point area 507 is hit in a lower part of the aiming cursor 503 (S38: NO), the batting result is the grounder (S37). This is, when the ball 506 is hit in the upper part of the curved surface, the batted ball travels closer to the ground.

As illustrated in FIG. 27 and FIG. 28, when the arrival point area 507 is hit at the meet cursor 503a of the aiming cursor 503, the batted ball would be a hard hit. On the other hand, as illustrated in FIG. 29, when the arrival point area 507 is hit at other part than the meet cursor 503a of the aiming cursor 503, the batted ball would be a weak hit (mishit). Here, it is not necessarily that the aiming cursor 503a which is the area for hard hits be formed in the meet cursor 503.

The game device 100 computes the trajectory of the hit ball 506 on the basis of the timing at which the operation of swinging the bat is performed, the shift amount between a center of the meet cursor 503a and a center of the arrival point area 507 or the like. Further, the trajectory of the batted ball 506 may be decided in consideration of the ability parameter and the like of the batter character 501.

Returning back to FIG. 25, the explanation continues. The game device 100 displays the result of batting decided in 827 on the screen (S28). On the other hand, when the first user lets a pitch go by without performing the operation of swinging the bat (S26: YES), the game device 100 displays the result from this action of the batter character 501, i.e., letting the pitch go by is displayed on the screen (S28). Although the display of a ball count, an out count and the like is omitted from the screen of FIG. 5, etc., for instance, when the ball passes the strike zone 504, the display of the "strike" count is updated, and when the ball passes outside the strike zone 504, the display of the "ball" count is updated.

After S28, the game device 100 determines if pitching continues for the batter character 501 currently at bat (S29). For example, when the batter character 501 hits the foul ball, swings and misses the ball (not yet a strike out), lets the pitch go by (not yet the strike out nor the base on balls), pitching continues for the same batter character 501 (S29: YES), and the sequence goes back to S12 of FIG. 24.

On the other hand, when the result of batting (hit or out) of the batter character 501 is confirmed, and the pitching operation does not continue for the batter character 501 currently at bat (S29: NO), the processing is ended. Then, in a case where a new batter character 501 comes to bat, the processing in FIG. 24 and FIG. 25 is executed again.

As described above, according to the foregoing configuration, by making the prediction on the pitch location or the like, when the prediction is correct, the first user has an improved visibility of the ball resulting from the larger arrival point area 507. As a result, a chance would be given to the first user to perform the batting operation as desired with ease such as the selective batting between the fly ball and the grounder. For example, the first user can enjoy the game, for example, in such a manner that the prediction is made in a scene where it is possible to score by the action of tagging, batting is performed aiming for the fly ball in the outfield. When the prediction is correct, the above advantage is given. On the other hand, when the prediction is wrong, the visibility of the ball is reduced resulting from a smaller arrival point area 507. Namely, the first user also has such a risk that the difficulty level of the batting operation is raised when the prediction is wrong, thereby realizing the game with improved amusement properties.

In order to enable a selective batting operation, if it is configured to display the arrival point area 507 always large in size, the batting operation itself would be easy all the time, and the attractiveness of the game would be reduced. In response, according to the present embodiment, it is configured that a chance is given such that the selective batting can be performed with ease only when the prediction is correct. On the other hand, when the prediction turns wrong, the user has such risk as well, thereby realizing the game with improved amusement properties.

[Other Embodiment]

Next, explained is the configuration of changing the moving speed of the movable object based on the result of the prediction made by the user.

The game of the present embodiment is a game wherein the action can be applied to the movable object when a predetermined operation of applying the action to the movable object is performed by the user at the predetermined timing at which the movable object arrives at the active area or in the vicinity of the active area. As described earlier, in the baseball game, when the operation of swinging the bat is performed by the first user at the predetermined hittable timing at which the ball 506 arrives at the active area or in a vicinity of the active area, it is possible to hit the ball 506. Therefore, the first user who operates as the batter is required not only to perform the operation of superimposing the specific area specified using the aiming cursor 503 or the like onto the arrival point area 507 but also to perform the operation of swinging the bat at the hittable timing while watching the ball 506 being moved and adjusting the timing. Therefore, the moving speed of the ball 506 is an important game element for adjusting the timing.

The moving unit 72 of the game device 100 of the present embodiment has a function of changing the moving speed of the movable object, based on the determination by the determination unit 73 on the prediction made by the user.

It is preferable that when the determination unit 73 determines that the prediction made by the first user is correct, the moving unit 72 reduces the moving speed of the movable object to be lower than the moving speed of the case where the prediction is not made. For example, assumed that the moving speed of the ball 506 of the case where the prediction is not made is V0, and the moving speed of the ball 506 as changed based on the determination on the result of the prediction is V1. Then, when the prediction made by the first user is correct, the moving speed V1 of the ball 506 can be decided, for example, by applying the following formula (7) or (8).

$$V1=V0-f \quad (7)$$

$$V1=g \times V0 \quad (8)$$

In the above formulae, "f" and "g" are constants, and f>0, and f<V0. Further, g>0, and g<1. As an example, given g=0.5, the above formula (8) is applied. However, this merely shows an example, and other operational expression may be applied.

Alternatively, it may be configured to store the information on respective moving speeds of the ball 506 in the storage device (the RAM 5 or the like) beforehand for the respective cases where the prediction is not made, and the prediction is made and correct, and further configured to decide the moving speed based on the information stored in the storage device.

In the case of the baseball game, the moving speed V0 of the ball 506 of the case where the prediction is not made is changed according to the pitch type (the fast ball, the breaking ball) or an ability of the pitcher character 502. When the prediction on the movement parameters (the pitch location, the speed of the pitched ball, the pitch type or the like) is correct, the moving speed V1 of the ball 506 is reduced to be, for example, a half of the moving speed V0. As a specific example, given a time from after the ball 506 is released from the pitcher character 502 until the ball 506 arrives at the home plate 508 is 1.5 seconds (90 frames), when the prediction is correct, the moving speed of the ball 506 is reduced, and the time required for the ball 506 to arrive at the home plate 508 is 3.0 second (180 frames). Namely, the distance the ball 506 moves in one frame is reduced to one half, and the number of drive frames required for the ball 506 to arrive at the home plate 508 is increased to double.

Namely, when the prediction on the pitch location made by the first user was correct, since the ball 506 pitched would be in the direction of the batter's line of sight, the visibility of the ball 506 would be improved, and the first user would feel as if the ball 506 was moving in slow motion. The foregoing configuration artificially reproduces this situation in the game.

Similarly, also in the case where the prediction made by the first user is the prediction on the pitch type or the speed of the pitched ball, when the prediction is correct, the moving speed of the ball 506 is reduced to be lower than the moving speed of the ball 506 of the case where the prediction is not made. Namely, when the first user made the prediction on the pitch type, and the prediction was correct, since the batter's eyes would be likely to follow the deviations in the trajectory of the ball 506, the visibility to the ball 506 would be improved. This situation is artificially produced in the game by reducing the moving speed of the ball 506. Furthermore, when the first user made the prediction on the ball speed (for example, a high speed ball or a change-up), when the prediction was correct, since the batter's eyes would be likely to follow the speed of the ball 506, the visibility to the ball 506 would be improved. The foregoing configuration artificially reproduces this situation in the game by reducing the moving speed of the ball 506.

Therefore, when the prediction made by the first user is correct, it becomes easier for the first user to adjust the timing of performing the operation of swinging the bat and the like, and the difficulty level of the batting operation is lowered. Therefore, when the forgoing configuration is combined with the configuration in which when the prediction made by the first user is correct, the arrival point area 507 is displayed in the larger size than the size of the case where the prediction is not made, it becomes still easier for the first user to perform a desired batting operation.

It is preferable that when the determination unit 73 determines that the prediction made by the first user is wrong, the moving unit 72 increases the moving speed of the movable object to be higher than the moving speed of the case where the prediction is not made. For example, the moving speed V1 of the ball 506 can be decided by applying the following formula (9) or (10).

$$V1=V0+h \quad (9)$$

$$V1=i \times V0 \quad (10)$$

In the above formulae, "h" and "i" are constants, and h>0, and i>1. As an example, given i=1.5, the above formula (10) is applied. However, this merely shows an example, and other operational expression may be applied.

Furthermore, it may be configured to store the information on respective moving speeds of the ball 506 in the storage device (the RAM 5 or the like) beforehand for the respective cases where the prediction is not made, the prediction is made and correct, and the prediction is made and wrong, and further configured to decide the moving speed based on the information stored in the storage device.

As a specific example, given the time from after the ball 506 is released from the pitcher character 502 until the ball 506 arrives at the home plate 508 is 1.5 seconds (90 frames), when the prediction is wrong, the moving speed of the ball 506 is increased and the time required for the ball 506 to arrive at the home plate 508 is 1.0 second (60 frames).

Namely, when the prediction on the pitch location made by the user was wrong, since the ball would be shifted from the user's line of sight, the user's eyes would not be able to follow the movement of the ball, and the sensible velocity of the ball would be increased. The foregoing configuration artificially reproduces this situation in the game.

Similarly, also in the case where the prediction made by the first user is the prediction on the pitch type or the speed of the pitched ball, when the prediction made by the first user is wrong, the moving speed of the ball 506 pitched becomes higher than the moving speed of the ball 506 of the case where the prediction is not made. Namely, when the first user made the prediction on the pitch type, and the prediction was wrong, since the batter's eyes would not be able to follow the deviations in the trajectory of the ball 506 being moved, the sensible velocity of the ball 506 would be increased. This situation is artificially produced in the game. Furthermore, in the case where the first user made the prediction on the speed of the pitched ball (for example, the high speed ball or the change-up), and the prediction made by the first user was wrong, since the batter's eyes would not be able to follow changes in the speed of the ball 506 pitched, the sensible velocity of the ball would be increased. This situation is artificially produced in the game.

Therefore, when the prediction made by the first user is wrong, since it becomes more difficult to adjust the timing to the ball 506 which moves faster than the speed of the normal case, it is more likely to swing and miss the ball 506. Therefore, when the prediction made by the user is wrong, the operation of applying the action such as the batting operation or the like becomes more difficult than the case where the prediction is not made, thereby making the user feel a higher tense atmosphere in playing the game.

Further, it may be configured that the determination unit 73 determines the degree of coincidence of the prediction based on the information regarding the prediction made by the user accepted by the prediction accepting unit 71 and the movement parameter of the movable object, and the moving unit 72 sets the moving speed of the movable object such that the higher is the degree of coincidence of the prediction, the lower is the moving speed of the movable object. As described earlier, the degree of coincidence of the prediction can be determined, for example, based on the shift amount (distance) between the coordinate of the pitch location predicted by the user and the coordinate of the actual pitch location in such a manner that the smaller is the shift amount, the higher is the degree of coincidence.

For example, when the degree of coincidence of the prediction is at or above the predetermined threshold value or level, it is determined that the prediction is correct, and the moving speed of the ball 506 is reduced to be lower than the moving speed of the ball 506 of the case where the prediction is not made. Further, in this case, the moving speed of the ball 506 is continuously or stepwise reduced in such a manner that the higher is the degree of coincidence of the prediction, the lower is the moving speed.

For example, when the degree of coincidence of the prediction is below the predetermined threshold value or level, it is determined that the prediction made by the user is wrong, and the moving speed of the ball 506 is increased to be higher than the moving speed of the ball 506 of the case where the prediction is not made. Further, in this case, the moving speed of the ball 506 is continuously or stepwise increased in such a manner that the lower is the degree of coincidence of the prediction, the higher is the moving speed. In this way, the difficulty level of the batting operation is raised.

Next, the concrete examples of changing the moving speed of the ball 506 based on the degree of coincidence of the prediction are exampled. For example, the moving speed of the ball 506 can be determined by applying the following formula (11), wherein V0 is the moving speed of the ball 506 of the case where the prediction is not made, V1 is the moving speed of the ball 506 as changed based on the determination on the result of the prediction, and M is the degree of coincidence of the prediction computed by the previous formula (1).

$$V1=(a/2M) \times V0 \tag{11}$$

In the above formula (11), "a" is a constant as in the case of the above formula (1). In the case of the above formula (11), when the degree of coincidence of the prediction M satisfies the condition of M>(a/2), the moving speed V1 becomes lower than the moving speed V0 of the case where the prediction is not made. On the other hand, when the degree of coincidence of the prediction M satisfies the condition of M<(a/2), the moving speed V1 becomes higher than the moving speed V0. However, this merely shows an example, and other operational expression may be applied.

Alternatively, the moving speed of the ball 506 may be decided based on the information indicating the relationship between the degree of coincidence of the prediction and the moving speed of the ball 506. For example, it may be configured such that the information of a table showing the relationship between the degree of coincidence of the prediction and the moving speed of the ball 506 is stored in the recording medium 300 in which the game program is recorded, and the information of the table is loaded into the RAM 5 when executing the game. In this case, the moving unit 72 sets the moving speed of the ball 506 corresponding to the degree of coincidence of the prediction based on the above table.

As described, by changing the moving speed of the ball 506 according to the degree of coincidence of the prediction, it is possible to accurately reflect this degree of coincidence of the prediction to the difficulty level of the batting operation (the operation of swinging the bat at the hittable timing), thereby realizing the game with high amusement properties.

Figure 30:
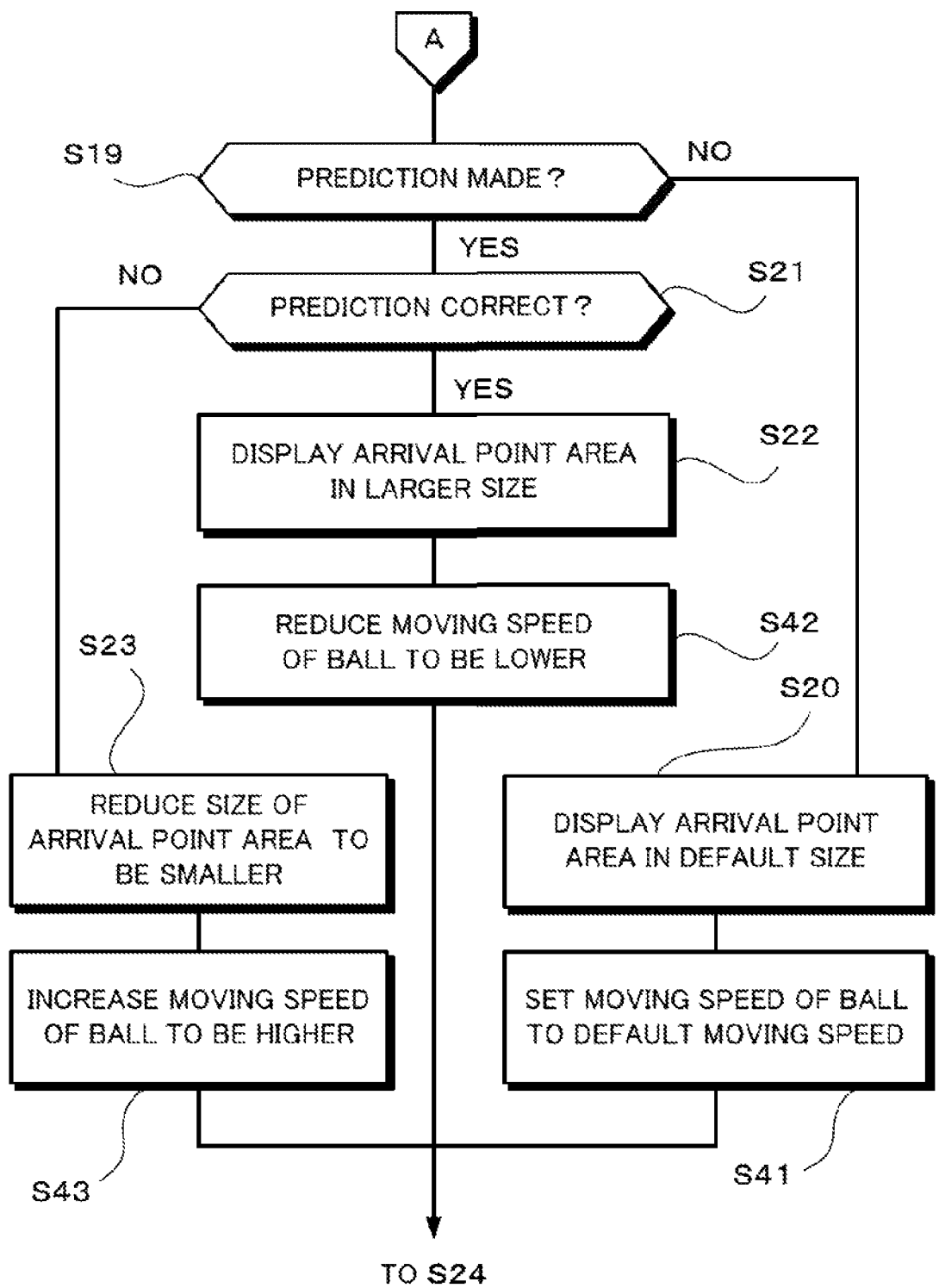
FIG. 30 is a flowchart illustrating another processing example of controlling batting.

An operation example of the game device 100 according to an embodiment of the present invention is now explained with reference to the flowchart of FIG. 30. The flowchart of FIG. 30 is partially changes from the flowchart of FIG. 25 illustrating the processes of controlling the batting operation. Since the processes in and after S24 are the same as the flowchart of FIG. 25, these processes are omitted. Therefore, in the flowchart of FIG. 30, the same steps as the flowchart of FIG. 25 are specified by the same step numbers, and the explanations thereof are omitted appropriately.

The game device 100 determines whether or not the prediction on the pitch location or the like, is made by the first user (S19). If the prediction is not made (S19: NO), the game device 100 displays the arrival point area 507 in the normal default size (S20), and sets the moving speed of the ball 506 to a default moving speed (S41). Here, in the above formulae (7) to (11), the default moving speed corresponds to the moving speed V0 of the ball 506 in the case where the prediction is not made, which is a normal moving speed set based on the movement parameter decided in S4 of FIG. 23.

On the other hand, when the prediction is made (S19: YES), the game device 100 determines a result of this prediction (S21). Here, when the prediction is correct (S21:

YES), the game device 100 displays the arrival point area 507 in a larger than the case where the prediction is not made (S22), and reduces the moving speed of the ball 506 to be lower than the moving speed of the case where the prediction is not made (S42). Therefore, when the prediction made by the first user is correct, an advantage is given such that the difficulty level of the batting operation is lowered. Namely, it becomes easier for the first user to perform the selective batting between the fly ball and the grounder by respectively aiming the lower part or the upper part of the arrival point area 507, which is displayed in the larger size. Further, since the moving speed of the ball 506 is reduced, it becomes easier to perform the operation of swinging the bat adjusted to the hittable timing.

On the other hand, when the prediction is wrong (S21: NO), the game device 100 displays the arrival point area 507 in the smaller size than the size in the case where the prediction is not made (S23), and increases the moving speed of the ball 506 to be faster than the moving speed of the case where the prediction is not made (S43). For this reason, when the prediction is wrong, a disadvantage is given such that the difficulty level of the batting operation is raised to be a higher than the difficulty level of the case where the prediction is not made, thereby making the user feel a tense atmosphere in playing the game.

Incidentally, as described earlier, the size of the arrival point area 507 based on the result of determination of the prediction may be continuously or stepwise increased in such a manner that the higher is the degree of coincidence of the prediction, the larger is the size of the arrival point area 507.

Furthermore, the moving speed of the ball 506 based on the result of determination of the prediction may be continuously or stepwise reduced in such a manner that the higher is the degree of coincidence of the prediction, the lower is the moving speed of the ball 506.

After any step of S41, S42 or S43 is executed, the sequence proceeds to S24 illustrated in FIG. 25. The processing in and after S24 is the same as the processing illustrated in FIG. 25.

[Other Embodiment]

The following explains a variation of changing the size of the arrival point area 507.

The game of the present embodiment is a game in which a first character operated by the user applies the action to the movable object. Here, examples of the first character include the batter character in the baseball game, the goalkeeper character in the soccer game, a receiver character who receives the ball hit by an opponent in the tennis game or the like. It is not necessary that the first character is a human character, and the first character can be an animal, a monster, a robot, a fighter or the like. These are merely examples, and the first character according to the type or the content of the game can be applied.

As shown in the functional block diagram of FIG. 31, the game device 100 of the present embodiment comprises an information management unit 77 other than the above explained units 71 to 75. This information management unit 77 has a function of managing parameters of the first character. Here, the explanation is given through the case where the first character is the batter character 501 of the baseball game.

Examples of the parameters of the batter character 501 include a batting ability, a strong pitch location, a weak pitch location, a strong pitch type, a weak pitch type, a physical endurance (as the number of innings played increases, the physical endurance is lowered due to fatigue), and the like.

The information management unit 77 stores and manages these parameters of the batter character 501 in the storage device (the RAM 5 or the like). The parameters of the batter character 501 are stored, for example, in the recording medium 300 or the memory 18 illustrated in FIG. 1, and when starting the game, these parameters are read out to be stored in the RAM 5. It may be also configured that the game device 100 makes an access to the server device 400 to download latest parameters.

Further, the display control unit 74 has a function of changing the size of the arrival point area 507 based on a parameter (parameters) of the batter character 501 as the first character.

For example, the display control unit 74 is configured to increase the basic size (the default size of the case where the prediction is not made) of the arrival point area 507 in such a manner that the higher is the parameter of the batting ability of the batter character 501, the larger is the basic size of the arrival point area 507. Here, in the formulae (2) to (6), the basic size of the arrival point area 507 corresponds to the radius R0 of the arrival point area 507 in the case where the prediction is not made. That is, a character having a higher batting ability has a higher ability of hitting the ball with the bat, and this feature is reflected in the game using the size of the arrival point area 507.

For example, in the above formulae (2) to (6), the radius R0 of the arrival point area 507 of the case where the prediction is not made can be expressed as the function of a parameter "p" as follows, wherein "p" is the parameter of the batting ability of the batter character 501, $$R0=f(p),$$

Further, as described above, the radius R1 of the arrival point area 507 may be further changed from the radius R0 according to the propriety (correct or wrong) of the prediction or the degree of coincidence of the prediction based on the above formulae (2) to (6).

Further, for example, when the pitch location of the ball 506 thrown by the pitcher character 502 is the strong pitch location (for example, a high-and-outside location) of the batter character 501 in a batter's box, the basic size of the arrival point area 507 becomes larger than the basic size of the case where the pitch location is not the strong pitch location of the batter character 501. On the other hand, when the pitch location of the ball 506 thrown by the pitcher character 502 is the weak pitch location (for example, a low-and-inside location) of the batter character 501 in the batter's box, the basic size of the arrival point area 507 becomes smaller than the basic size of the case where the pitch location is not the weak pitch location of the batter character 501.

Further, for example, when the pitch type of the ball 506 thrown by the pitcher character 502 is the strong pitch type (for example, the fast ball) of the batter character 501 in the batter's box, the basic size of the arrival point area 507 becomes larger than the basic size of the case where the pitch type is not the strong pitch type of the batter character 501. On the other hand, when the pitch type of the ball 506 thrown by the pitcher character 502 is the weak pitch location (for example, the slider ball) of the batter character 501, the basic size of the arrival point area 507 becomes smaller than the basic size of the case where the pitch type is not the weak pitch type of the batter character 501.

For example, as the number of innings the batter character 501 played increases, the parameter of the physical endurance of the batter character 501 is reduced. Therefore, it is configured such that the smaller is the parameter of the physical endurance (i.e., the larger is the number of innings played) of the batter character 501 in the batter's box, the smaller is the basic size of the arrival point area 507.

Furthermore, for example, by applying the above formulae (2) to (6), the basic size of the arrival point area 507 decided based on the parameters of the batter character 501 is changed according to propriety (correct or wrong) of the prediction or the degree of coincidence of the prediction.

As described, by reflecting various parameters of the batter character 501 as the first character into the game using the size of the arrival point area 507, the game with improved amusement properties can be realized.

Next, other variation of changing the size of the arrival point area 507 is explained. The game of the present embodiment is a game in which the second character releases the movable object. Here, examples of the second character include the pitcher character in the baseball game, a kicker (shooter) of a penalty kick in the soccer game, a tennis player character which serves in the tennis game. It is not necessary that the second character is a human character, and the second character can be an animal, a monster, a robot, a fighter or the like. These are merely examples, and the second character according to the type or the content of the game can be applied.

The information management unit 77 of the game device 100 has a function of managing the parameters of the second character. In the following, explanations are given through the case of adopting the pitcher character 502 of the baseball game for the second character.

Examples of the parameters of the pitcher character 502 include a ball power, a ball control, a strong pitch location, a weak pitch location, a strong pitch type, a weak pitch type, a physical endurance (as the number of inning pitched increases, the physical endurance is lowered due to fatigue), and the like. The information management unit 77 stores and manages these parameters of the pitcher character 502 in the storage device (the RAM 5 or the like). The parameters of the pitcher character 502 are stored, for example, in the recording medium 300 or the memory 18 illustrated in FIG. 1, and when starting the game, these parameters are read out to be stored in the RAM 5. It may be also configured that the game device 100 makes an access to the server device 400 to download the latest parameters.

Further, the display control unit 74 of the present embodiment has a function of changing the size of the arrival point area 507 based on the parameters of the pitcher character 502 as the second character.

For example, the display control unit 74 may be configured to increase the basic size of the arrival point area 507 in such a manner that the higher is the parameter (the ball power, the ball control) of the pitcher character 502, the smaller is the basic size (the default size of the case where the prediction is not made) of the arrival point area 507. That is, the pitcher character 502 whose ball power and ball control are high can throw the ball which is difficult for the batter to hit, and this situation is reflected in the game using the size of the arrival point area 507.

For example, in the above formulae (2) to (6), the radius R0 of the arrival point area 507 of the case where the prediction is not made can be expressed as the function of the parameters "q" and "r" as follows, wherein "q" is the ball power parameter of the pitcher character 502, and "r" the ball control parameter, $$R0=f(q,r),$$

Further, as described above, the radius R1 of the arrival point area 507 may be changed from the radius R0 according to propriety (correct or wrong) of the prediction or the degree of coincidence of the prediction based on the above formulae (2) to (6).

Further, for example, when the pitch location of the ball thrown by the pitcher character 502 is a strong pitch location (for example, a low-and-outside location) of the pitcher character 502, the basic size of the arrival point area 507 is reduced to be smaller than the basic size of the case where the pitch location is not the strong pitch location of the pitcher character 502. On the other hand, when the pitch location of the ball thrown by the pitcher character 502 is the weak pitch location (for example, a high-and-inside location) of the pitcher character 502, the basic size of the arrival point area 507 is increased to be larger than the basic size of the case where the pitch location is not the weak pitch location of the pitcher character 502.

Further, for example, when the pitch type of the ball thrown by the pitcher character 502 is the strong pitch type (for example, the slider ball) of the pitcher character 502, the basic size of the arrival point area 507 is reduced to be smaller than the basic size of the case where the pitch type is not the strong pitch type of the pitcher character 502. On the other hand, when the pitch type of the ball thrown by the pitcher character 502 is the weak pitch type (for example, the fast ball) of the pitcher character 502, the basic size of the arrival point area 507 is increased to be larger than the basic size of the case where the pitch type is not the weak pitch type of the pitcher character 502.

Furthermore, for example, by applying the above formulae (2) to (6), the basic size of the arrival point area 507 decided based on the parameters of the pitcher character 502 is changed according to propriety (correct or wrong) of the prediction or the degree of coincidence of the prediction.

As described, the game with still higher amusement properties can be realized by reflecting various parameters of the pitcher character 502 into the game as the second character using the size of the arrival point area 507.

Other variation of changing the size of the arrival point area 507 is explained. The game of the present embodiment is a game in which the first character operated by the user applies the action to the movable object released from the second character. For example, in the case of the baseball game, the first character corresponds to the batter character 501, and the second character corresponds to the pitcher character 502 respectively.

Further, the information management unit 77 of the present embodiment has a function of managing the information regarding the compatibility between the first character and the second character. Here, the information regarding the compatibility may be such information that the right handed batter has a good compatibility with the left handed pitcher, and a bad compatibility with the right handed pitcher, or may be such information indicating the compatibility between each batter and each pitcher. For example, the batter B1 can be strong for the pitcher P1 (the batting average against the pitcher P1 is higher than a reference value), but is weak for the pitcher P2 (the batting average against the pitcher P2 is lower than the reference value). Such information regarding compatibility may be stored, for example, in the recording medium 300 or the memory 18 illustrated in FIG. 1, and when the game is started, when starting the game, the information is read out to be stored in the RAM 5. It may be also configured that the game device 100 makes an access to the server device 400 to download the latest parameters.

The information management unit 77 may be configured to manage data on an individual result of plays between each batter character 501 and each pitcher character 502 in the game to update the information regarding the compatibility between each batter character 501 and each pitcher character 502 to the latest information. For example, in the case where the batter character 501 has an individual batting average against a certain pitcher character 502 of a first reference batting average (for example, 0.3) or higher, the data on the individual result of plays is managed such that for the batter character 501, the pitcher character 502 is a favorite pitcher (the good compatibility). On the other hand, in the case where the batter character 501 has an individual batting average against a certain pitcher character 502 of a second reference batting average (for example, 0.2) or lower, the data on the individual result of plays is managed such that for the batter character 501, the pitcher character 502 is a tough pitcher (bat compatibility).

The display control unit 74 of the present embodiment has a function of changing the size of the arrival point area 507 based on the information regarding the above compatibility.

For example, the display control unit 74 is configured such that when the pitcher character 502 of an opponent has the good compatibility for a certain batter character 501, the basic size (the default size of the case where the prediction is not made by the user) of the arrival point area 507 is increased to be larger than the base size of the case where the pitcher character 502 does not have the good compatibility. That is, when the batter character 501 performs batting against the pitcher character 502 which has a good compatibility as an opponent for the batter character 501, it is likely that this batter character 501 can see the ball thrown by the pitcher character 502 well, and this situation is reflected into the game by increasing the size of the arrival point area 507. On the other hand, when the pitcher character 502 of the opponent has the bad compatibility for a certain batter character 501, the display control unit 74 reduces the basic size of the arrival point area 507 to be smaller than the basic size of the case where the pitcher character 502 does not have the bad compatibility for the certain batter character 501.

Furthermore, for example, by applying the above formulae (2) to (6), the basic size of the arrival point area 507 decided based on the parameters of the pitcher character 502 is changed according to propriety (correct or wrong) of the prediction or the degree of coincidence of the prediction.

As described, with the configuration wherein the information regarding the compatibility between the batter character 501 as the first character and the pitcher character 502 as the second character is managed, and the information is reflected in the game using the size of the arrival point area 507, it is possible to realize the game with still higher amusement properties.

[Other Embodiment]

In the above described embodiment, explanations have been given through the configuration wherein according to the result of the prediction made by the user, the size of the arrival point area 507 is changed, and/or the moving speed of the movable object such as the ball 506 pitched or the like is changed. As a variation, the configuration of changing the speed of the movable object having applied thereto the action according to the result of the prediction made by the user may be adopted alone or in combination with the above described configuration.

The decision unit 75 which decides the action to be applied to the movable object changes the moving speed of the movable object having applied thereto the action, based on the result of determination by the determination unit 73 which determines the result of the prediction made by the user. For example, when the determination unit 73 determines that the prediction made by the user is correct, the decision unit 75 increases the moving speed of the movable object having applied thereto the action to be higher than the moving speed of the case where the prediction is not made. For example, in the baseball game, when the prediction made by the user is correct, the speed of the 506 batted is increased to be higher than the speed of the case where the prediction is not made (for example, the speed of the ball 506 batted is increased to be 1.2 times higher).

For example, when the determination unit 73 determines that the prediction made by the user is wrong, the decision unit 75 reduces the moving speed of the movable object having applied thereto the action to be lower than the moving speed of the case where the prediction is not made. For example, in the baseball game, when the prediction made by the user is wrong, the speed of the 506 batted is reduced to be lower than the speed of the case where the prediction is not made (for example, the speed of the ball 506 batted is reduced to be 0.8 times lower).

Further, the decision unit 75 may be configured to continuously or stepwise increase the moving speed of the movable object having applied thereto the action in such a manner that the higher is the degree of coincidence of the prediction determined by the determination unit 73, the higher is the moving speed of the movable object.

Next, explained is a variation for the method of obtaining prediction information on the moved location of the movable object by the prediction accepting unit 71 of the game device 100. The game device 100 having the foregoing configuration comprises the cursor control unit 76 configured to move the aiming cursor 503 according to the first user's operation. The prediction accepting unit 71 has a function of obtaining the position information of the aiming cursor 503 when the movable object starts moving or at a predetermined timing before the movable object starts moving as the prediction information on the moved location of the movable object as the movement parameter.

The timing at which the movable object starts moving is a timing at which the ball 506 is released from the pitcher character 502. The predetermined timing before the movement of the movable object starts may be a timing at which the pitcher character 502 starts the pitching motion as an example. The position information of the aiming cursor 503 at the above timing is obtained as the prediction information regarding the pitch location.

For example, in the case where the first user predicts the pitch location to be the inside location, it is expected that the first user moves the aiming cursor 503 to the position of the inside location beforehand before the ball 506 is released from the pitcher character 502, and to wait for the ball 506 to be pitched. That is, by moving the aiming cursor 503 beforehand to the position of the predicted location, when the prediction is correct, the first user who waits for the ball 506 at the predicted pitch location can appropriately hit the arrival point area 507 only by slightly adjusting the position of the aiming cursor 503. Therefore, the position of the aiming cursor 503 at the timing the ball 506 is released from the pitcher character 502 (or the pitching motion is started) is considered to be the pitch location predicted by the first user, and the position of the aiming cursor 503 is obtained as the prediction information.

As an example, the position information of the aiming cursor 503 can be coordinate information of the center of the meet cursor 503a in the aiming cursor 503. Alternatively, the position information may be expressed as the "inside location", the "outside location", and the like such that when the center of the meet cursor 503 is positioned in the inside location area, the position information is the "inside location", and when the center of the meet cursor 503 is positioned in the outside location area, the position information is the "outside location", and the like.

According to the foregoing configuration, only by performing the operation of moving the aiming cursor 503, it is possible for the first user to perform the operation of making the prediction on the moved location of the movable object at the same time, thereby simplifying the operation.

In the foregoing embodiment, explanations have been given mainly through the example in which the present invention is applied to the baseball game. However, the present invention is applicable not only to baseball games, but also to various other games in which the action is applied to the movable object, such as soccer games or tennis games. In the following, an example of applying the present invention to the soccer game is explained.

In the penalty kick of the soccer game, the goalkeeper character operated by the first user catches the soccer ball as an example of the movable object or punches the soccer ball away from a goal, released from (kicked by) a kicker character operated by the second user (or automatically controlled by the CPU). For example, the first user who operates the goalkeeper character can catch the soccer ball or punch the soccer ball away from the goal by making the aiming cursor or the user's finger be superimposed on the arrival point area of the soccer ball released from the kicker character.

In such the soccer game, the first user can make the prediction on a shoot location (an arrival location of the soccer ball to be shot) beforehand. For example, when the first user predicts that the kicker character aims to shoot the soccer ball to the right location, the first user performs the operation of making such prediction, for example, by tilting the analog stick of the controller 19 to the right before the soccer ball is released from the kicker character. As a result, for example, the color of the right hand side of the goal object is changed to inform the first user of that the input of the prediction on the shoot location is made. Then, the prediction accepting unit 71 of the game device 100 obtains the prediction information on the shoot location as an example of the movement parameter based on the first user's operation of making such prediction.

In the case where the prediction is made, if the prediction is correct, an advantage is given such that the size of the arrival point area is increased to be larger than the size of the case where the prediction is not made. As a result, it becomes easier for the first user to perform the operation of making the aiming cursor (the specific area) to be superimposed on the desired position in the arrival point area. For example, when the aiming cursor is superimposed on the upper part, the lower part, the right part or the left part of the arrival point area, the soccer ball would be punched downward, upward, to the left direction or to the right direction respectively. For example, in the case where a play continues after the kicker (shooter) character performs the penalty kick, it is preferable that the goalkeeper character punches the soccer ball toward the player character of the own team. In this regards, with the arrival point area displayed in the larger size resulting from the correct prediction, it becomes easier for the first user to perform the operation of making the aiming cursor to be superimposed onto the desired position of the arrival point area so that the ball is punched to the direction of the player character of the own team.

On the other hand, when the prediction on the shoot location made by the first user is wrong, a disadvantage is given such that the size of the arrival point area is reduced to be smaller than the size of the case where the prediction is not made. The game device 100 which controls this soccer game also exhibits similar function and effect to those of the case of controlling the above baseball game.

Next, an example of applying the present invention to the tennis game is explained. In the case of serving a tennis ball in the tennis game, a receiver character operated by the first user hits back the tennis ball served as an example of the movable object released from a server character operated by the second user (or automatically controlled by the CPU). For example, the first user who operates the receiver character can hit back the tennis ball served by performing the operation of making the aiming cursor or the first user's finger to be superimposed on the arrival point area of the tennis ball served.

In the case of the foregoing tennis game, the first user can make the prediction on a serve location (the arrival location of the served tennis ball) beforehand. For example, when the first user predicts that the server character aims at the right hand side trajectory, the first user performs the operation of making such prediction, for example, by tilting the analog stick of the controller 19 to the right before the tennis ball is released from the server character. As a result, for example, the color of the right hand side of the tennis court is changed to inform the first user of that the input of the prediction on the serve location is made. Then, the prediction accepting unit 71 of the game device 100 obtains the prediction information on the serve location as one example of the movement parameter based on the operation of making the prediction by the first user.

In the case where the prediction is made, if the prediction is correct, an advantage is given such that the size of the arrival point area becomes larger than the size of the case where the prediction is not made. As a result, it becomes easier for the first user to perform the operation of making the aiming cursor (the specific area) to be superimposed on the desired position in the arrival point area. For example, when the aiming cursor is superimposed on the upper part of the arrival point area, the shot would be a drive shot. On the other hand, when the aiming cursor is superimposed on the lower part of the arrival point area, backspin is imparted on the tennis ball, and therefore the shot would be a slice shot. Therefore, when the prediction is correct, it is possible to make a selective shot between the drive shot and the slice shot by aiming at the desired position of the arrival point area displayed in the larger size.

On the other hand, when the prediction on the serve location made by the first user is wrong, a disadvantage is given such that the size of the arrival point area is reduced to be smaller than the size of the case where the prediction is not made. The game device 100 which controls this tennis game also exhibits similar function and effect to those of the case of controlling the above baseball game.

In the foregoing embodiment, explanations have been given through the configuration wherein the game program is executed in the game device 100 operated by the user. The present embodiment is also applicable to the game system wherein the game program is executed by the server device according to a game input operation by the terminal device and the server device transmits the result of execution to the terminal device of each user. The configuration example of this game system is illustrated in FIG. 32. As illustrated in FIG. 32, this game system comprises a server device 1000 disposed on the network 600 such as the internet, and a terminal device 2000 of each user communicably connected to the server device 1000 via the network 600.

A server device 1000 provides the user with a service of a so-called cloud gaming, in which game images as a result of executing the game are transmitted to the terminal device 2000, for instance, in a streaming format. In the service mode of providing this cloud gaming, there is no need to download or install game-dedicated software to the terminal device 2000 of the user, and as long as the environment which connects the terminal device 2000 to the network 600 can be ensured, the user can casually enjoy the game service provided by the server device 1000 anywhere.

For the hardware configuration of the server device 1000 and the terminal device 2000, the general configuration of a computer comprising the CPU, the ROM, the RAM, an auxiliary storage device, the communication interface or the like may be adopted. The server device 1000 may have the same functional configuration as that of the game device 100 which comprises the prediction accepting unit 71, the moving unit 72, the determination unit 73, the display control unit 74 and the decision unit 75. The server device 1000 may also comprise the above described information management unit 77, and the like. As described, the server device 1000 having the same function as the game device 100 also exhibits similar function and effect to those of the game device 100.

Moreover, the server device 1000 and the terminal device 2000 can receive and transmit various kinds of data by mutually communicating each other. Both of the server device 1000 and the terminal device 2000 are information processing devices (computers), each comprising the CPU, the ROM, the RAM, the auxiliary storage device, the communication interface or the like, and have similar hardware configurations. Therefore, in the game system comprising the server device 1000 and the terminal device 2000, it is only required that at least either the server device 1000 or the terminal device 2000 has respective units of the game device 100, which have been explained in each of the above embodiments. Namely, the respective functions of the game device 100 may be distributed to the server device 1000 and the terminal device 2000. In this configuration, similar function and effect to those of the previous embodiment are exhibited.

For the configuration having the storage control function of storing various kinds of information in the storage device, since the storage device itself is not included in the configuration, the storage device may be provided anywhere irrespective of inside or outside the game device 100, the server device or the game system. For instance, the storage device can be the RAM 5 or the memory 18 of the game device 100, the RAM or the auxiliary storage device of the server device, or a file server (online storage) or the like having other configuration from the game device 100 or the server device.

The respective configurations explained in the above embodiments may be applied by appropriately combining any of the configurations.

Moreover, the computer readable programs according to the present embodiment are recorded in various computer-readable non-transitory recording mediums such as a hard disc, an optical disc (CD-ROM, DVD-ROM or the like), a flexible disk, a semiconductor memory, and the like and the programs are read from the recording medium and executed by the CPU of the game device and the CPU of the game server. Moreover, the means for providing the program to the game device and the like are not limited to the foregoing recording mediums, and the program can also be provided to the game device and the like via a communication network such as the internet or the like.

APPENDIXES

From the foregoing, the present invention will be understood as described below, for example. In the following, although the numerals given in accompanying drawings are shown in parentheses for the purpose of easier understanding, the invention is not limited to embodiments shown in the drawings.

1) A game device (100, 1000) according to an embodiment of the present invention for controlling the game in which an action is applied to a movable object (for example, the ball 506) includes a prediction accepting unit (71) configured to accept a prediction made by a user on a movement parameter of the movable object (506); a moving unit (72) configured to decide the movement parameter of the movable object (506); a determination unit (73) configured to determine a result of the prediction made by the user based on information on the prediction made by the user, which is accepted by the prediction accepting unit (71), and the movement parameter, which is decided by the moving unit (72): a display control unit (74) configured to display an arrival point area (507) indicating an arrival position of the movable object (506) in an active area (for example, the strike zone 504) in which the action can be applied to the movable object (506); and a decision unit (75) configured to decide the action to be applied to the movable object (506) when the specific area (for example, the area in which the aiming cursor 503 exists) for applying the action to the movable object (506) within the active area is specified based on a predetermined user's operation, the decision unit (75) deciding the action based on a positional relationship between the specific area and the arrival point area (507), wherein the display control unit (74) changes a size of the arrival point area (507) based on a result of determination by the determination unit (73).

The game to be controlled by the game device of the foregoing configuration is a game in which the action is applied to the movable object. Examples of the movable object include the ball used in a sports simulation game. Other examples of the movable object include a fighter, a missile or the like used in the action game. Further, the examples of the action to be applied to the movable object include hitting back, adding spin, catching, destroying, and the like. One example of such game is the baseball game in which the ball (the movable object) thrown by the pitcher character is hit back (batted) by the batter character operated by the user. In this game device, various other games than the baseball game in which the action is applied to the movable object can be applied, such as the soccer game, the tennis game, the combat simulation game, and the like.

In this game device, when the predetermined operation of making the prediction is performed by the user, the prediction accepting unit accepts the prediction made by the user. Here, whether or not to make the prediction by the user is an arbitrary matter, and the user can perform the operation of making the prediction only when the user desires to do so. Examples of the prediction by the user on the movement parameters of the movable object include the prediction on the moved location of the movable object, the prediction on the deviations in the trajectory of the movable object being moved and the like. For example, in the case of the baseball game, the prediction on the pitch location (the prediction on the inside location, the outside location, the high location, the low location or the like), the prediction on the pitch type (the prediction on the fast ball, the various types of breaking ball) and the like are included in the prediction made by the user on the movement parameter of the movable object.

Further, the moving unit decides the movement parameters. Then, the movable object is moved based on the movement parameter as decided. For example, in the baseball game, by the operation of deciding the movement parameters of the ball (the pitch location, the pitch type or the like) thrown by the pitcher character, the moving unit decides the pitch location, the pitch type or the like based on the operation and moves the ball toward the batter character. Furthermore, in the case where the user on the batter side plays the game alone in the Versus CPU mode (a so-called, in the Versus CPU match), the moving unit decides the movement parameters (the pitch location, the pitch type or the like) automatically.

When the predication is made by the user, the determination unit determines the result of the prediction made by the user based on the information regarding the prediction made by the user as accepted by the prediction accepting unit and the movement parameter decided by the moving unit. The determination on the result of the prediction by the determination unit may be the determination on the propriety (correct or wrong) of the prediction or the degree of coincidence of the prediction made by the user. For example, in the case where the user predicted the pitch location to be the outside location, if the actual pitch location is the outside location, it is determined that the prediction made by the user is correct. On the other hand, if the actual pitch location is other than the outside location, it is determined that the prediction made by the user is wrong. The degree of coincidence can be the degree of coincidence between the movement parameter predicted by the user (the information regarding the prediction made by the user on the movement parameter) and the actual movement parameter (the movement parameter decided by the moving unit), which can be expressed, for example, as a value or a level.

Further, in the active area (for example, in the baseball game, the strike zone or the hittable area including the strike zone) in which some action can be applied to the movable object, displayed is the arrival point area indicating the position where the movable object arrives. Furthermore, it may be configured that after the movable object arrives at the arrival point area displayed in the active area, the movable object is further moved to pass there through. For example, in the baseball game, when the user lets the pitch go by without swinging the bat or swings and misses the ball, the ball as the movable object passes through the strike zone as the active area.

The game device of the present embodiment has a characteristic configuration that the size of the arrival point area displayed in the active area is changed based on the result of determination by the determination unit which determines the result of the prediction made by the user. For example, according to the configuration 2) to be described later, when the prediction made by the user is correct, the size of the arrival point area is increased to be larger than the size of the case where the prediction is not made. Further, for example, like the configuration 3) to be described later, it may be configured such that when the prediction made by the user is wrong, the size of the arrival point area is reduced to be smaller than the size of the case where the prediction is not made. Further, for example, like the configuration 4) to be described later, it may be configured such that the arrival point area is increased continuously or stepwise in such a manner that the higher is the degree of coincidence of the prediction, the larger is the size of the arrival point area.

Here, with a predetermined operation, the user can aim at a desired part of the arrival point area. In an example of the baseball game, the predetermined operation includes the operation of moving the meet cursor to a predetermined position, the operation of specifying the hitting part with the bat by directly touching an arbitrary part with the finger, the pen or the like. With the foregoing predetermined operation, when the specific area (in the case of the baseball, the bat hitting area) in the active area is specified, the action (the result of batting) to be applied to the movable object is determined based on the positional relationship between the specific area and the arrival point area. For example, when the arrival point area and the meet cursor are apart from one another, the result of batting would be swinging and missing the ball, when the aiming cursor overlapped with the lower part of the arrival point area, the result of batting would be the fly ball (the fly or the line drive), and when the aiming cursor is overlapped with the upper part of the arrival point area, the result of batting would be the grounder. Therefore, when the prediction made by the user is correct, it becomes easier for the user to perform the selective batting between the fly ball and the grounder by respectively aiming at the lower part or the upper part of the arrival point area which is displayed in the larger size.

Namely, there is a correlation between the arrival point area and the movable object, and when the desired part of the arrival point area is aimed with a cursor, a finger or the like to specify the specific part, this operation is reflected into the action to be applied to the movable object. In the present embodiment, a similar correspondence is set between the arrival point area and the movable object, such that the operation of overlapping the cursor or the like, (a predetermined operation of applying the action) with the lower part of the arrival point area corresponds to the operation of applying the action to the lower part of the movable object corresponding to the lower part of the arrival point area. In the example of the baseball game, the operation of overlapping the cursor with the lower part of the arrival point area corresponds to the operation of hitting the lower part of the ball pitched. It is therefore preferable that the shape of the arrival point area is in similarity relation with and corresponds to or substantially corresponds to the shape of the movable object when the movable object arrives at the arrival point area.

2) In the foregoing configuration 1), it is preferable that when the determination unit (73) determines that the prediction made by the user is correct, the display control unit (74) increases the size of the arrival point area (507) to be larger than the size of the arrival point area (507) of the case where the prediction is not made.

Here, the determination unit determines that "the prediction is correct" in the case where the movement parameter predicted by the user (information on the prediction made by the user on the movement parameter, which is accepted by the prediction accepting unit) coincides with the movement parameter decided by the moving unit, or in the case where the degree of coincidence of the above two movement parameters is at or above a predetermined threshold value or level.

3) In the foregoing configuration of the above 1) or 2), it is preferable that when the determination unit (73) determines that the prediction made by the user is wrong, the display control unit (74) reduces the size of the arrival point area (507) to be smaller than the size of the arrival point area (507) of the case where the prediction is not made.

Here, the determination unit determined that "the prediction is wrong" in the case where the movement parameter expected by the user (information on the prediction made by the user on the movement parameter, which is accepted by the prediction accepting unit) does not coincide with the movement parameter decided by the moving unit, or in the case where the degree of coincidence of the above two movement parameters is below a predetermined threshold value or level.

4) In the foregoing configuration 1), it is preferable that the determination unit (73) determines the degree of coincidence of the prediction based on the information on the prediction made by the user, which is accepted by the prediction accepting unit (71), and the movement parameter, which is decided by the moving unit (72); and the display control unit (74) increases the size of the arrival point area (507) in such a manner that the higher is the degree of coincidence of the prediction, the larger is the size of the arrival point area (507).

According to the foregoing configuration, the size of the arrival point area changes based on the degree of coincidence of the prediction. The degree of coincidence of the prediction can be computed, for example, based on the shift amount (distance) between the coordinate of the pitch location predicted by the user and the coordinate of the actual pitch location in such a manner that the smaller is the shift amount, the higher is the degree of coincidence of the prediction. For example, when the degree of coincidence of the prediction is at or above the predetermined threshold value or level, it is determined that the prediction is correct, and the arrival point area is displayed in the larger size than the size when the prediction is not made. Further, in this case, the size of the arrival point area is continuously or stepwise increased in such a manner that the higher is the degree of coincidence of the prediction, the larger is the arrival point area.

For example, when the degree of coincidence of the prediction is below the predetermined threshold value or level, it is determined that the prediction made by the user is wrong, and the arrival point area is displayed in the smaller size than the size when the prediction is not made. Further, in this case, the size of the arrival point area is continuously or stepwise reduced in such a manner that the lower is the degree of coincidence of the prediction, the smaller is the size of the arrival point area. In this way, the difficulty of the batting operation is increased.

5) In any of the foregoing configurations 1) to 4), it is preferable that the moving unit (72) changes a moving speed of the movable object (506) based on the result of determination by the determination unit (73).

For example, in the baseball game, when the operation of swinging the bat is performed by the user at a predetermined timing at which the ball (movable object) arrives at the hittable area (active area or in a vicinity of the active area) including the strike zone, it is possible to hit the ball. Therefore, the user who operates as the batter is required not only to perform the operation of overlapping the specific area specified by the meet cursor or the like with the arrival point area but also to perform an operation of swinging the bat at the hittable timing by adjusting the timing while watching the ball which is being moved. Therefore, the moving speed of the ball as the movable object is an important element for the user to adjust the timing of performing the operation of swinging the bat.

Further, according to the foregoing configuration, the moving speed of the movable object is changed based on the result of determination by the determination unit which determines the result of the prediction made by the user. For example, like the configuration 6) to be described later, when the prediction made by the user is correct, the moving speed of the movable object is reduced to be lower than the moving speed of the case where the prediction is not made. Like the configuration 7) to be described later, it may be configured that when the prediction made by the user is wrong, the moving speed of the movable object is increased to be higher than the moving speed of the case where the prediction is not made. Like the configuration 8) to be described layer, the moving speed of the movable object is continuously or stepwise reduced in such a manner that the higher is the degree of coincidence of the prediction, the lower is the moving speed.

6) In the foregoing configuration 5), it is preferable that when the determination unit (73) determines that the prediction made by the user is correct, the moving unit (72) reduces the moving speed of the movable object (506) to be lower than the moving speed of the movable object (506) of the case where the prediction is not made.

7) In the foregoing configuration 5) or 6), it is preferable that when the determination unit (73) determines that the prediction made by the user is wrong, the moving unit (72) increases the moving speed of the movable object (506) to be higher than the moving speed of the movable object (506) of the case where the prediction is not made.

8) In the foregoing configuration 5), it is preferable that the determination unit (73) determines the degree of coincidence of the prediction based on the information on the prediction made by the user, which is accepted by the prediction accepting unit (71), and the movement parameter, which is decided by the moving unit (72); and the moving unit (72) reduces the moving speed of the movable object (506) in such a manner that the higher is the degree of coincidence of the prediction, the lower is the moving speed of the movable object (506).

According to this configuration, the higher is the degree of coincidence of the prediction, the moving speed of the movable object is continuously or stepwise reduced. As described, the game with high amusement properties can be realized by changing the moving speed of the movable object according to not only propriety (correct or wrong) of the prediction made by the user but also the degree of coincidence of the prediction.

9) In any of the foregoing configurations 5) to 8), it is preferable that the game is configured to apply the action to the movable object (506) when a predetermined operation is performed by the user to apply the action to the movable object (506) at the predetermined timing at which the movable object (506) arrives at the active area or in the vicinity of the active area.

Here, the predetermined operation to be performed at the predetermined timing, for example, indicates the operation of swinging the bat in the case of the baseball game. For a penalty kick in the soccer game, the predetermined operation indicates a goalkeeper's operation of punching the ball away from the goal or catching the ball. In the tennis game, the predetermined operation indicates an operation of swinging a racket. These operations are merely given as examples, and various other operations may be applied according to the kinds and contents of games.

10) In any of the foregoing configurations 1) to 9), it is preferable that the game is a game in which a first character operated by the user applies the action to the movable object (506); and the display control unit (74) changes the size of the arrival point area (507) based on a parameter of the first character.

Here, examples of the first character include the batter character in the baseball game, the goalkeeper character in the soccer game, the receiver character who returned the shot from the opponent character. These are merely examples, and the first character according to the type or the content of the game can be applied.

Examples of the parameters of the first character include the batting ability, the strong the pitch location, the weak pitch location, the strong pitch type, the weak pitch type, the physical endurance (as the number of innings played increases, the physical endurance is lowered due to fatigue), and the like. For example, the basic size (the default size of the case where the prediction is not made) of the arrival point area is increased in such a manner that the higher is the batting ability of the first character, the larger is the basic size of the arrival point area. Here, the basic size of the arrival point area is further changed according to propriety (correct or wrong) (or the degree of coincidence) of the prediction. Further, for example, when the pitch location is the first character's strong pitch location, the basic size of the arrival point area becomes larger than the basic size of the case where the pitch location is not the first character's strong pitch location. Again, the basic size of the arrival point area is further changed according to propriety (correct or wrong) (or the degree of coincidence) of the prediction.

11) In any of the foregoing configurations 1) to 10), it is preferable that the game is a game in which a second character releases (502) the movable object (506); and the display control unit (74) changes the size of the arrival point area (507) based on a parameter of the second character (502).

Here, examples of the second character include the pitcher character in the baseball game, the kicker character of the penalty kick in the soccer game, the tennis player character which serves in the tennis game. These are merely examples, and the second character according to the type or the content of the game can be applied.

For example, in the baseball game, examples of the parameters of the pitcher character includes the ball power, the ball control, the strong pitch location, the weak pitch location, the strong pitch type, the weak pitch type, the physical endurance (as the number of innings pitched increases, the physical endurance is lowered due to fatigue), and the like. For example, the higher is the ball power parameter of the second character, the smaller is the basic size (the default size of the case where the prediction is not made) of the arrival point area, and the basic size is further changed according to propriety (correct or wrong) (or the degree of coincidence) of the prediction. Further, for example, when the pitch location is the second character's strong pitch location, the basic size of the arrival point area becomes smaller than the basic size of the case where the pitch location is not the second character's strong pitch location. Again, the basic size of the arrival point area is further changed according to propriety (correct or wrong) (or the degree of coincidence) of the prediction.

12) In any of the foregoing configurations 1) to 11), it is preferable that the game is a game in which a first character (501) operated by the user applies the action to the movable object (506) released by a second character (502), and the game device further comprises an information management unit (77) configured to manage information on a compatibility between the first character (501) and the second character (502), wherein the display control unit (74) changes the size of the arrival point area (507) based on the information on the compatibility.

For example, in the baseball game, as described earlier, the first character corresponds to the batter character, and the second character corresponds to the pitcher character respectively. With this configuration, the information on the compatibility between the first character and the second character are managed. The information on the compatibility specifically indicates, for example, the right handed batter had the good compatibility with the left handed pitcher, but has a bat compatibility with the right handed pitcher, or can be the respective compatibilities between individual batters and pitchers. For example, the batter B1 has the good compatibility with the pitcher P1 but has a bad compatibility with the pitcher P2.

For example, in the case where the opponent is the second character which has the good compatibility for the batter character, the basic size (the default size of the case where the prediction is not made) of the arrival point area is increased to be larger than the basic size of the case where the opponent is the second character which does not have the good compatibility for the batter character, and the basic size is further changed depending on propriety (correct or wrong) of the prediction.

13) A game device (100, 1000) according to an embodiment of the present invention for controlling a baseball game or a softball game, in which a batter character operated by a user hits a ball object (506) thrown by a pitcher character (502) includes: a prediction accepting unit (71) configured to accept a prediction made by the user on the pitch location; the pitch location deciding unit configured to decide the pitch location; a determination unit (73) configured to determine a result of the prediction made by the user based on information on the prediction made by the user, which is accepted by the prediction accepting unit (71), and the pitch location, which is decided by the pitch location deciding unit; a display control unit (74) configured to display an arrival point area (507) indicating an expected arrival position of the ball object in an active area in which the ball object can be hit; and a decision unit (75) configured to decide a result of batting when the specific area for hitting the ball object within the active area is specified based on a predetermined user's operation, the decision unit (75) deciding the result of batting based on a positional relationship between the specific area and the arrival point area (507), wherein when the determination unit (73) determines that the prediction made by the user is correct, the display control unit (74) increases a size of the arrival point area (507) to be larger than a size of the case where the prediction is not made, while when the determination unit (73) determines that the prediction made by the user is wrong, the display control unit (74) reduces the size of the arrival point area (507) to be smaller than the size of the case where the prediction is not made.

14) A game system according to another embodiment of the present invention which comprises a terminal device (2000) used by the first user uses and a terminal device (2000) used by a second user, and which controls a game in which a character operated by the first user applies an action to a movable object (506) operated by the second user, the game system comprising: a prediction accepting unit (71) configured to accept a prediction made by the first user on a movement parameter of the movable object (506); a moving unit (72) configured to decide the movement parameter of the movable object (506); a determination unit (73) configured to determine a result of the prediction made by the first user based on information on the prediction made by the first user, which is accepted by the prediction accepting unit (71), and the movement parameter, which is decided by the moving unit (72); a display control unit (74) configured to display an arrival point area (507) indicating an arrival position of the movable object (506) in an active area in which the action can be applied to the movable object (506); and a decision unit (75) configured to decide the action to be applied to the movable object (506) when a specific area for applying the action to the movable object (506) within the active area is specified based on a predetermined first user's operation, the decision unit (75) deciding the action based on a positional relationship between the specific area and the arrival point area (507), wherein the display control unit (74) changes a size of the arrival point area (507) based on a result of determination by the determination unit (73).

15) A recording medium according to yet another aspect of the present invention is a non-transitory computer-readable recording medium having recorded thereon a program for causing a computer to operate as the game device (100, 1000) having any of the foregoing configurations, which causes the computer to function as respective units of the game device (100, 1000).

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A game device for controlling a game in which an action is applied to a movable object, comprising:
   a prediction accepting unit embodied by a processor programmed to accept a prediction made by a user on a movement parameter of the movable object;
   a moving unit embodied by a processor programmed to decide the movement parameter of the movable object;
   a determination unit embodied by a processor programmed to determine a result of the prediction made by the user based on information on the prediction made by the user, which is accepted by the prediction accepting unit, and the movement parameter, which is decided by the moving unit;
   a display control unit embodied by a processor programmed to display an arrival point area indicating an arrival position of the movable object in an active area in which the action can be applied to the movable object; and
   a decision unit embodied by a processor programmed to decide the action to be applied to the movable object when a specific area for applying the action to the movable object within the active area is specified based on a predetermined user's operation, the decision unit deciding the action based on a positional relationship between the specific area and the arrival point area,
   wherein the display control unit changes a size of the arrival point area based on determination of the result of the prediction by the determination unit, after movement of the movable object is started.

2. The game device according to claim 1,
   wherein when the determination unit determines that the prediction made by the user is correct, the display control unit increases the size of the arrival point area to be larger than the size of the arrival point area of a case where the prediction is not made.

3. The game device according to claim 1,
   when the determination unit determines that the prediction made by the user is wrong, the display control unit reduces the size of the arrival point area to be smaller than the size of the arrival point area of a case where the prediction is not made.

4. The game device according to claim 1, wherein
   the determination unit determines a degree of coincidence of the prediction based on the information on the prediction made by the user, which is accepted by the prediction accepting unit, and the movement parameter, which is decided by the moving unit; and
   the display control unit increases a size of the arrival point area in such a manner that the higher is the degree of coincidence of the prediction, the larger is the size of the arrival point area.

5. The game device according to claim 1, wherein
   the moving unit changes a moving speed of the movable object based on the result of determination by the determination unit.

6. The game device according to claim 5, wherein
   when the determination unit determines that the prediction made by the user is correct, the moving unit reduces the moving speed of the movable object to be lower than the moving speed of the movable object of a case where the prediction is not made.

7. The game device according to claim 5, wherein
   when the determination unit determines that the prediction made by the user is wrong, the moving unit increases the moving speed of the movable object to be higher than the moving speed of the movable object of a case where the prediction is not made.

8. The game device according to claim 5, wherein
   the determination unit determines a degree of coincidence of the prediction based on the information on the prediction made by the user, which is accepted by the prediction accepting unit, and the movement parameter, which is decided by the moving unit; and
   the moving unit reduces the moving speed of the movable object in such a manner that the higher is the degree of coincidence of the prediction, the lower is the moving speed of the movable object.

9. The game device according to claim 5, wherein
   the game is configured to apply the action to the movable object when a predetermined operation is performed by the user to apply the action to the movable object at a predetermined timing at which the movable object arrives at the active area or in a vicinity of the active area.

10. The game device according to claim 1, wherein
    the game is a game in which a first character operated by the user applies the action to the movable object; and
    the display control unit changes the size of the arrival point area based on a parameter of the first character.

11. The game device according to claim 1, wherein
    the game is a game in which a second character releases the movable object; and
    the display control unit changes the size of the arrival point area based on a parameter of the second character.

12. The game device according to claim 1, wherein the game is a game in which a first character operated by the user applies the action to the movable object released by a second character, the game device further comprising:
    an information management unit embodied by a processor programmed to manage information on a compatibility between the first character and the second character,
    wherein the display control unit changes the size of the arrival point area based on the information on the compatibility.

13. A game device for controlling a baseball game or a softball game, in which a batter character operated by a user hits a ball object thrown by a pitcher character, comprising:

a prediction accepting unit embodied by a processor programmed to accept a prediction made by the user on a pitch location;
a pitch location deciding unit embodied by a processor programmed to decide the pitch location;
a determination unit embodied by a processor programmed to determine a result of the prediction made by the user based on information on the prediction made by the user, which is accepted by the prediction accepting unit, and the pitch location, which is decided by the pitch location deciding unit;
a display control unit embodied by a processor programmed to display an arrival point area indicating an arrival position of the ball object in an active area in which the ball object can be hit; and
a decision unit embodied by a processor programmed to decide a result of batting when a specific area for hitting the ball object within the active area is specified based on a predetermined user's operation, the decision unit deciding the result of batting based on a positional relationship between the specific area and the arrival point area,
wherein when the determination unit determines that the prediction made by the user is correct, after movement of the movable object is started, the display control unit increases a size of the arrival point area to be larger than a size of a case where the prediction is not made, while when the determination unit determines that the prediction made by the user is wrong, after movement of the movable object is started, the display control unit reduces the size of the arrival point area to be smaller than the size of the case where the prediction is not made.

14. A game system which comprises a terminal device used by a first user uses and a terminal device used by a second user, and which controls a game in which a character operated by the first user applies an action to a movable object operated by the second user, the game system comprising:
a prediction accepting unit embodied by a processor programmed to accept a prediction made by the first user on a movement parameter of the movable object;
a moving unit embodied by a processor programmed to decide the movement parameter of the movable object;
a determination unit embodied by a processor programmed to determine a result of the prediction made by the first user based on information on the prediction made by the first user, which is accepted by the prediction accepting unit, and the movement parameter, which is decided by the moving unit;
a display control unit embodied by a processor programmed to display an arrival point area indicating an arrival position of the movable object in an active area in which the action can be applied to the movable object; and
a decision unit embodied by a processor programmed to decide the action to be applied to the movable object when a specific area for applying the action to the movable object within the active area is specified based on a predetermined first user's operation, the decision unit deciding the action based on a positional relationship between the specific area and the arrival point area,
wherein the display control unit changes a size of the arrival point area based on determination of the result of the prediction by the determination unit, after movement of the movable object is started.

15. A non-transitory computer-readable recording medium having recorded thereon a program for causing a computer to operate as a game device, which causes the computer to function as respective units of the game device, wherein the game device comprises:
a prediction accepting unit configured to accept a prediction made by a user on a movement parameter of the movable object;
a moving unit configured to decide the movement parameter of the movable object;
a determination unit configured to determine a result of the prediction made by the user based on information on the prediction made by the user, which is accepted by the prediction accepting unit, and the movement parameter, which is decided by the moving unit;
a display control unit configured to display an arrival point area indicating an arrival position of the movable object in an active area in which the action can be applied to the movable object; and
a decision unit configured to decide the action to be applied to the movable object when a specific area for applying the action to the movable object within the active area is specified based on a predetermined user's operation, the decision unit deciding the action based on a positional relationship between the specific area and the arrival point area,
wherein the display control unit changes a size of the arrival point area based on determination of the result of the prediction by the determination unit, after movement of the movable object is started.

* * * * *